(12) United States Patent
Chen et al.

(10) Patent No.: US 8,532,218 B2
(45) Date of Patent: Sep. 10, 2013

(54) METHOD AND TERMINAL FOR CHANNEL STATE INFORMATION FEEDBACK

(75) Inventors: Yijian Chen, Shenzhen (CN); Yu Ngok Li, Shenzhen (CN); Jun Xu, Shenzhen (CN); Shupeng Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/505,866

(22) PCT Filed: Aug. 1, 2011

(86) PCT No.: PCT/CN2011/001264
§ 371 (c)(1),
(2), (4) Date: May 3, 2012

(87) PCT Pub. No.: WO2012/037772
PCT Pub. Date: Mar. 29, 2012

(65) Prior Publication Data
US 2012/0224652 A1 Sep. 6, 2012

(30) Foreign Application Priority Data
Sep. 20, 2010 (CN) .......................... 2010 1 0290522

(51) Int. Cl.
*H04B 7/02* (2006.01)
*H04L 1/02* (2006.01)
*H04L 27/00* (2006.01)

(52) U.S. Cl.
USPC .......................................... 375/267; 375/259

(58) Field of Classification Search
USPC .................... 375/267, 296, 260, 259, 295
See application file for complete search history.

(56) References Cited

U.S. PATENT DOCUMENTS

| | | | |
|---|---|---|---|
| 2009/0015443 A1* | 1/2009 | Zhang et al. | 341/52 |
| 2009/0190528 A1* | 7/2009 | Chung et al. | 370/328 |
| 2010/0074120 A1* | 3/2010 | Bergman et al. | 370/244 |
| 2011/0075650 A1* | 3/2011 | Zhu et al. | 370/344 |

FOREIGN PATENT DOCUMENTS

| | | |
|---|---|---|
| CN | 101686079 A | 3/2010 |
| CN | 101426225 B | 9/2010 |
| CN | 101944985 A | 1/2011 |

OTHER PUBLICATIONS

PCT International Search Report for PCT/CN2011/001264 mailed Nov. 17, 2011 (4 pages).

* cited by examiner

*Primary Examiner* — Chieh M Fan
*Assistant Examiner* — Brian J Stevens
(74) *Attorney, Agent, or Firm* — Sutherland Asbill & Brennan LLP

(57) ABSTRACT

A method and terminal for feeding back channel status information, include: when the channel status information is fed back on the physical uplink control channel, code words contained in the used codebook $C_{PUCCH}(r)$ with a layer number or rank being r is a subset of the code words contained in the codebook $C_{PUSCH}(r)$ with a layer number or rank being r in the overall codebook defined in the LTE-A; wherein, the $C_{PUCCH}(r)$ is a single codebook or a single codebook equivalent to dual codebooks; and the $C_{PUSCH}(r)$ is a single codebook or a single codebook equivalent to the dual codebooks; and the single codebook equivalent to the dual codebooks refers to an actually defined single codebook in which 2 pre-coding matrix identifiers are required to determine the codebook of the code words therein for an established r.

22 Claims, 2 Drawing Sheets

METHOD AND TERMINAL FOR CHANNEL STATE INFORMATION FEEDBACK

CROSS REFERENCE TO RELATED APPLICATIONS

This application claims the priority benefit of PCT/CN2011/001264 filed on Aug. 1, 2011 and Chinese Application No. 201010290522.1 filed on Sep. 20, 2010. The contents of these applications are hereby incorporated by reference in their entirety.

TECHNICAL FIELD

The present invention relates to the communication field, and in particular, to a method and terminal for feeding back channel status information.

BACKGROUND OF THE RELATED ART

In the wireless communication system, the sending end and the receiving end use a plurality of antennas with the space multiplexing mode to obtain a higher speed. Compared to the general space multiplexing method, a kind of enhanced technology is that the receiving end feeds back the channel information to the sending end, and the sending end uses the some transmission precoding technologies according to the obtained channel information to greatly improve the transmission performance. As for the single user multi-input multi-output (MIMO), it uses the channel feature vector information to perform the precoding directly; as for the multi-user MIMO, it needs more accurate channel information.

In the long term evolution (LTE) plan, for the feedback of the channel information, a feedback method which utilizes a simple single codebook is mainly used, and the performance of transmitting precoding technical in the MIMO depends more on the accuracy of the codebook feedback therein.

Here the basic principle of the channel information quantization feedback based on the codebook is described briefly as follows:

Suppose that the limited feedback channel capacity is B bps/Hz, and then the number of available code words is $N=2^B$. The feature vector space of the channel matrix forms the codebook space at $\Re = \{F_1, F_2 \ldots F_N\}$ through the quantization. The transmitting end and the receiving end both keep or produce in real time that codebook (which is the same in both the receiving end and the sending end). According to the channel matrix H obtained by the receiving end, the receiving end selects one code word $\hat{F}$ which is most matched with the channel from the $\Re$ according to a certain criterion, and feeds back the sequence number of code word i to the transmitting end. Here, the sequence number of code word is called precoding matrix indicator (PMI). The transmitting end finds the corresponding precoding code word $\hat{F}$ according to that sequence number i, thus obtaining the channel information, and $\hat{F}$ represents the feature vector information of the channel.

Generally speaking, $\Re$ can be divided as a codebook corresponding to a plurality of Ranks, each Rank would correspond to a plurality of code words to quantize the precoding matrix formed by the channel feature vector under the Rank. Since the number of the Ranks and the number the non-zero feature vectors of the channel are equal, generally speaking, the code words with the Rank being N will have N columns. So, the codebook $\Re$ can be divided into a plurality of sub codebooks with respect to different Ranks, as shown in Table 1.

TABLE 1

| $\Re$ | | |
|---|---|---|
| Layer number $\upsilon$(Rank) | | |
| 1 | 2 | ... N |
| $\Re_1$ | $\Re_2$ | ... $\Re_N$ |
| Code word vector set with the column number being 1 | Code word matrix set with the column number being 2 | Code word matrix set with the column number being N |

Wherein, the code words needing to be stored when Rank>1 are all in matrix form, wherein, the codebook in the LTE protocol adopts this kind of feedback method of codebook quantization. The codebook of the LTE downlink 4 transmission antennas is show in Table 2, and actually in the LTE, the meaning of the precoding codebook is same with that of the channel information quantization codebook. For unifying hereinafter, the vectors can be regarded as a matrix with the dimension being 1.

TABLE 2

| Code word index | $u_n$ | Total layer number $\upsilon$ (RI) | | | |
|---|---|---|---|---|---|
| | | 1 | 2 | 3 | 4 |
| 0 | $u_0 = [1 \; -1 \; -1 \; -1]^T$ | $W_0^{(1)}$ | $W_0^{(14)}/2$ | $W_0^{(124)}/\sqrt{3}$ | $W_0^{(1234)}/2$ |
| 1 | $u_1 = [1 \; -j \; 1 \; j]^T$ | $W_1^{(1)}$ | $W_1^{(12)}/2$ | $W_1^{(123)}/\sqrt{3}$ | $W_1^{(1234)}/2$ |
| 2 | $u_2 = [1 \; 1 \; -1 \; 1]^T$ | $W_2^{(1)}$ | $W_2^{(12)}/2$ | $W_2^{(123)}/\sqrt{3}$ | $W_2^{(3214)}/2$ |
| 3 | $u_3 = [1 \; j \; 1 \; -j]^T$ | $W_3^{(1)}$ | $W_3^{(12)}/2$ | $W_3^{(123)}/\sqrt{3}$ | $W_3^{(3214)}/2$ |
| 4 | $u_4 = [1 \; (-1-j)/\sqrt{2} \; -j \; (1-j)/\sqrt{2}]^T$ | $W_4^{(1)}$ | $W_4^{(14)}/2$ | $W_4^{(124)}/\sqrt{3}$ | $W_4^{(1234)}/2$ |
| 5 | $u_5 = [1 \; (1-j)/\sqrt{2} \; j \; (-1-j)/\sqrt{2}]^T$ | $W_5^{(1)}$ | $W_5^{(14)}/2$ | $W_5^{(124)}/\sqrt{3}$ | $W_5^{(1234)}/2$ |
| 6 | $u_6 = [1 \; (1+j)/\sqrt{2} \; -j \; (-1+j)/\sqrt{2}]^T$ | $W_6^{(1)}$ | $W_6^{(13)}/2$ | $W_6^{(134)}/\sqrt{3}$ | $W_6^{(1324)}/2$ |
| 7 | $u_7 = [1 \; (-1+j)/\sqrt{2} \; j \; (1+j)/\sqrt{2}]^T$ | $W_7^{(1)}$ | $W_7^{(13)}/2$ | $W_7^{(134)}/\sqrt{3}$ | $W_7^{(1324)}/2$ |
| 8 | $u_8 = [1 \; -1 \; 1 \; 1]^T$ | $W_8^{(1)}$ | $W_8^{(12)}/2$ | $W_8^{(124)}/\sqrt{3}$ | $W_8^{(1234)}/2$ |
| 9 | $u_9 = [1 \; -j \; -1 \; -j]^T$ | $W_9^{(1)}$ | $W_9^{(14)}/2$ | $W_9^{(134)}/\sqrt{3}$ | $W_9^{(1234)}/2$ |
| 10 | $u_{10} = [1 \; 1 \; 1 \; -1]^T$ | $W_{10}^{(1)}$ | $W_{10}^{(13)}/2$ | $W_{10}^{(123)}/\sqrt{3}$ | $W_{10}^{(1324)}/2$ |
| 11 | $u_{11} = [1 \; j \; -1 \; j]^T$ | $W_{11}^{(1)}$ | $W_{11}^{(13)}/2$ | $W_{11}^{(134)}/\sqrt{3}$ | $W_{11}^{(1324)}/2$ |
| 12 | $u_{12} = [1 \; -1 \; -1 \; 1]^T$ | $W_{12}^{(1)}$ | $W_{12}^{(12)}/2$ | $W_{12}^{(123)}/\sqrt{3}$ | $W_{12}^{(1234)}/2$ |
| 13 | $u_{13} = [1 \; -1 \; 1 \; -1]^T$ | $W_{13}^{(1)}$ | $W_{13}^{(13)}/2$ | $W_{13}^{(123)}/\sqrt{3}$ | $W_{13}^{(1324)}/2$ |
| 14 | $u_{14} = [1 \; 1 \; -1 \; -1]^T$ | $W_{14}^{(1)}$ | $W_{14}^{(13)}/2$ | $W_{14}^{(123)}/\sqrt{3}$ | $W_{14}^{(3214)}/2$ |
| 15 | $u_{15} = [1 \; 1 \; 1 \; 1]^T$ | $W_{15}^{(1)}$ | $W_{15}^{(12)}/2$ | $W_{15}^{(123)}/\sqrt{3}$ | $W_{15}^{(1234)}/2$ |

Wherein, $W_n = I - 2u_n u_n^H / u_n^H u_n$, I is a unit matrix, $W_k^{(j)}$ represents the j column vector of the matrix $W_k$. $W_k^{(j_1, j_2, \ldots, j_n)}$ represents the matrix formed by the $j_1, j_2, \ldots, j_n$ columns of the matrix $W_k$.

All of the above description is the principle of the codebook feedback technology in the LTE, and when implementing, it will also involve some specific feedback methods.

The feedback granularity of the channel information is introduced firstly. In the LTE standard, the minimum feedback unit of the channel information is the Subband channel information. One Subband is composed of several resource blocks (RB), and each RB is composed of a plurality of resource elements (RE). The RE is the minimum unit of the time-frequency resource in the LTE, and the resource representation way of the LTE continues to be used in the LTE-A. Several Subbands can be called Multi-Subband, and a plurality of Subbands can be called Wideband.

Now the feedback content corresponding to the channel information in the LTE is introduced, and the channel status information feedback includes: channel quality indication (abbreviated as CQI) information, PMI and rank indicant (abbreviated as RI). Here, the CSI content which we pay most attention to is the PMI information, but the RI and the CQI all belong to the content of the channel status information feedback.

The CQI is an index for weighing the quality of the downlink channel. The CQI is represented by the integer value of 0-15 in the 36-213 protocol, which respectively represents different CQI grades, and different CQIs correspond to their own modulation schemes and coding rates (modulation and coding scheme, MCS).

The RI is used for describing the number of the independent channels of the space, which corresponds to the rank of the channel response matrix. In the mode of open loop space multiplexing and closed loop space multiplexing, the UE is required to feed back the RI info illation, and it does not need to feed back the RI information in other modes. The rank of the channel matrix corresponds to the layer number.

Then some mechanisms related to the channel information feedback in the LTE are described:

The feedback modes of the uplink channel information in the LTE are divided into two kinds: the periodic channel information feedback on the physical uplink control channel (PUCCH) and the aperiodic channel information feedback on the physical uplink data shared channel (PUSCH). The PUCCH is a control channel, the reliability of the feedback is higher, but its feedback resources are more valuable, and the feedback overhead is limited strictly. Generally the feedback quantity of CSI (including one or more kinds of the PMI, the CQI and the RI) of one time cannot exceed 11 bits. The PUSCH can provide more CSI feedback resources, but the reliability cannot be guaranteed, and since the data transmission resources need to be occupied, and the data service transmission would be affected.

The long term evolution advanced (LTE-A) system, as the evolved standard of the LTE, supports greater system bandwidth (reaching as high as 100 MHz), and the LTE current standard is backwards compatible. In order to obtain much higher average spectral efficiency of the cell and improve the marginal coverage and throughput of the cell, the LTE-A supports at most 8 antennas in downlink on the basis of the current LTE system, and provides some feedback enhanced technologies with respect to the codebook feedback, which is mainly to strengthen the feedback precision of the codebook and compress the overhead by using the time relativity and/or the frequency domain relativity of the channel information. This technology can improve the frequency spectrum utilization rate of the international mobile telecommunications-advance (IMT-Advance) system and relieve the short supply of the spectral resources. Meanwhile, considering that the main application of 8 antennas will be the situation of bipolar, the design and enhancement of the codebook needs to fully consider the feature of the bipolar channel.

The main idea of this kind of the feedback technology of the enhanced codebook is to increase the overhead of the PMI feedback compared to the LTE feedback, and together represent the status information of the channel by using the feedback of two PMIS, mainly including two kinds of implementation modes:

the dual codebooks and dual PMI feedbacks are defined, or the single codebook equivalent to the dual codebooks and the dual PMI feedbacks are defined.

Defining dual codebooks and dual PMI feedbacks can further be described as:

1) the preceding/feedback structure of one Subband is composed of two matrixes.

2) each of the two matrixes belongs to one individual codebook. The codebook is known in advance at the same time by the base station and the UE. The feedback code word can be changed at different time and different Subbands.

3) one matrix represents the attribute of the long-time channel or the bandwidth. Another matrix represents the attribute of the short-time channel or a certain frequency band.

4) the used matrix codebooks are represented by a limited number of matrix sets, and each matrix is knowable for the UE and the base station.

5) wherein, one matrix can be a stationary matrix, and does not need the feedback. This moment, it corresponds to the case of degenerating to the single codebook feedback (which may be used in the case of unrelated channel of the high rank and the low rank).

It can be seen from here, a kind of structure based on the dual codebooks is provided with respect to the feedback of the channel information, which can be further described as:

for one or a plurality of union Subbands needing to feed back the channel information, the UE feeds back two PMI information (in some situations, it might not be through the feedback, one PMI also can be predefined as a fixed value without feedback), which are PMI1 and PMI2 respectively, to the base station, wherein, the PMI1 corresponds to the code word W1 in one codebook C1, and the PMI2 corresponds to the code word W2 in another codebook C2. The base station has the same information of C1 and C2, after receiving the PMI1 and the PMI2, it finds the corresponding code words W1 and W2 from the corresponding codebooks C1 and C2, and calculates W=F(W1, W2) to obtain the channel information W according to the agreed function rule F.

The above dual codebooks design criteria is a kind of specific codebook format in the LTE-A. In a specific implementation, it only needs to define the codebook corresponding to the W1 and the W2, but actually there is a virtual codebook corresponding to W, and the consideration on performance aspect in the design is based on the codebook corresponding to W. The design of the codebook feedback has two important parts, the first important part is the specific structure, overhead and specific code word of the W, which concerns the performance of the dual codebooks feedback directly (although the feedback format of the specific definition is to feed back the W1 and the W2 without directly feeding back the W), and the consideration for this part is similar for the formats of the single codebook and the dual codebooks. The second important part is about how to divide the W into 2 codebooks to represent that the characteristic of the time domain/frequency domain of the channel changing can be more adapted, and the overhead is saved effectively. This belongs to the consideration for saving the overhead of the dual codebooks, and there is no consideration in this respect for the single codebook.

Except the above dual codebooks implementation, also there is one kind of single codebook feedback mode which is equivalent to using the dual codebooks and dual PMIs feedback: to define the single codebook equivalent to the dual codebooks and the dual PMIs feedback.

As to Rank=r, r is an integer, and the difference from the above 4Tx codebook lies in that, when the single codebook equivalent to the dual codebooks is used, it needs 2 PMI feedbacks to represent its information to feedback the code word in the corresponding codebook. The single codebook equivalent to the dual codebooks can generally be represented as shown in below Table 3.

TABLE 3

| | | $i_2$ | | | |
|---|---|---|---|---|---|
| | | 0 | 1 | ... | N2 |
| $i_1$ | 0 | $W_{i_1,i_2}$ | $W_{i_1,i_2}$ | $W_{i_1,i_2}$ | $W_{i_1,i_2}$ |
| | 1 | $W_{i_1,i_2}$ | $W_{i_1,i_2}$ | $W_{i_1,i_2}$ | $W_{i_1,i_2}$ |
| | 2 | $W_{i_1,i_2}$ | $W_{i_1,i_2}$ | $W_{i_1,i_2}$ | $W_{i_1,i_2}$ |
| | 3 | $W_{i_1,i_2}$ | $W_{i_1,i_2}$ | $W_{i_1,i_2}$ | $W_{i_1,i_2}$ |
| | ... | $W_{i_1,i_2}$ | $W_{i_1,i_2}$ | $W_{i_1,i_2}$ | $W_{i_1,i_2}$ |
| | N-1 | $W_{i_1,i_2}$ | $W_{i_1,i_2}$ | $W_{i_1,i_2}$ | $W_{i_1,i_2}$ |
| | N1 | $W_{i_1,i_2}$ | $W_{i_1,i_2}$ | $W_{i_1,i_2}$ | $W_{i_1,i_2}$ |

Here, $W_{i_1,i_2}$ is one code word indicated by $i_1$ $i_2$ together, and generally can be expressed as the function format $W(i_1, i_2)$, and only $i_1$ $i_2$ need to be determined.

For example, when r=1, $$\phi_n e^{j\pi n/2}$$

$$v_m = [1 \; e^{j2\pi m/32} \; e^{j4\pi m/32} \; e^{j6\pi m/32}]^T$$

TABLE 4

| | | | | $i_2$ | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | | | | $i_2$ | | | | |
|---|---|---|---|---|---|---|---|---|
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$ Actually this mode is equivalent to the dual codebooks and dual PMNs, and the only difference lies in that this method does not define the two codebooks C1 and C2 any more, instead, defining the dual codebooks and the codebook corresponding to the W formed by the function relationship of the dual codebooks, that is, the virtual codebook are replaced by the actually defining the C1 and C2.

Since in the LTE-A, the precision of the feedback is strengthened, which makes the sum of the overhead required by feeding back the information of the PMI1 and the PMI2 (also can be interpreted as the overhead of the codebook corresponding to the W) increase to some extent relative to the overhead of the single codebook in the LTE. when that codebook is applied to the channel information feedback on the PUCCH, and when the W1 and the W2 are transmitted in a subframe at the same time, it will make the CSI feedback overhead of the PUCCH be over the 11-bit overhead limitation, thus making the transmission performance of the PUCCH drop seriously and causing very severe influence on the system.

In addition, even if the PMI1 and the PMI2 are transmitted separately, for example, the PMI1 and the RI are transmitted together, although the feedback of the PMI1+RI is not over the 11-bit overhead limitation, since increasing the overhead will make the bit error rate rise in the case that the transmission resources are definite, the bit error rate of the RI cannot be guaranteed very well, there will be the problem that the bit error rate of the RI does not meet the requirement. When the PMI2 and the CQI are transmitted together, the excessive overhead also will cause the bit error rate increase and affect system performance.

No matter being the single codebook or the dual codebooks feedback, the increase of the feedback overhead will make the feedback overhead of the PUCCH be over the limitation, and make its transmission performance drop seriously. This is the problem required to be solved in the related art.

SUMMARY OF THE INVENTION

The present invention provides a method and terminal for feeding back channel status information, which can ensure that the CSI feedback overhead on the PUCCH is not over the limitation and prevent the transmission performance from decreasing dramatically, and can ensure the precision of the PMI feedback under the limited overhead, thus the CSI feedback on the PUCCH still can support the pre-coding technology effectively and have good compatibility with the feedback on the PUSCH.

In order to solve the above-mentioned problem, the present invention provides a method for feeding back channel status information, wherein, a terminal in long term evolution-advanced (LTE-A) quantizes the channel status information by using a codebook, and feeds back the channel status information through a physical uplink control channel; the method comprises: when the channel status information is fed back on the physical uplink control channel, code words contained in the used codebook $C_{PUCCH}(r)$ with layer number or rank being r are a subset of the code words contained in the codebook $C_{PUSCH}(r)$ with the layer number or the rank being r in the overall codebook defined in the LTE-A; wherein, the $C_{PUCCH}(r)$ is a single codebook or a single codebook equivalent to dual codebooks; and the $C_{PUSCH}(r)$ is a single codebook or a single codebook equivalent to dual codebooks; and the single codebook equivalent to dual codebooks means that the actually used codebook is an actually defined single codebook, however, 2 pre-coding matrix identifiers are required to determine the codebook of the code words therein for a determined r.

Optionally, the above-mentioned method also can have the following characteristics:

when r=1 or 2, the $C_{PUSCH}(r)$ has repetitive code words, and the $C_{PUCCH}(r)$ does not have repetitive code words.

Optionally, the above-mentioned method also can have the following characteristics:

the method further comprises: a base station notifying a terminal that what code words in the $C_{PUSCH}(r)$ compose the code words in the $C_{PUCCH}(r)$ through a high layer signaling.

Optionally, the above-mentioned method also can have the following characteristics:

when r=1, all code words of the $C_{PUSCH}(r)$ meet the model $$\begin{bmatrix} u_i \\ \alpha_k u_i \end{bmatrix},$$

the $u_i$ is a 4-dimension column vector, i=1, 2, 3 ... m, m is a positive integer, and k=1, 2, 3, 4, and $\alpha_k = e^{j\pi(k-1)/2}$; for every $u_i$, the $C_{PUSCH}(r)$ contains 4 code words $$\begin{bmatrix} u_i \\ u_i \end{bmatrix} \begin{bmatrix} u_i \\ ju_i \end{bmatrix} \begin{bmatrix} u_i \\ -u_i \end{bmatrix} \begin{bmatrix} u_i \\ -ju_i \end{bmatrix}$$

corresponding to the $\alpha_k = e^{j\pi(k-1)/2}$ in which k=1, 2, 3, 4, then: the code words that form the $C_{PUCCH}(r)$ are all or part of code words which are extracted from the $C_{PUSCH}(r)$ and meet the model $$\begin{bmatrix} u_i \\ \alpha_k u_i \end{bmatrix}$$

with the corresponding $\alpha_k$ being {1,−1}; or, the code words that form the $C_{PUCCH}(r)$ are all or part of code words which are extracted from the $C_{PUSCH}(r)$ and meet model $$\begin{bmatrix} u_i \\ \alpha_k u_i \end{bmatrix}$$

with the corresponding $\alpha_k$ being {j,−j}; or, half of the code words that form the $C_{PUCCH}(r)$ are part of code words which are extracted from the $C_{PUSCH}(r)$ and meet the model $$\begin{bmatrix} u_i \\ \alpha_k u_i \end{bmatrix}$$

with the corresponding $\alpha_k$ being {1,−1}, and another half of the code words are part of code words which are extracted from the $C_{PUSCH}(r)$ and meet the model $$\begin{bmatrix} u_i \\ \alpha_k u_i \end{bmatrix}$$

with the corresponding $\alpha_k$ being {j,−j}; or, ¼ of the code words that form the $C_{PUCCH}(r)$ are part of code words which are extracted from the $C_{PUSCH}(r)$ and meet the model $$\begin{bmatrix} u_i \\ \alpha_k u_i \end{bmatrix}$$

with the corresponding $\alpha_k$ being 1, ¼ of the code words are part of code words which are extracted from the $C_{PUSCH}(r)$ and meet the model $$\begin{bmatrix} u_i \\ \alpha_k u_i \end{bmatrix}$$

with the corresponding $\alpha_k$ being −1, ¼ of the code words are part of code words which are extracted from the $C_{PUSCH}(r)$ and meet the model $$\begin{bmatrix} u_i \\ \alpha_k u_i \end{bmatrix}$$

with the corresponding $\alpha_k$ being j, and ¼ of the code words are part of code words which are extracted from the $C_{PUSCH}(r)$ and meet the model $$\begin{bmatrix} u_i \\ \alpha_k u_i \end{bmatrix}$$

with the corresponding $\alpha_k$ being −j.

Optionally, the above-mentioned method also can have the following characteristics:

there are only 2 code words meeting the model $$\begin{bmatrix} u_i \\ \alpha_k u_i \end{bmatrix}$$

corresponding to the $u_i$ at most in the $C_{PUCCH}(r)$ when the values of the $u_i$ are the same.

Optionally, the above-mentioned method also can have the following characteristics:

when r=1, all code words of the $C_{PUSCH}(r)$ meet the model $$\begin{bmatrix} u_i \\ \alpha_k u_i \end{bmatrix},$$

the $u_i$ is one 4-dimension column vector, i=1, 2, 3 ... m, m is a positive integer and is multiple of 4; for every $u_i$, the $C_{PUSCH}(r)$ contains 4 code words $$\begin{bmatrix} u_i \\ u_i \end{bmatrix} \begin{bmatrix} u_i \\ ju_i \end{bmatrix} \begin{bmatrix} u_i \\ -u_i \end{bmatrix} \begin{bmatrix} u_i \\ -ju_i \end{bmatrix}$$

corresponding to the $\alpha_k = e^{j\pi(k-1)/2}$ in which k=1, 2, 3, 4; there are 4n different code words in the $C_{PUSCH}(r)$, noted as wherein, $$\bigcup_{i=1}^{n} \bigcup_{k=1}^{4} \left\{ \begin{bmatrix} v_i \\ \alpha_k v_i \end{bmatrix} \right\},$$

wherein, $v_i = [1 \ e^{j2\pi(i-1)/N} \ e^{j4\pi(i-1)/N} \ e^{j6\pi(i-1)/N}]^T$, and i=1, 2, 3 ... n, and N=16 or 32; the code words that form the $C_{PUCCH}(r)$ are all or part of the code words selected from $$\bigcup_{i=1}^{\frac{n}{2}} \bigcup_{k=1}^{4} \left\{ \begin{bmatrix} v_{2i-1} \\ \alpha_k v_{2i-1} \end{bmatrix} \right\};$$

or, the code words that form the $C_{PUCCH}(r)$ are all or part of the code words selected from $$\bigcup_{i=1}^{\frac{n}{2}} \bigcup_{k=1}^{4} \left\{ \begin{bmatrix} v_{2i} \\ \alpha_k v_{2i} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i-1} \\ \alpha_k v_{4i-1} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i-2} \\ \alpha_k v_{4i-2} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i-3} \\ \alpha_k v_{4i-3} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i} \\ \alpha_k v_{4i} \end{bmatrix} \right\}.$$

Optionally, the above-mentioned method also can have the following characteristics:

there are only 1 or 2 code words meeting the model $$\begin{bmatrix} v_i \\ \alpha_k v_i \end{bmatrix}$$

corresponding to the $v_i$ in the $C_{PUCCH}(r)$ when the values of the $v_i$ are the same in the codebook.

Optionally, the above-mentioned method also can have the following characteristics:

when r=2, the code words of the $C_{PUSCH}(r)$ meet the model $$\begin{bmatrix} u_i & u_{ii} \\ \alpha_k u_i & -\alpha_k u_{ii} \end{bmatrix},$$

the $u_i$ and $u_{ii}$ are the same or different 4 dimension vectors, the $C_{PUSCH}(r)$ has A cases that $u_i = u_{ii}$ and B cases that $u_i \neq u_{ii}$, A is a positive integer, B is a non-negative integer, and $\alpha_k$ has 2 values $\{1, j\}$ for each combination case of $(u_i, u_{ii})$, then:

the code words that form the $C_{PUCCH}(r)$ are all or part of the code words selected from the code words in the A cases that in $u_i = u_{ii}$ in the $C_{PUSCH}(r)$;

or, the code words that form the $C_{PUCCH}(r)$ are part of the code words which are extracted from the $C_{PUSCH}(r)$ and meet model $$\begin{bmatrix} u_i & u_{ii} \\ \alpha_k u_i & -\alpha_k u_{ii} \end{bmatrix}$$

with the corresponding $\alpha_k = 1$;

or, the code words that form the $C_{PUCCH}(r)$ are part of the code words which are extracted from the $C_{PUSCH}(r)$ and meet model $$\begin{bmatrix} u_i & u_{ii} \\ \alpha_k u_i & -\alpha_k u_{ii} \end{bmatrix}$$

with $u_i = u_{ii}$ and $\alpha_k = 1$;

or, half code words that form the $C_{PUCCH}(r)$ are code words which are extracted from the $C_{PUSCH}(r)$ and meet the model $$\begin{bmatrix} u_i & u_{ii} \\ \alpha_k u_i & -\alpha_k u_{ii} \end{bmatrix}$$

with the corresponding $\alpha_k = 1$; and half code words are code words which are extracted from the $C_{PUSCH}(r)$ and meet the model $$\begin{bmatrix} u_i & u_{ii} \\ \alpha_k u_i & -\alpha_k u_{ii} \end{bmatrix}$$

with the corresponding $\alpha_k=j$;

or, half code words that form the $C_{PUCCH}(r)$ are part of the code words selected from the code words in the A cases that $u_i=u_{ii}$ in the $C_{PUSCH}(r)$; the other half code words are part of the code words selected from the $C_{PUCCH}(r)$.

Optionally, the above-mentioned method also can have the following characteristics:

when r=3, all or part of the code words of the $C_{PUSCH}(r)$ meet the model $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, for each $u_i$ and $u_{ii}$ combination $(u_i, u_{ii})$, $\alpha_k$ corresponds to 4 values of $\{1,-1, j,-j\}$ respectively, then:

the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being $\{1,-1\}$;

or, the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being $\{1, j\}$;

or, the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being $\{-1,-j\}$;

or, the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being 1;

or, the code words that form $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being $-1$.

Optionally, the above-mentioned method also can have the following characteristics:

when r=3, all or part of the code words of the $C_{PUSCH}(r)$ meet the model $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, for each $u_i$ and $u_{ii}$ combination $(u_i, u_{ii})$, $\alpha_k$ is corresponding to 2 values of $\{1,-1\}$ respectively, then:

the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being 1;

or, the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being $-1$.

Optionally, the above-mentioned method also can have the following characteristics:

when r=3, the $C_{PUSCH}(r)$ comprises an even number of code words, and half of an even number of code words meet the model $$\begin{bmatrix} u_i & u_i & u_{ii} \\ \alpha_k u_i & -\alpha_k u_i & \alpha_k u_{ii} \end{bmatrix},$$

and the other half meet $$\begin{bmatrix} u_{ii} & u_{ii} & u_i \\ \alpha_k u_{ii} & -\alpha_k u_{ii} & \alpha_k u_i \end{bmatrix}$$

corresponding to the $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, and $\alpha_k$ corresponds to the subset of $\{1,-1, j,-j\}$ or $\{1,-1, j,-j\}$, then:

the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix};$$

or, the code words that form the $C_{PUCCH}(r)$ are all or part of the code words which are selected from the $C_{PUSCH}(r)$ and meet the model $$\begin{bmatrix} u_{ii} & u_{ii} & u_i \\ \alpha_k u_{ii} & -\alpha_k u_{ii} & \alpha_k u_i \end{bmatrix};$$

or, half of the code words that form the $C_{PUCCH}(r)$ are part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix},$$

and the other half of code words are the code words meeting the $$\begin{bmatrix} u_{ii} & u_{ii} & u_i \\ \alpha_k u_{ii} & -\alpha_k u_{ii} & \alpha_k u_i \end{bmatrix}$$

corresponding to the $$\begin{bmatrix} u_i & u_i & u_{ii} \\ \alpha_k u_i & -\alpha_k u_i & \alpha_k u_{ii} \end{bmatrix}.$$

Optionally, the above-mentioned method also can have the following characteristics:

when r=4, all or part of the code words of the $C_{PUSCH}(r)$ meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

wherein, the $u_i$ and $u_{ii}$ are different 4-dimension vectors, and for each $u_i$ and $u_{ii}$ combination $(u_i, u_{ii})$, i=a and ii=b is equivalent to i=b and ii=a; for each combination $(u_i, u_{ii})$, $\alpha_k$ corresponds to 2 values of $\{1,-1\}$ respectively, then:

the code words that form the $C_{PUCCH}(r)$ are all or part of the code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

and $\alpha_k$ corresponds to 1;

or, the code words that form the $C_{PUCCH}(r)$ are all or part of the code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

and $\alpha_k$ corresponds to j;

or, half of code words that form the $C_{PUCCH}(r)$ are part of the code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

and $\alpha_k$ corresponds to 1; the other half of code words that form the $C_{PUCCH}(r)$ are part of the code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

and $\alpha_k$ corresponds to j.

Optionally, the above-mentioned method also can have the following characteristics: the codebook obtained after the conversion of exchanging the columns of the code words arbitrarily, multiplying by constant coefficient, or exchanging the rows of all code words together has been performed for the $C_{PUCCH}(r)$ and the $C_{PUSCH}(r)$ is equivalent to the codebook before the conversion.

In order to solve the above-mentioned problem, the present invention further provides a method for feeding back channel status information, comprising: a terminal in long term evolution-advanced (LTE-A) quantizing the channel status information by using a codebook, and feeding back the channel status information through a physical uplink control channel; when the channel status information is fed back on the physical uplink control channel, code words in a used first sub codebook $C_{PUCCH}^1(r)$ with layer number or rank being r are part of the code words in the first codebook $C_{PUSCH}^1(r)$ with the layer number or the rank being r in the overall codebook defined in the LTE-A, and/or, code words in a used second sub codebook $C_{PUCCH}^2(r)$ with layer number or rank being r are part of the code words in the second codebook $C_{PUSCH}^2(r)$ with the layer number or the rank being r in the overall codebook defined in the LTE-A; the $C_{PUCCH}(r)$ is a single codebook equivalent to codebooks $C_{PUCCH}^1(r)$ and $C_{PUCCH}^2(r)$; and the $C_{PUCCH}(r)$ is equivalent to a set formed by all new code words which can be indicated through one function F1 by all code words in the codebook $C_{PUCCH}^1(r)$ and all code words of $C_{PUCCH}^2(r)$ together; and the $C_{PUSCH}(r)$ is a virtual single codebook equivalent to codebooks $C_{PUSCH}^1(r)$ and $C_{PUSCH}^2(r)$; and the $C_{PUSCH}(r)$ is equivalent to a set formed by all new code words which can be indicated through one function F1 by all code words in the codebook $C_{PUSCH}^1$ and all code words of $C_{PUSCH}^2$ together.

Optionally, the above-mentioned method also can have the following characteristics:

when r=1 or 2, the $C_{PUSCH}(r)$ has repetitive code words, and the $C_{PUCCH}(r)$ does not have repetitive code words.

Optionally, the above-mentioned method also can have the following characteristics:

the method further comprises: a base station notifying a terminal of following information through a high layer signaling:

what code words in the $C_{PUSCH}(r)$ compose the code words in the $C_{PUCCH}(r)$;

or, what code words in the $C_{PUSCH}{}^1(r)$ compose the code words in the $C_{PUSCH}{}^1(r)$;

or, what code words in the $C_{PUSCH}{}^2(r)$ compose the code words in the $C_{PUCCH}{}^2(r)$;

or, what code words in the $C_{PUSCH}{}^1(r)$ compose the code words in the $C_{PUSCH}{}^1(r)$, and what code words in the $C_{PUCCH}{}^2(r)$ composes the code words in the $C_{PUSCH}{}^2(r)$.

Optionally, the above-mentioned method also can have the following characteristics:

when r=1, all code words of the $C_{PUSCH}(r)$ meet the model $$\begin{bmatrix} u_i \\ \alpha_k u_i \end{bmatrix},$$

the $u_i$ is one 4-dimension column vector, i=1, 2, 3 . . . m, m is a positive integer, and k=1, 2, 3, 4, and $\alpha_k = e^{j\pi(k-1)/2}$; for every $u_i$, the $C_{PUSCH}(r)$ contains the 4 code words $$\begin{bmatrix} u_i \\ u_i \end{bmatrix} \begin{bmatrix} u_i \\ ju_i \end{bmatrix} \begin{bmatrix} u_i \\ -u_i \end{bmatrix} \begin{bmatrix} u_i \\ -ju_i \end{bmatrix}$$

corresponding to the $\alpha_k = e^{j\pi(k-1)/2}$ in which k=1, 2, 3, 4, then:

the code words that form the $C_{PUCCH}(r)$ are all or part of the code words which are extracted from the $C_{PUSCH}(r)$ and meet the model $$\begin{bmatrix} u_i \\ \alpha_k u_i \end{bmatrix}$$

with the corresponding $\alpha_k$ being {1,−1};

or, the code words that form the $C_{PUCCH}(r)$ are all or part of the code words which are extracted from the $C_{PUSCH}(r)$ and meet model $$\begin{bmatrix} u_i \\ \alpha_k u_i \end{bmatrix}$$

with the corresponding $\alpha_k$ being {j,−j};

or, half of code words that form the $C_{PUCCH}(r)$ are part of the code words which are extracted from the $C_{PUSCH}(r)$ and meet the model $$\begin{bmatrix} u_i \\ \alpha_k u_i \end{bmatrix}$$

with the corresponding $\alpha_k$ being {1,−1}, and the other half of code words are part of the code words which are extracted from the $C_{PUSCH}(r)$ and meet the model $$\begin{bmatrix} u_i \\ \alpha_k u_i \end{bmatrix}$$

with the corresponding $\alpha_k$ being {j,−j};

or, ¼ of the code words that form the $C_{PUCCH}(r)$ are part of the code words which are extracted from the $C_{PUSCH}(r)$ and meet the model $$\begin{bmatrix} u_i \\ \alpha_k u_i \end{bmatrix}$$

with the corresponding $\alpha_k$ being 1, ¼ of the code words are part of the code words which are extracted from the $C_{PUSCH}(r)$ and meet the model $$\begin{bmatrix} u_i \\ \alpha_k u_i \end{bmatrix}$$

with the corresponding $\alpha_k$ being −1, ¼ of the code words are part of the code words which are extracted from the $C_{PUSCH}(r)$ and meet the model $$\begin{bmatrix} u_i \\ \alpha_k u_i \end{bmatrix}$$

with the corresponding $\alpha_k$ being j, and ¼ of the code words are part of the code words which are extracted from the $C_{PUSCH}(r)$ and meet the model $$\begin{bmatrix} u_i \\ \alpha_k u_i \end{bmatrix}$$

with the corresponding $\alpha_k$ being −j.

Optionally, the above-mentioned method also can have the following characteristics:

there are only 2 code words meeting the model $$\begin{bmatrix} u_i \\ \alpha_k u_i \end{bmatrix}$$

corresponding to the $u_i$ at most in the $C_{PUCCH}(r)$ when the values of the $u_i$ are the same.

Optionally, the above-mentioned method also can have the following characteristics:

when r=1, all code words of the $C_{PUSCH}(r)$ meet the model $$\begin{bmatrix} u_i \\ \alpha_k u_i \end{bmatrix},$$

the is one 4-dimension column vector, i=1, 2, 3 . . . m, m is a positive integer and is multiple of 4; for every $u_i$, the $C_{PUSCH}(r)$ contains the 4 code word models $$\begin{bmatrix} u_i \\ u_i \end{bmatrix} \begin{bmatrix} u_i \\ ju_i \end{bmatrix} \begin{bmatrix} u_i \\ -u_i \end{bmatrix} \begin{bmatrix} u_i \\ -ju_i \end{bmatrix}$$

of the $\alpha_k = e^{j\pi(k-1)/2}$ in which k=1, 2, 3, 4; there are 4n different code words in the $C_{PUSCH}(r)$, noted as $$\bigcup_{i=1}^{n} \bigcup_{k=1}^{4} \left\{ \begin{bmatrix} v_i \\ \alpha_k v_i \end{bmatrix} \right\},$$

wherein, $v_i = [1 \ e^{j2\pi(i-1)/N} \ e^{j4\pi(i-1)/N} \ e^{j6\pi(i-1)/N}]^T$, and i=1, 2, 3 . . . n, and N=16 or 32;

the code words that form the $C_{PUCCH}(r)$ are all or part of the code words selected from $$\bigcup_{i=1}^{\frac{n}{2}} \bigcup_{k=1}^{4} \left\{ \begin{bmatrix} v_{2i-1} \\ \alpha_k v_{2i-1} \end{bmatrix} \right\};$$

or, the code words that form the $C_{PUCCH}(r)$ are all or part of the code words selected from $$\bigcup_{i=1}^{\frac{n}{2}} \bigcup_{k=1}^{4} \left\{ \begin{bmatrix} v_{2i} \\ \alpha_k v_{2i} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i-1} \\ \alpha_k v_{4i-1} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i-2} \\ \alpha_k v_{4i-2} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i-3} \\ \alpha_k v_{4i-3} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i} \\ \alpha_k v_{4i} \end{bmatrix} \right\}.$$

Optionally, the above-mentioned method also can have the following characteristics:

there are only 1 or 2 code words meeting the model $$\begin{bmatrix} v_i \\ \alpha_k v_i \end{bmatrix}$$

corresponding to the $v_i$ in the $C_{PUCCH}(r)$ when the values of the $v_i$ are the same in the codebook.

Optionally, the above-mentioned method also can have the following characteristics:

when r=2, the code words of the $C_{PUSCH}(r)$ meet the model $$\begin{bmatrix} u_i & u_{ii} \\ \alpha_k u_i & -\alpha_k u_{ii} \end{bmatrix},$$

the $u_i$ and $u_{ii}$ are the same or different 4-dimension vectors, the $C_{PUSCH}(r)$ has A cases that $u_i = u_{ii}$ and B cases that $u_i \neq u_{ii}$, A is a positive integer, B is a nonnegative integer, and $\alpha_k$ has 2 values $\{1, j\}$ for each combination case of $(u_i, u_{ii})$, then:

the code words that form the $C_{PUCCH}(r)$ are all or part of the code words selected from the code words in the A cases that $u_i = u_{ii}$ in the $C_{PUSCH}(r)$;

or, the code words that form the $C_{PUCCH}(r)$ are part of the code words which are extracted from the $C_{PUSCH}(r)$ and meet model $$\begin{bmatrix} u_i & u_{ii} \\ \alpha_k u_i & -\alpha_k u_{ii} \end{bmatrix}$$

with the corresponding $\alpha_k = 1$;

or, the code words that form the $C_{PUCCH}(r)$ are part of the code words which are extracted from the $C_{PUSCH}(r)$ and meet model $$\begin{bmatrix} u_i & u_{ii} \\ \alpha_k u_i & -\alpha_k u_{ii} \end{bmatrix}$$

with $u_i = u_{ii}$ and $\alpha_k = 1$;

or, half of code words that form the $C_{PUCCH}(r)$ are the code words which are extracted from the $C_{PUSCH}(r)$ and meet the model $$\begin{bmatrix} u_i & u_{ii} \\ \alpha_k u_i & -\alpha_k u_{ii} \end{bmatrix}$$

with the corresponding $\alpha_k = 1$; and the other half of code words are the code words which are extracted from the $C_{PUSCH}(r)$ and meet the model $$\begin{bmatrix} u_i & u_{ii} \\ \alpha_k u_i & -\alpha_k u_{ii} \end{bmatrix}$$

with the corresponding $\alpha_k = j$;

or, half of code words that form the $C_{PUCCH}(r)$ are part of the code words selected from the code words in the A cases that $u_i=u_{ii}$ in the $C_{PUSCH}(r)$; the other half of code words are part of the code words selected from the $C_{PUCCH}(r)$.

Optionally, the above-mentioned method also can have the following characteristics:

when r=3, all or part of the code words of the $C_{PUSCH}(r)$ meet the model $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ different 4-dimension vectors, for each $u_i$ and $u_{ii}$ combination $(u_i, u_{ii})$, $\alpha_k$ is corresponding to 4 values of $\{1,-1, j,-j\}$ respectively, then:

the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being $\{1,-1\}$;

or, the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being $\{1, j\}$;

or, the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being $\{-1,-j\}$;

or, the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being 1;

or, the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being $-1$.

Optionally, the above-mentioned method also can have the following characteristics:

when r=3, all or part of the code words of the $C_{PUSCH}(r)$ meet the model $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, for each $u_i$ and $u_{ii}$ combination $(u_i, u_{ii})$, $\alpha_k$ corresponds to 2 values of $\{1,-1\}$ respectively, then:

the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being 1;

or, the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix}$$

with the $\alpha_k$ being $-1$.

Optionally, the above-mentioned method also can have the following characteristics:

when r=3, the $C_{PUSCH}(r)$ comprises an even number of code words, and half of even number of code words meet the model $$\begin{bmatrix} u_i & u_i & u_{ii} \\ \alpha_k u_i & -\alpha_k u_i & \alpha_k u_{ii} \end{bmatrix},$$

and the other half meet $$\begin{bmatrix} u_{ii} & u_{ii} & u_i \\ \alpha_k u_{ii} & -\alpha_k u_{ii} & \alpha_k u_i \end{bmatrix}$$

corresponding to the $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, and $\alpha_k$ corresponds $\{1,-1, j,-j\}$ to the subset of or $\{1,-1, j,-j\}$, then:

the code words that form the $C_{PUCCH}(r)$ are all or part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix};$$

or, the code words that form the $C_{PUCCH}(r)$ are all or part of the code words which are selected from the $C_{PUSCH}(r)$ and meet the model $$\begin{bmatrix} u_{ii} & u_{ii} & u_i \\ \alpha_k u_{ii} & -\alpha_k u_{ii} & \alpha_k u_i \end{bmatrix};$$

or, half of code words that form $C_{PUCCH}(r)$ are part of the code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix},$$

and the other half code words are the code words meeting the $$\begin{bmatrix} u_{ii} & u_{ii} & u_i \\ \alpha_k u_{ii} & -\alpha_k u_{ii} & \alpha_k u_i \end{bmatrix}$$

corresponding to the $$\begin{bmatrix} u_i & u_i & u_{ii} \\ \alpha_k u_i & -\alpha_k u_i & \alpha_k u_{ii} \end{bmatrix}.$$

Optionally, the above-mentioned method also can have the following characteristics:

when r=4, all or part of the code words of the $C_{PUSCH}(r)$ meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

wherein, the $u_i$ and $u_{ii}$ are different 4-dimension vectors, and for each $u_i$ and $u_{ii}$ combination $(u_i, u_{ii})$, i=a and ii=b is equivalent to i=b and ii=a; for each combination $(u_i, u_{ii})$, $\alpha_k$ corresponds to 2 values of respectively, then:

the code words that form the $C_{PUCCH}(r)$ are all or part of the code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

and $\alpha_k$ corresponds to 1;

or, the code words that form the $C_{PUCCH}(r)$ are all or part of the code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

and $\alpha_k$ corresponds to j;

or, half of code words that form the $C_{PUCCH}(r)$ are part of the code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

and $\alpha_k$ corresponds to 1; the other half of code words that form the $C_{PUCCH}(r)$ are part of the code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

and $\alpha_k$ corresponds to j.

Optionally, the above-mentioned method also can have the following characteristics: the codebook obtained after the conversion of exchanging the columns of the code words arbitrarily, multiplying by constant coefficient or exchanging the rows of all code words together has been performed for the $C_{PUCCH}(r)$ and the $C_{PUSCH}(r)$ is equivalent to the codebook before the conversion.

The present invention further provides a terminal, comprising:

a quantization unit, configured to quantize channel status information by using a codebook in long term evolution-advanced (LTE-A); and a feedback unit, configured to feed back the channel status information through a physical uplink control channel;

wherein, the quantization module is configured as follows:

a code word contained in the used codebook $C_{PUCCH}(r)$ with layer number or rank being r is a subset of the code word contained in the codebook $C_{PUSCH}(r)$ with the layer number or the rank being r in the overall codebook defined in the LTE-A;

the $C_{PUCCH}(r)$ is a single codebook or a single codebook equivalent to dual codebooks; and the $C_{PUSCH}(r)$ is a single codebook or a single codebook equivalent to dual codebooks; and the single codebook equivalent to the dual codebooks means that the actually used codebook is an actually defined single codebook, however, 2 pre-coding matrix identifiers are required to determine the codebook of the code word therein for a certain r.

Optionally, when r=1 or 2, the $C_{PUSCH}(r)$ has repetitive code words, and the $C_{PUCCH}(r)$ does not have repetitive code words.

Optionally, the terminal further comprises:

a receiving module, configured to receive a high layer signaling sent by a base station and acquire what code words in the $C_{PUSCH}(r)$ compose the code word in the $C_{PUCCH}(r)$ from the high layer signaling.

Optionally, the codebook obtained after the conversion of exchanging the columns of the code words arbitrarily, multiplying by constant coefficient or exchanging the rows of all code words together has been performed for the $C_{PUCCH}(r)$ and the $C_{PUSCH}(r)$ is equivalent to the codebook before the conversion.

The present invention further provides another terminal, comprising:

a quantization unit, configured to quantize channel status information by using dual codebooks in long term evolution-advanced (LTE-A); and a feedback unit, configured to feed back the channel status information through a physical uplink control channel;

wherein, the quantization module is configured as follows: code words in a used first sub codebook $C_{PUCCH}^{1}(r)$ with layer number or rank being r are part of the code words in the first codebook $C_{PUSCH}^{1}(r)$ with the layer number or the rank being r in the overall codebook defined in the LTE-A, and/or, code words in a used second sub codebook $C_{PUCCH}^{2}(r)$ with layer number or rank being r are part of the code words in the second codebook $C_{PUSCH}^{2}(r)$ with the layer number or the rank being r in the overall codebook defined in the LTE-A;

the $C_{PUCCH}(r)$ is a single codebook equivalent to codebooks $C_{PUCCH}^{1}(r)$ and $C_{PUCCH}^{2}(r)$; and the $C_{PUCCH}(r)$ is equivalent to a set formed by all new code words which can be indicated through one function F1 by all code words in the codebook $C_{PUCCH}^{1}(r)$ and all code words of $C_{PUCCH}^{2}(r)$ together; and the $C_{PUSCH}(r)$ is a virtual single codebook equivalent to codebooks $C_{PUSCH}^{1}(r)$ and $C_{PUSCH}^{2}(r)$; and the $C_{PUSCH}(r)$ is equivalent to a set formed by all new code words which can be indicated through one function F1 by all code words in the codebook $C_{PUSCH}^{1}(r)$ and all code words of $C_{PUSCH}^{2}(r)$ together.

Optionally, when r=1 or 2, the $C_{PUSCH}(r)$ has repetitive code words, and the $C_{PUCCH}(r)$ does not have repetitive code words.

Optionally, the terminal further comprises:

a receiving module, configured to receive a high layer signaling sent by a base station and acquire following information from the high layer signaling:

what code words in the $C_{PUSCH}(r)$ compose the code words in the $C_{PUCCH}(r)$;

or, what code words in the $C_{PUSCH}^{1}(r)$ compose the code words in the $C_{PUSCH}^{1}(r)$;

or, what code words in the $C_{PUSCH}^{2}(r)$ compose the code words in the $C_{PUCCH}^{2}(r)$;

or, what code words in the $C_{PUSCH}^{1}(r)$ compose the code words in the $C_{PUSCH}^{1}(r)$, and what code words in the $C_{PUCCH}^{2}(r)$ compose the code words in the $C_{PUSCH}^{2}(r)$.

Optionally, the codebook obtained after the conversion of exchanging the columns of the code words arbitrarily, multiplying by constant coefficient or exchanging the rows of all code words together has been performed for the $C_{PUCCH}(r)$ and the $C_{PUSCH}(r)$ is equivalent to the codebook before the conversion.

Through the above-mentioned scheme, it can ensure the precision of the PMI feedback under the limited overhead, make the CSI feedback on the PUCCH still be able to more effectively support the pre-coding technology and have good compatibility with the feedback on the PUSCH.

PREFERRED EMBODIMENTS OF THE PRESENT INVENTION

Figure 1:
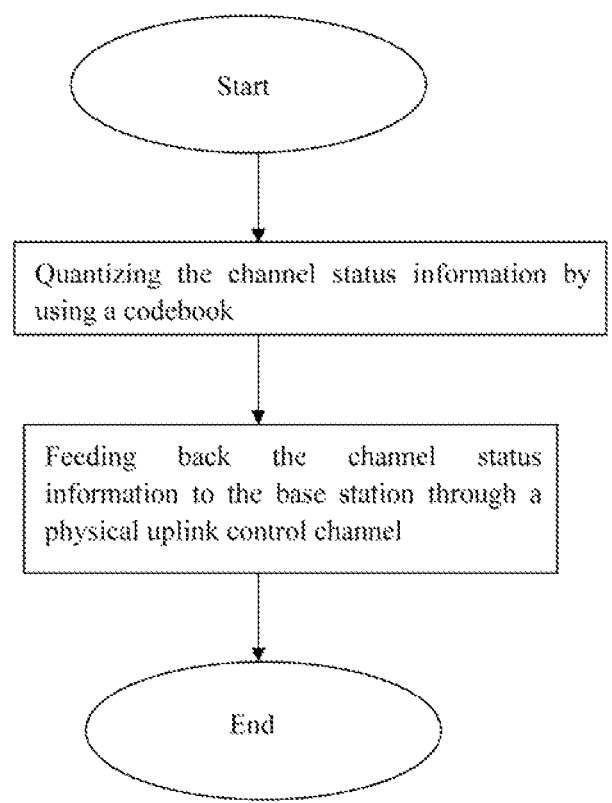
FIG. 1 is a flowchart of a method for feeding back channel status information by a terminal in long term evolution-advanced (LTE-A) in accordance with an embodiment of the present invention.
Figure 2:
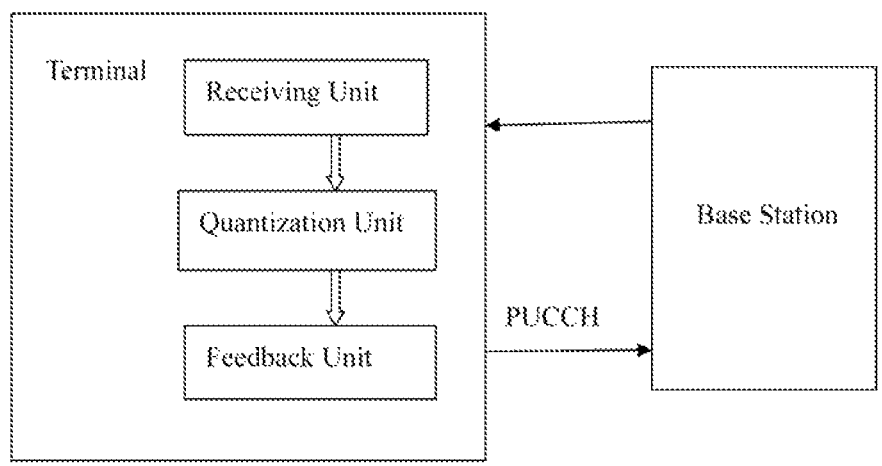
FIG. 2 is a block diagram of a terminal communicated with a base station in accordance with an embodiment of the present invention.

The first problem concerned by the embodiment of the present invention is the problem brought by increasing the PMI1 and the PMI2 feedback overhead when the LTE-A uses the feedback with enhanced precision. The idea of the technology described in the following embodiments is applied to the case of the single codebook feedback and the case of the single codebook feedback equivalent to the dual codebooks, and also is applied to the case of dual codebooks. If it is the dual codebooks feedback, it can be also equivalently understood as the feedback case of the single codebook equivalent to the dual codebooks, which all belong to the range contained by the idea of the present invention.

The second problem concerned by the embodiment of the present invention is: the problem of the excessive overhead when the codebook corresponding to the PMI1 and the RI are transmitted together or the problem of the excessive overhead when the PMI2 and the CQI are transmitted. The concerned codebook is primarily directed to the codebook corresponding to the PMI1 and/or the codebook corresponding to the PMI2.

The main idea of the embodiment of the present invention is, in the mode that the PM1 and the PM2 are fed back in an identical subframe/different subframes, the code words in the codebook $C_{PUCCH}$ used by feeding back the channel status information on the physical uplink control channel (PUCCH) are formed by part of the code words selected from the overall codebook defined in the LTE-A, that is, the $C_{PUCCH}$ is a subset of the $C_{PUSCH}$.

The $C_{PUCCH}$ and the $C_{PUSCH}$ in the application of the dual codebooks are the codebooks corresponding to W. Other ones are similar to the idea of the embodiment of the present invention, the feature description regarding the codebooks corresponding to W1 and W2 can be regarded as an equivalent method contained by the present invention according to introduced content in background technology.

For example, the codebook $C_{PUCCH}^{1}$ corresponding to the W1 used by the PUCCH is a subset of the codebook $C_{PUSCH}^{1}$ corresponding to the W1 used by the PUSCH, and/or the codebook $C_{PUCCH}^{2}$ corresponding to the W2 used by the PUCCH is a subset of the codebook $C_{PUSCH}^{2}$ corresponding to the W2 used by the PUSCH. The description is included in the description that the $C_{PUCCH}$ is a subset of the $C_{PUSCH}$, which belongs to an equivalent method of the present invention.

The embodiment of the present invention provides a method for feeding back channel status information, wherein a terminal in long term evolution-advanced (LTE-A) quantizes the channel status information by using a codebook, and feeds back the channel status information through a physical uplink control channel; when the channel status information is fed back on the physical uplink control channel, code words contained in the used codebook $C_{PUCCH}(r)$ with the layer number or rank being r is a subset of the code words contained in the codebook $C_{PUSCH}(r)$ with the layer number or the rank being r in the overall codebook defined in the LTE-A;

wherein, the $C_{PUCCH}(r)$ is a single codebook or a single codebook equivalent to dual codebooks; and the $C_{PUSCH}(r)$ is a single codebook or a single codebook equivalent to dual codebooks; and the single codebook equivalent to the dual codebooks means that the actually used codebook is an actually defined single codebook, however, 2 pre-coding matrix identifiers are required to determine the codebook of the code words therein for a established r.

The embodiment of the present invention further provides a terminal, including:

a quantization unit, configured to quantize channel status information by using a codebook in long term evolution-advanced (LTE-A); and a feedback unit, configured to feed back the channel status information through a physical uplink control channel;

wherein, the quantization module is configured as that:

code words contained in the used codebook $C_{PUCCH}(r)$ with the layer number or rank being r is a subset of the code words contained in the codebook $C_{PUSCH}(r)$ with the layer number or the rank being r in the overall codebook defined in the LTE-A;

the $C_{PUCCH}(r)$ is a single codebook or a single codebook equivalent to dual codebooks; and the $C_{PUSCH}(r)$ is a single codebook or a single codebook equivalent to dual codebooks; and the single codebook equivalent to the dual codebooks means that the actually used codebook is an actually defined single codebook, however, 2 pre-coding matrix identifiers are required to determine the codebook of the code words therein for an established r.

Optionally, when r=1 or 2, the $C_{PUSCH}(r)$ has repetitive code words, and the $C_{PUCCH}(r)$ does not have repetitive code words.

Optionally, the terminal further includes:

a receiving module, configured to receive a high layer signaling sent by a base station and obtain what code words in the $C_{PUSCH}(r)$ compose the code words in the $C_{PUCCH}(r)$ from the high layer signaling.

The embodiment of the present invention further provides another method for feeding back channel status information, comprising: a terminal in long term evolution-advanced (LTE-A) quantizing the channel status information by using a codebook, and feeding back the channel status information through a physical uplink control channel; wherein, when the channel status information is fed back on the physical uplink control channel, code words in a used first sub codebook $C_{PUCCH}^1(r)$ with the layer number or rank being r are part of the code words in the first codebook $C_{PUSCH}^1(r)$ with the layer number or the rank being r in the overall codebook defined in the LTE-A, and/or, code words in a used second sub codebook $C_{PUCCH}^2(r)$ with the layer number or rank being r are part of the code words in the second codebook $C_{PUSCH}^2(r)$ with the layer number or the rank being r in the overall codebook defined in the LTE-A;

the $C_{PUCCH}(r)$ is a single codebook equivalent to codebooks $C_{PUCCH}^1(r)$ and $C_{PUCCH}^2(r)$; and the $C_{PUCCH}(r)$ is equivalent to a set formed by all new code words which can be indicated through one function F1 by all code words in the codebook $C_{PUCCH}(r)$ and all code words of $C_{PUCCH}^2(r)$ together; and the $C_{PUSCH}(r)$ is a virtual single codebook equivalent to codebooks $C_{PUSCH}^1(r)$ and $C_{PUSCH}^2(r)$; and the $C_{PUSCH}$ is equivalent to a set formed by all new code words which can be indicated through one function F1 by all code words in the codebook $C_{PUSCH}^1(r)$ and all code words of $C_{PUSCH}^2(r)$ together.

The embodiment of the present invention further provides a terminal, including:

a quantization unit, configured to quantize channel status information by using dual codebooks in long term evolution-advanced (LTE-A); and a feedback unit, configured to feed back the channel status information through a physical uplink control channel;

wherein, the quantization module is configured as that:

code words in a used first sub codebook $C_{PUCCH}^1(r)$ with the layer number or rank being r are part of the code words in the first codebook $C_{PUSCH}^1(r)$ with the layer number or the rank being r in the overall codebook defined in the LTE-A, and/or, code words in a used second sub codebook $C_{PUCCH}^2(r)$ with the layer number or the rank being r are part of the code words in the second codebook $C_{PUSCH}^2(r)$ with the layer number or the rank being r in the overall codebook defined in the LTE-A;

the $C_{PUCCH}(r)$ is a single codebook equivalent to codebooks $C_{PUCCH}^1(r)$ and $C_{PUCCH}^2(r)$; and the $C_{PUCCH}(r)$ is equivalent to a set formed by all new code words which can be indicated through one function F1 by all code words in the codebook $C_{PUCCH}(r)$ and all code words of $C_{PUCCH}^2(r)$ together; and the $C_{PUSCH}(r)$ is a virtual single codebook equivalent to codebooks $C_{PUSCH}^1(r)$ and $C_{PUSCH}^2(r)$; and the $C_{PUSCH}(r)$ is equivalent to a set formed by all new code words which can be indicated through one function F1 by all code words in the codebook $C_{PUSCH}^1(r)$ and all code words of $C_{PUSCH}^2(r)$ together.

Optionally, when r=1 or 2, the $C_{PUSCH}(r)$ has repetitive code words, and the $C_{PUCCH}(r)$ does not have repetitive code words.

Optionally, the terminal further includes:

a receiving module, configured to receive a high layer signaling sent by a base station and obtain following information from the high layer signaling:

what code words in the $C_{PUSCH}(r)$ compose the code words in the $C_{PUCCH}(r)$;

or, what code words in the $C_{PUSCH}^1(r)$ compose the code words in the $C_{PUCCH}^1(r)$;

or, what code words in the $C_{PUSCH}^2(r)$ compose the code words in the $C_{PUCCH}^2(r)$;

or, what code words in the $C_{PUSCH}^1(r)$ compose the code words in the $C_{PUSCH}^1(r)$, and what code words in the $C_{PUCCH}^2(r)$ compose the code words in the $C_{PUSCH}^2(r)$.

The relationship of the $C_{PUCCH}$ and the $C_{PUSCH}$ can be determined by two ways:

Way 1: the Way of High Layer Signaling Notification the system supports the self-defining of the $C_{PUCCH}$, the base station notifies the terminal through the high layer signaling what code words of the $C_{PUSCH}$ compose the $C_{PUCCH}$. The high layer signaling can use the bitmap when notifying what code words of the $C_{PUSCH}$ compose the $C_{PUCCH}$. This way is very flexible and the $C_{PUCCH}$ can be self-defined by the base station according to the present channel environment.

Way 2: the Way of Predefining the way of predefining has different modes for each Rank and various kinds of different codebooks.

The code words in the $C_{PUSCH}$ is designed mainly aiming at the bipolar channel and have more models and characteristics. The present invention provides a rule to select the most effective code word combination to form the $C_{PUCCH}$ based on some $C_{PUSCH}$ codebooks with the characteristics that can be described.

Method 1:

the dual codebooks are used to feed back the channel information W represented by two PMIs together, or a single code equivalent to the dual codebooks is used to feed back the channel information quantization value W matrix represented by two PMIs together, which has $2^{B_1}$ kinds of values. Generally there is no repetitive code word matrix in various kinds of possible code word matrix cases represented by the single codebook, however, in the dual codebooks or in the single codebook equivalent to the dual codebooks feedback, there are repetitive code words in the W identified by different PMI1 and PMI2 combinations. The occurrence of repetitive code words is to solve some problems brought by the PMI1 broadband feedback and the PMI2 subband feedback and improve the system performance. But for the $C_{PUCCH}$, the fed back information is mainly the broadband information, such as the PMI1 of the broadband and the PMI2 of the broadband, so there is no need to have repetitive code words in the single codebook equivalent to the dual codebooks used by the PUCCH, or the dual codebooks, and the codebooks represented virtually by the function F. The number of effective code words will be reduced if the repetitive code words exist, which cannot ensure the performance.

If the actual feedback mode of the $C_{PUSCH}$ is the dual codebooks and dual PMIs feedback or the single codebook equivalent to the dual codebooks and dual PMIs feedback, and has the repetitive code words, then the single codebook or the dual codebooks defined in the $C_{PUCCH}$ would not have the repetitive code words. That is, the $C_{PUCCH}$ is the single codebook or the dual codebooks formed by the non-repetitive code words selected from the $C_{PUSCH}$.

The $C_{PUSCH}$ is the single codebook equivalent to the dual codebooks, or is the virtual single codebook equivalent to the dual codebooks.

Method 2 (the Method when Describing Rank1):

the dual codebooks is used to feed back the channel information W represented by two PMIs together, or a single code equivalent to the dual codebooks is used to feed back the channel information W represented by two PMIs together, which has various kinds of structure features, the $C_{PUSCH}$ represents the overall codebook, and is the actually defined or virtually defined single codebook equivalent to the dual codebooks. The $C_{PUCCH}$ represents the codebook used on the PUCCH, and is the actually defined or virtually defined single codebook equivalent to the dual codebooks. When the code words require to be extracted from the $C_{PUSCH}$ codebook to form the code words in the $C_{PUCCH}$ codebook, some code word combinations with more effective structure are selected from these structures.

For example, for Rank1 (that is, Rank=1, r=1):

all or part of the code words of the $C_{PUSCH}$ Rank1 codebook meet the model $$\begin{bmatrix} u_i \\ \alpha_k u_i \end{bmatrix},$$

the $u_i$ is one 4-dimension column vector, and i=1, 2, 3 . . . m, wherein, the value of m is a positive integer, k=1, 2, 3, 4, and $\alpha_k$ corresponds to 4 values of $\{1,-1,j,-j\}$ respectively. $\alpha_k = e^{j\alpha(k-1)/2}$; for every $u_i$, the $C_{PUSCH}(r)$ contains 4 code words $$\begin{bmatrix} u_i \\ u_i \end{bmatrix} \begin{bmatrix} u_i \\ ju_i \end{bmatrix} \begin{bmatrix} u_i \\ -u_i \end{bmatrix} \begin{bmatrix} u_i \\ -ju_i \end{bmatrix}$$

corresponding to the $\alpha_k = e^{j\pi(k-1)/2}$ wherein k=1, 2, 3, 4.

A typical $u_i = \tau[1 \ e^{j\theta_i} \ e^{j2\theta_i} \ e^{j3\theta_i}]^T$ (but not limited to this case), wherein, $\tau$ is a constant coefficient, and $\theta_i \in [0, 2\pi]$.

For the case that the dual codebooks or the single codebook equivalent to the dual codebooks has no repetitive code words, $u_i$ varies from each other; for the case that the dual codebooks or the single codebook equivalent to the dual codebooks has the repetitive code words, as to different values of i, and the $u_i$ may be equal.

Whether it is the case that the dual codebooks or the single codebook equivalent to the dual codebooks has no repetitive code words or the case without the repetitive code words, for any value of i, at least 4 corresponding code words meeting the model $$\begin{bmatrix} u_i \\ \alpha_k u_i \end{bmatrix}$$

in the $C_{PUSCH}$ are:

$$\begin{bmatrix} u_i \\ \alpha_1 u_i \end{bmatrix} \cdots \begin{bmatrix} u_i \\ \alpha_4 u_i \end{bmatrix}.$$

So when all code words meet the above-mentioned model in the $C_{PUSCH}$, the single codebook equivalent to the dual codebooks is $$\bigcup_{i=1}^{m} \bigcup_{k=1}^{4} \left\{ \begin{bmatrix} u_i \\ \alpha_k u_i \end{bmatrix} \right\},$$

i=1, 2, 3 . . . m, that is to say, the $C_{PUSCH}$ includes 4m code words:

$$\left\{ \begin{bmatrix} u_1 \\ \alpha_1 u_1 \end{bmatrix}, \begin{bmatrix} u_1 \\ \alpha_2 u_1 \end{bmatrix}, \begin{bmatrix} u_1 \\ \alpha_3 u_1 \end{bmatrix}, \begin{bmatrix} u_1 \\ \alpha_4 u_1 \end{bmatrix} \cdots \begin{bmatrix} u_m \\ \alpha_1 u_m \end{bmatrix}, \begin{bmatrix} u_m \\ \alpha_2 u_m \end{bmatrix}, \begin{bmatrix} u_m \\ \alpha_3 u_m \end{bmatrix}, \begin{bmatrix} u_m \\ \alpha_4 u_m \end{bmatrix} \right\}.$$

If the $C_{PUSCH}$ are the dual codebooks, specifically, there are many kinds of methods for splitting in the related about how to split W into W1 and W2 to correspond to two codebooks respectively. Two codebooks can correspond to different overheads respectively. A kind of extreme case is the case 5) mentioned in the above background technology. Now the W1 or the W2 even can be one fixed matrix, and the dual codebooks degenerate to the single codebook to feedback to combine one fixed matrix to represent the channel information together.

The present invention provides the following method for forming the $C_{PUCCH}$:

2.1) the code words that form the $C_{PUCCH}$ Rank1 codebook are all or part of the codes which are extracted from the $C_{PUSCH}$ Rank1 codebook and meet the model $$\begin{bmatrix} u_i \\ \alpha_k u_i \end{bmatrix},$$

with the $\alpha_k$ being $\{1,-1\}$.

Wherein, the $C_{PUCCH}$ can be the single codebook or the dual codebooks; if it is the dual codebooks, specifically, how to split the W into W1 and W2 to be presented and correspond to two codebooks respectively can be determined according to the splitting method in the $C_{PUSCH}$.

Corresponding, according to the above-mentioned method for forming the $C_{PUCCH}$ by the $C_{PUSCH}$ and the specific splitting of the W1 and W2, the above-mentioned method for forming the $C_{PUCCH}$ based on the $C_{PUSCH}$ can be easily described as the method about how to extract the code words in the $C_{PUCCH}^1$ and/or the $C_{PUCCH}^2$ from the codebook $C_{PUSCH}^1$ and/or $C_{PUSCH}^2$. These methods all belong to the range contained by the idea of the present invention.

2.2) the code words that form the $C_{PUCCH}$ Rank1 codebook are all or part of the codes which are extracted from the $C_{PUSCH}$ Rank1 codebook and meet the model $$\begin{bmatrix} u_i \\ \alpha_k u_i \end{bmatrix},$$

with the $\alpha_k$ being {j,−j}.

Corresponding, according to the above-mentioned method for forming the $C_{PUCCH}$ by the $C_{PUSCH}$ and the specific splitting of the W1 and W2, it can be easily described as the method how to extract the code words in the $C_{PUCCH}^1$ and/or the $C_{PUCCH}^2$ from the codebook $C_{PUSCH}^1$ and/or $C_{PUSCH}^2$. These methods all belong to the range contained by the idea of the present invention.

2.3) part of the code words that form the $C_{PUCCH}$ Rank1 codebook are part of the codes which are extracted from the $C_{PUSCH}$ Rank1 codebook and meet the model $$\begin{bmatrix} u_i \\ \alpha_k u_i \end{bmatrix},$$

with the corresponding $\alpha_k$ being {1,−1}; other code words are part of the codes which are extracted from the $C_{PUSCH}$ Rank1 codebook and meet the model $$\begin{bmatrix} u_i \\ \alpha_k u_i \end{bmatrix},$$

with the corresponding $\alpha_k$ being {j,−j}.

One special case is that: half of the code words that form the $C_{PUCCH}$ Rank1 codebook are part of the codes which are extracted from the $C_{PUSCH}$ Rank1 codebook and meet the model $$\begin{bmatrix} u_i \\ \alpha_k u_i \end{bmatrix},$$

with the corresponding $\alpha_k$ being {1,−1}; another half of the code words are part of the codes which are extracted from the $C_{PUSCH}$ Rank1 codebook and meet the model $$\begin{bmatrix} u_i \\ \alpha_k u_i \end{bmatrix},$$

with the corresponding $\alpha_k$ being {j,−j}.

Optionally, for one $u_i$, there are only 2 code words meeting the model $$\begin{bmatrix} u_i \\ \alpha_k u_i \end{bmatrix}$$

corresponding to the $u_i$ at most in the $C_{PUCCH}$.

The method cannot be described as how to extract the code words in the $C_{PUCCH}^1$ and/or the $C_{PUCCH}^2$ from the $C_{PUSCH}^1$ and/or the $C_{PUSCH}^2$ codebook, which is mainly applied for a specific transmission mode on the PUCCH, indicating the case that the code information of W is transmitted in a Report Type (here not including the information of the rank).

2.4) ¼ of the code words that form the $C_{PUCCH}$ Rank1 codebook are part of the codes which are extracted from the $C_{PUSCH}$ Rank1 codebook and meet the model $$\begin{bmatrix} u_i \\ \alpha_k u_i \end{bmatrix},$$

with the corresponding $\alpha_k$ being 1; ¼ of the code words are part of the codes which are extracted from the $C_{PUSCH}$ Rank1 codebook and meet the model $$\begin{bmatrix} u_i \\ \alpha_k u_i \end{bmatrix},$$

with the corresponding $\alpha_k$ being j; ¼ of the code words are part of the codes which are extracted from the $C_{PUSCH}$ Rank1 codebook and meet the model $$\begin{bmatrix} u_i \\ \alpha_k u_i \end{bmatrix},$$

with the corresponding $\alpha_k$ being −1; and ¼ of the code words are part of the codes which are extracted from the $C_{PUSCH}$ Rank1 codebook and meet the model $$\begin{bmatrix} u_i \\ \alpha_k u_i \end{bmatrix},$$

with the corresponding $\alpha_k$ being −j.

Optionally, for one $u_i$, there are only 2 code words meeting the model $$\begin{bmatrix} u_i \\ \alpha_k u_i \end{bmatrix}$$

corresponding to the $u_i$ at most in the $C_{PUCCH}$ Rank1 codebook.

The method cannot be described as how to extract the code words in the $C_{PUCCH}^1$ and/or the $C_{PUCCH}^2$ from the $C_{PUSCH}^1$ and/or the $C_{PUSCH}^2$ codebook, which is mainly applied for a specific transmission mode on the PUCCH, indicating the case that the code information of W is transmitted in a Report Type (here not including the information of the rank).

2.5) there are 4n different code words in the $C_{PUSCH}$ Rank1 codebook, noted as $$\bigcup_{i=1}^{n} \bigcup_{k=1}^{4} \left\{ \begin{bmatrix} v_i \\ \alpha_k v_i \end{bmatrix} \right\},$$

wherein, $v_i = [1\ e^{j2\pi(i-1)/N}\ e^{j4\pi(i-1)/N}\ e^{j6\pi(i-1)/N}]^T$, and i=1, 2, 3 ... n, and N=16 or 32;

the code words that form the $C_{PUSCH}$ Rank1 codebook are all or part of the code words selected from $$\bigcup_{i=1}^{\frac{n}{2}} \bigcup_{k=1}^{4} \left\{ \begin{bmatrix} v_{2i-1} \\ \alpha_k v_{2i-1} \end{bmatrix} \right\};$$

or, the code words that form the $C_{PUSCH}$ Rank1 codebook are all or part of the code words selected from $$\bigcup_{i=1}^{\frac{n}{2}} \bigcup_{k=1}^{4} \left\{ \begin{bmatrix} v_{2i} \\ \alpha_k v_{2i} \end{bmatrix} \right\};$$

or, the code words that form the $C_{PUSCH}$ Rank1 codebook are all or part of the code words selected from $$\bigcup_{i=1}^{\frac{n}{4}} \bigcup_{k=1}^{4} \left\{ \begin{bmatrix} v_{4i-1} \\ \alpha_k v_{4i-1} \end{bmatrix} \right\};$$

or, the code words that form the $C_{PUSCH}$ Rank1 codebook are all or part of the code words selected from $$\bigcup_{i=1}^{\frac{n}{4}} \bigcup_{k=1}^{4} \left\{ \begin{bmatrix} v_{4i-2} \\ \alpha_k v_{4i-2} \end{bmatrix} \right\};$$

or, the code words that form the $C_{PUSCH}$ Rank1 codebook are all or part of the code words selected from $$\bigcup_{i=1}^{\frac{n}{4}} \bigcup_{k=1}^{4} \left\{ \begin{bmatrix} v_{4i-3} \\ \alpha_k v_{4i-3} \end{bmatrix} \right\};$$

or, the code words that form the $C_{PUSCH}$ Rank1 codebook are all or part of the code words selected from $$\bigcup_{i=1}^{\frac{n}{4}} \bigcup_{k=1}^{4} \left\{ \begin{bmatrix} v_{4i} \\ \alpha_k v_{4i} \end{bmatrix} \right\}.$$

Optionally, for a certain $u_i$, there are only 2 code words meeting the model $$\begin{bmatrix} u_i \\ \alpha_k u_i \end{bmatrix}$$

corresponding to the $u_i$ at most in the $C_{PUCCH}$ Rank1 codebook.

Method 3 (the Method when Describing Rank2):

the dual codebooks are used to feed back the channel information W represented by two PMIs together, or a single code equivalent to the dual codebooks is used to feed back the channel information W represented by two PMIs together, which has various kinds of structure features, the $C_{PUSCH}$ represents the overall codebook, and is the actually defined or virtually defined single codebook equivalent to the dual codebooks. The $C_{PUCCH}$ represents the codebook used on the PUCCH, and is the actually defined or virtually defined single codebook equivalent to the dual codebooks. When it is required to extract the code words from the $C_{PUSCH}$ codebook to form the code words in the $C_{PUCCH}$ codebook, some code word combinations with more effective structure are selected from these structures.

For example, for Rank2 (that is, Rank=2):

the code words of the $C_{PUSCH}$ Rank2 codebook meet the model $$\begin{bmatrix} u_i & u_{ii} \\ \alpha_k u_i & -\alpha_k u_{ii} \end{bmatrix},$$

the $u_i$ and $u_{ii}$ are same or different 4-dimension vectors, the $C_{PUSCH}$ has A cases that $u_i = u_{ii}$ and B cases that $u_i \neq u_{ii}$, both A and B are positive integers, B can be 0 and A is not 0. For the case of $u_i = u_{ii}$, $$\begin{bmatrix} u_i & u_{ii} \\ \alpha_k u_i & -\alpha_k u_{ii} \end{bmatrix}$$

is equivalent to $$\begin{bmatrix} u_i & u_i \\ \alpha_k u_i & -\alpha_k u_i \end{bmatrix},$$

each $\alpha_k$ corresponding to $u_i(u_i=u_{ii})$ has 2 values $\{1, j\}$, that is to say, A is a multiple of 2. For the case that $u_i$ is not equal to $u_{ii}$, $\alpha_k$ has 2 values $\{1, j\}$ or $\alpha_k$ only has the value 1 for each combination case of $(u_i, u_{ii})$. For the case that $u_i$ is not equal to $u_{ii}$, $(u_i, u_{ii})$ and $(u_{ii}, u_i)$ are different combinations (case 1 of the Rank2 $C_{PUSCH}$).

When the $C_{PUSCH}$ Rank2 codebook meets the above conditions, the present invention provides the following method for forming the $C_{PUCCH}$:

3.1) the code words that form the $C_{PUSCH}$ Rank2 codebook are all or part of the code words selected from the code words in the A cases that $u_i = u_{ii}$ in the $C_{PUSCH}$ Rank2 codebook.

3.2) the code words that form the $C_{PUSCH}$ Rank2 codebook are part of the code words which meet model $$\begin{bmatrix} u_i & u_{ii} \\ \alpha_k u_i & -\alpha_k u_{ii} \end{bmatrix}$$

in the $C_{PUSCH}$ Rank2 codebook with the corresponding $\alpha_k = 1$.

Optionally, the code words that form the $C_{PUSCH}$ Rank2 codebook can be part of the code words which meet model $$\begin{bmatrix} u_i & u_{ii} \\ \alpha_k u_i & -\alpha_k u_{ii} \end{bmatrix}$$

with $u_i = u_{ii}$ and $\alpha_k = 1$ in the $C_{PUSCH}$ Rank2 codebook.

3.3) part of the code words that form the $C_{PUSCH}$ Rank2 codebook are code words which are extracted from the $C_{PUSCH}$ Rank2 codebook and meet the model $$\begin{bmatrix} u_i & u_{ii} \\ \alpha_k u_i & -\alpha_k u_{ii} \end{bmatrix}$$

with the corresponding $\alpha_k = 1$; and other code words are code words which are extracted from the $C_{PUSCH}$ Rank2 codebook and meet the model $$\begin{bmatrix} u_i & u_{ii} \\ \alpha_k u_i & -\alpha_k u_{ii} \end{bmatrix}$$

with the corresponding $\alpha_k = j$;

one special case is that: half of the code words of the $C_{PUSCH}$ Rank2 codebook are code words which are extracted from the $C_{PUSCH}$ Rank2 codebook and meet the model $$\begin{bmatrix} u_i & u_{ii} \\ \alpha_k u_i & -\alpha_k u_{ii} \end{bmatrix}$$

with the corresponding $\alpha_k = 1$; and another half of the code words are code words which are extracted from the $C_{PUSCH}$ Rank2 codebook and meet the model $$\begin{bmatrix} u_i & u_{ii} \\ \alpha_k u_i & -\alpha_k u_{ii} \end{bmatrix}$$

with the corresponding $\alpha_k = j$;

or, half of the code words that form the $C_{PUSCH}$ Rank2 codebook are part of the code words selected from the code words in the A cases that $u_i = u_{ii}$ in the $C_{PUSCH}(r)$; another half of the code words are part of the code words selected from the $C_{PUSCH}$ Rank2 codebook.

Method 4 (the Method when Describing Rank3):

the dual codebooks are used to feed back the channel information W represented by two PMIs together, or a single code equivalent to the dual codebooks is used to feed back the channel information W represented by two PMIs together, which has various kinds of structure features, the $C_{PUSCH}$ represents the overall codebook, and is the actually defined or virtually defined single codebook equivalent to the dual codebooks. The $C_{PUCCH}$ represents the codebook used on the PUCCH, and is the actually defined or virtually defined single codebook equivalent to the dual codebooks. When it is required to extract the code words from the $C_{PUSCH}$ codebook to form the code word in the $C_{PUCCH}$ codebook, some code word combinations with more effective structure are selected from these structures.

For example, for Rank3 (that is, Rank=3):

4.1) all or part of the code words of the $C_{PUSCH}$ Rank3 codebook meet the model $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, for each $u_i$ and $u_{ii}$ combination $(u_i, u_{ii})$, $\alpha_k$ corresponds to 4 values of $\{1, -1, j, -j\}$ respectively. It is noted that here it will occur that i=a, ii=b and i=b, ii=a are unequal, that is, $(u_i, u_{ii})$ and $(u_{ii}, u_i)$ are different combinations.

The present invention provides the following method for forming the $C_{PUCCH}$:

4.11) the code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being $\{1, -1\}$.

4.12) the code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being $\{1, j\}$.

4.13) the code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being $\{-1, -j\}$.

4.14) the code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being 1.

4.15) the code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being $-1$.

4.2) all or part of the code words of the $C_{PUSCH}$ Rank3 codebook meet the model $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, for each $u_i$ and $u_{ii}$ combination $(u_i, u_{ii})$, $\alpha_k$ corresponds to 2 values of $\{1,-1\}$ respectively.

The code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being 1.

The code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being $-1$.

4.3) all or part of the code words of the $C_{PUSCH}$ Rank3 codebook meet the model $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, for each $u_i$ and $u_{ii}$ combination $(u_i, u_{ii})$, $\alpha_k$ corresponds to 2 values of $\{1, j\}$ respectively.

The code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being 1.

The code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being j.

4.4) all or part of the code words of the $C_{PUSCH}$ Rank3 codebook meet the model $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, for each $u_i$ and $u_{ii}$ combination $(u_i, u_{ii})$, $\alpha_k$ corresponds to 2 values of $\{-1,-j\}$ respectively.

The code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being $-1$;

4.5) all or part of the code words of the $C_{PUSCH}$ Rank3 codebook meet the model $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, for each $u_i$ and $u_{ii}$ combination $(u_i, u_{ii})$, $\alpha_k$ corresponds to 2 values of $\{1,-j\}$ respectively.

The code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being 1;

The code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being $-j$.

4.6) all or part of the code words of the $C_{PUSCH}$ Rank3 codebook meet the model $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, for each $u_i$ and $u_{ii}$ combination $(u_i, u_{ii})$, $\alpha_k$ corresponds to 2 values of $\{-1, j\}$ respectively.

The code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being $-1$;

The code words that form the $C_{PUSCH}$ Rank3 codebook are all or part of code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being j.

4.7) the $C_{PUSCH}$ Rank3 codebook includes even number of code words, and half of even number of code words meet the model $$\begin{bmatrix} u_i & u_i & u_{ii} \\ \alpha_k u_i & -\alpha_k u_i & \alpha_k u_{ii} \end{bmatrix},$$

and another half meet $$\begin{bmatrix} u_{ii} & u_{ii} & u_i \\ \alpha_k u_{ii} & -\alpha_k u_{ii} & \alpha_k u_i \end{bmatrix}$$

corresponding to the $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, and $\alpha_k$ corresponds to $\{1,-1,j,-j\}$ or a subset of $\{1,-1,j,-j\}$, that is to say, for the combination of $u_i$ and $u_{ii}$, at least two code words $$\begin{bmatrix} u_i & u_i & u_{ii} \\ \alpha_k u_i & -\alpha_k u_i & \alpha_k u_{ii} \end{bmatrix} \text{ and } \begin{bmatrix} u_{ii} & u_{ii} & u_i \\ \alpha_k u_{ii} & -\alpha_k u_{ii} & \alpha_k u_i \end{bmatrix}$$

correspond with the combination.

the code words that form the $C_{PUSCH}$ Rank3 codebook are all or part of the code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix};$$

or, the code words that form the $C_{PUSCH}$ Rank3 codebook are all or part of the code words which are selected from the $C_{PUSCH}$ Rank3 codebook and meet the model $$\begin{bmatrix} u_{ii} & u_{ii} & u_i \\ \alpha_k u_{ii} & -\alpha_k u_{ii} & \alpha_k u_i \end{bmatrix};$$

or, half of the code words that form the $C_{PUSCH}$ Rank3 codebook are part of the code words which are selected from the $C_{PUSCH}$ Rank3 codebook and meet the model $$\begin{bmatrix} u_i & u_i & u_{ii} \\ \alpha_k u_i & -\alpha_k u_i & \alpha_k u_{ii} \end{bmatrix},$$

and another half of the code words are the code words meeting the $$\begin{bmatrix} u_{ii} & u_{ii} & u_i \\ \alpha_k u_{ii} & -\alpha_k u_{ii} & \alpha_k u_i \end{bmatrix}$$

corresponding to the $$\begin{bmatrix} u_i & u_i & u_{ii} \\ \alpha_k u_i & -\alpha_k u_i & \alpha_k u_{ii} \end{bmatrix}.$$

Method 5 (the Method when Describing Rank4):

the dual codebooks are used to feed back the channel information W represented by two PMIs together, or a single code equivalent to the dual codebooks is used to feed back the channel information W represented by two PMIs together, which has various kinds of structure features, the $C_{PUSCH}$ represents the overall codebook, and is the actually defined or virtually defined single codebook equivalent to the dual codebooks. The $C_{PUCCH}$ represents the codebook used on the PUCCH, and is the actually defined or virtually defined single codebook equivalent to the dual codebooks. When it is required to extract the code words from the $C_{PUSCH}$, codebook to form the code words in the $C_{PUCCH}$ codebook, some code word combinations with more effective structure are selected from these structures.

For example, for Rank4 (that is, Rank=4):

all or part of the code words of the $C_{PUSCH}$ Rank4 codebook meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

wherein, the $u_i$ and $u_{ii}$ are different 4-dimension vectors, and for each $u_i$ and $u_{ii}$ combination $(u_i, u_{ii})$, i=a and ii=b is equivalent to i=b and ii=a; for each combination $(u_i, u_{ii})$, $\alpha_k$ corresponds to 2 values of $\{1,-1\}$ respectively.

The code words that form the $C_{PUSCH}$ Rank4 codebook are all or part of the code words which are selected from the $C_{PUSCH}$ Rank4 codebook and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

with the corresponding $\alpha_k$ being 1;

or, the code words that form the $C_{PUSCH}$ Rank4 codebook are all or part of the code words which are selected from the $C_{PUSCH}$ Rank4 codebook and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

with the corresponding $\alpha_k$ being j;

or, half of the code words that form the $C_{PUSCH}$ Rank4 codebook are part of the code words which are selected from the $C_{PUSCH}$ Rank4 codebook and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

with the corresponding $\alpha_k$ being 1; another half of the code words that form the $C_{PUSCH}$ Rank4 codebook are part of the code words which are selected from the $C_{PUSCH}$ Rank4 codebook and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

with the corresponding $\alpha_k$ being j.

If the code words in the $C_{PUSCH}$ meet the model in each above-mentioned method after finishing the equivalence transformation (exchanging the columns, or multiplying by constant coefficient, or exchanging the rows of all code words together), the $C_{PUCCH}$ can be formed according to the similar method provided in method 2 to method 5. The code words in the $C_{PUCCH}$ also have the corresponding equivalence transformation format.

The present invention is described in detail through embodiments hereinafter.

Embodiment 1 a high layer signaling bitmap defines the $C_{PUCCH}$.

Forming $C_{PUCCH}$ can be implemented through the following methods:

M bits are used, each bit corresponding to a code word in the $C_{PUSCH}$, the base station sets that bit as 0 to represent that the code word is not selected, and sets the bit as 1 to represent to select that code word as the code word of the $C_{PUSCH}$.

The base station sends these M bits to the UE through the high layer signaling, to determine the code words in the $C_{PUCCH}$.

Also, for the structure aiming at the dual codebooks, the base station sends the M bits to the UE through the high layer signaling, wherein:

the M1 bits in the M bits correspond to the M1 code words in the codebook $C_{PUSCH}^1$, for each bit in the M1 bits, the base station sets that bit as 0 to represent that the code word is not selected, and sets the bit as 1 to represent to select that code word as the code word of the $C_{PUCCH}^1$;

the M2 bits in the M bits correspond to the M1 code words in the codebook $C_{PUSCH}^2$, for each bit in the M2 bits, the base station sets that bit as 0 to represent that the code word is not selected, and sets that bit as 1 to represent to select that code word as the code word of the $C_{PUCCH}^1$.

Also, for the structure aiming at the dual codebooks, and the base station sends these M bits to the UE through the high layer signaling, which correspond to the M code words in the codebook $C_{PUSCH}^1$. For each bit, the base station sets that bit as 0 to represents that the code word corresponding to that bit is not selected, and sets that bit as 1 to represent to select that code word corresponding to that bit as the code word of the $C_{PUCCH}^1$. All code words in the $C_{PUSCH}^2$ are used as the code words of the $C_{PUCCH}^2$.

Also, for the structure aiming at the dual codebooks, and the base station sends these M bits to the UE through the high layer signaling, which correspond to the M code words in the codebook $C_{PUSCH}^2$. For each bit, the base station sets that bit as 0 to represent that the code word corresponding to that bit is not selected, and sets that bit as 1 to represent to select that code word corresponding to that bit as the code word of the $C_{PUCCH}^2$. All code words in the $C_{PUSCH}^1$ are used as the code words of the $C_{PUCCH}^1$.

Embodiment 2 the $C_{PUCCH}$ is formed by extracting code words from the Rank1 codebook of the $C_{PUSCH}$.

For example, one kind of dual codebooks used by the PUSCH is that:

$C_{PUSCH}^1$ (the codebook corresponding to W1) is formed by $m_1$ code words $W_1^{(k)}$;

$$X^{(k)} \in \{[\begin{array}{cccc} b_{(\frac{N_b}{2}k)modN} & b_{(\frac{N_b}{2}k+1)modN} & \cdots & b_{(\frac{N_b}{2}k+N_b-1)modN} \end{array}]:$$
$$k = 0, 1, \ldots, m_1 - 1\}$$

$$W_1^{(k)} = \begin{bmatrix} X^{(k)} & 0 \\ 0 & X^{(k)} \end{bmatrix}, \quad C_1 = \{W_1^{(0)}, W_1^{(1)}, W_1^{(2)}, \ldots, W_1^{(2N/N_b-1)}\}$$

$$m_1 = \frac{2N}{N_b},$$

and $N_b$ is the number of columns of the matrix $X^{(k)}$, $b_i$ is a vector, for example, it typically is the DFT vector (but not limited to this case), there are n basic vectors $b_0 \sim b_{N-1}$ altogether; if $b_i$ are DPT vectors varying from each other, described as:

$$B = [\begin{array}{cccc} b_0 & b_1 & \cdots & b_{N-1} \end{array}], \quad [B]_{1+m,1+n} = e^{j\frac{2\pi mn}{N}},$$
$$m = 0, 1, \ldots, \frac{N_{tx}}{2} - 1 \quad n = 0, 1, \ldots, N - 1$$

$N_{tx}$ is a parameter related to the vector dimension, and usually indicates the number of the transmitting antennas. N is 2 to the power of an integer.

Supposing $N_{tx}=8$, $N_b=4$ and $N=32$, then the $$16\left(m_1 = \frac{2N}{N_b} = 16\right)$$

code words contained in the $C_{PUSCH}^1$ are:

$$W_1^{(k)} = \begin{bmatrix} X^{(k)} & 0 \\ 0 & X^{(k)} \end{bmatrix}, \quad C_1 = \{W_1^{(0)}, W_1^{(1)}, W_1^{(2)}, \ldots, W_1^{(15)}\}$$

$$X^{(0)} = [\begin{array}{cccc} b_0 & b_1 & \cdots & b_3 \end{array}] \quad X^{(1)} = [\begin{array}{cccc} b_2 & b_3 & \cdots & b_5 \end{array}]$$

-continued $$X^{(2)} = [\, b_4 \quad b_5 \quad \ldots \quad b_7 \,] \ldots X^{(14)} = [\, b_{28} \quad b_{29} \quad \ldots \quad b_{31} \,]$$

$$X^{(15)} = [\, b_{30} \quad b_{31} \quad b_1 \quad b_2 \,];$$

$C_{PUSCH}{}^2$ (the codebook corresponding to W2) is formed by $m_2$ code words, for example when it is of Rank1, it contains:

$$C^2_{PUSCH} = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\}$$

$$Y \in \{\tilde{e}_1, \tilde{e}_2, \tilde{e}_3, \ldots \tilde{e}_{m_2/4}\}$$

$m_2$ equals to $4N_b$ generally, $\tilde{e}_i$ is a vector of $$\frac{N_{tx}}{2} \times 1,$$

the $i^{th}$ element is 1, and other elements are 0, which actually is one column-selected vector, when the code words in $W_1^{(k)}$ and $C_{PUSCH}{}^2$ multiply, it can be understood that the columns of the $X^{(k)}$ are selected to form the code words in the codebook corresponding to W.

The equivalent $C_{PUSCH}$ (the codebook corresponding to W) contains the code word obtained by any code word in the $C_{PUSCH}{}^1$ pre-multiplying any code word in the $C_{PUSCH}{}^2$, that is, there are $m_1 \times m_2$ code words. In this case, the specific codebook $C_{PUCCH}$ of the PUCCH formed by extracting the code word in the codebook $C_{PUSCH}$ of the PUSCH can be:

Extracting part or all code words of the code words $W_1^{(0)}$ $W^1{}_{(2)}$ $W_1^{(4)}$ $W_1^{(6)}$ ... $W_1^{(14)}$ with the Index being even from the $C_{PUSCH}{}^1$, or extracting part or all code words of the code words $W_1^{(1)}$ $W_1^{(3)}$ $W_1^{(5)}$ $W_1^{(7)}$ ... $W_1^{(15)}$ with the Index being odd to form the $C_{PUCCH}{}^1$. The method for extracting code words from $C_{PUSCH}{}^2$ to form $C_{PUCCH}{}^2$ can be an arbitrary one.

The idea of this method is that there could be some repetitions in the $C_{PUSCH}$ itself. For example, the combination of the $$W_1^{(0)} = \begin{bmatrix} b_0 \; b_1 \; \ldots \; b_3 & 0 \\ 0 & b_0 \; b_1 \; \ldots \; b_3 \end{bmatrix}$$

and the $$\frac{1}{\sqrt{2}}\begin{bmatrix} \tilde{e}_3 \\ \tilde{e}_3 \end{bmatrix}$$

is equivalent to the combination of the $$W_1^{(1)} = \begin{bmatrix} b_2 \; b_3 \; \ldots \; b_5 & 0 \\ 0 & b_2 \; b_3 \; \ldots \; b_5 \end{bmatrix}$$

and the $$\frac{1}{\sqrt{2}}\begin{bmatrix} \tilde{e}_1 \\ \tilde{e}_1 \end{bmatrix}.$$

There are not repetitive code words in the $C_{PUCCH}$ through the method of extracting described in the present invention.

The cases of $N_{tx}=8$, $N_b=4$, $N=16$ or 8 are similar to this, and will not be described in detail.

The present embodiment can be extended to the case of Rank2, and extracting part or all code words of the code words $W_1^{(0)}$ $W_1^{(2)}$ $W_1^{(4)}$ $W_1^{(6)}$ ... $W_1^{(14)}$ with the Index being even or the code words $W_1^{(1)}$ $W_1^{(3)}$ $W_1^{(5)}$ $W_1^{(7)}$ ... $W_1^{(15)}$ with the Index being odd to from the $C_{PUSCH}{}^1$, to form the $C_{PUCCH}{}^1$. The method for extracting the code words from the $C_{PUSCH}{}^2$ of Rank2 to form the $C_{PUCCH}{}^2$ can be an arbitrary one.

The transformed codebook obtained after exchanging the columns or multiplying by constant coefficient or exchanging the rows of all code words together for the $C_{PUSCH}{}^1$ and/or the $C_{PUSCH}{}^2$ also can use the extracting method described in the present embodiment; or, the transformed codebook obtained after exchanging the columns or multiplying by constant coefficient or exchanging the rows of all code words together for the $C_{PUSCH}$ also can use the extracting method described in the present embodiment. The code words in the $C_{PUCCH}$, $C_{PUCCH}{}^1$ and $C_{PUCCH}{}^2$ also have the corresponding equivalent transformation representing format.

Embodiment 3 the $C_{PUCCH}$ is formed by extracting code words from the Rank 1 codebook of the $C_{PUSCH}$.

For example, one kind of dual codebooks used by the PUSCH is that:

$C_{PUSCH}{}^1$ (the codebook corresponding to W1) is formed by $m_1$ code words $W_1^{(k)}$;

$$X^{(k)} \in \{[\, b_{(\frac{N_b}{2}k) \bmod N} \quad b_{(\frac{N_b}{2}k+1) \bmod N} \quad \ldots \quad b_{(\frac{N_b}{2}k+N_b-1) \bmod N} \,] : k = 0,$$

$$1, \ldots, m_1 - 1\}$$

$$W_1^{(k)} = \begin{bmatrix} X^{(k)} & 0 \\ 0 & X^{(k)} \end{bmatrix},$$

$$C_1 = \{W_1^{(0)}, W_1^{(1)}, W_1^{(2)}, \ldots, W_1^{(2N/N_b - 1)}\}$$

Wherein $$m_1 = \frac{2N}{N_b},$$

and $N_b$ is the number of columns of the matrix $X^{(k)}$, $b_i$ is a vector, for example, it typically is the DFT vector (but not limited to this case), there are n basic vectors $b_0 \sim b_{N-1}$ altogether, described as:

$$B = [\, b_0 \quad b_1 \quad \ldots \quad b_{N-1} \,],$$

$$[B]_{1+m,1+n} = e^{j\frac{2\pi mn}{N}},$$

$$m = 0, 1, \ldots, \frac{N_{tx}}{2} - 1$$
$$n = 0, 1, \ldots, N - 1$$

Wherein, $N_{tx}$ is a parameter related to the vector dimension, and usually indicates the number of the transmitting antennas. N is 2 to the power of an integer.

Supposing $N_{tx}=8$, $N_b=4$ and $N=32$, then the 16 code words contained in the $C_{PUSCH}^1$ are:

$$W_1^{(k)} = \begin{bmatrix} X^{(k)} & 0 \\ 0 & X^{(k)} \end{bmatrix},$$
$$C - 1 = \{W_1^{(0)}, W_1^{(1)}, W_1^{(2)}, \ldots, W_1^{(15)}\}$$
$$X^{(0)} = [b_0 \quad b_1 \quad \ldots \quad b_3]$$
$$X^{(1)} = [b_2 \quad b_3 \quad \ldots \quad b_5] \quad X^{(2)} = [b_4 \quad b_5 \quad \ldots \quad b_7] \ldots \ldots$$
$$X^{(14)} = [b_{28} \quad b_{29} \quad \ldots \quad b_{31}] \quad X^{(15)} = [b_{30} \quad b_{31} \quad b_1 \quad b_2];$$

$C_{PUSCH}^2$ (the codebook corresponding to W2) is formed by $m_2$ code words, for example, for Rank1, it contains:

$$C_{PUSCH}^2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}$$
$$Y \in \{\tilde{e}_1, \tilde{e}_2, \tilde{e}_3, \ldots \tilde{e}_{m_2/4}\}$$

$m_2$ equals to $4N_b$ generally, $\tilde{e}_i$ is a vector of $$\frac{N_{tx}}{2} \times 1,$$

the $i^{th}$ element is 1, and other elements are 0, which actually is one column-selected vector, when the code words in $W_1^{(k)}$ and $C_{PUSCH}^2$ multiply, it can be understood that the columns of the $X^{(k)}$ are selected to form the code words in the codebook corresponding to W. And also it can be the case of N=16 or 8, and the following methods are applied to the cases of various N values.

The equivalent $C_{PUSCH}$ (the codebook corresponding to W) contains the code words obtained by any code word in the $C_{PUSCH}^1$ pre-multiplying any code word in the $C_{PUSCH}^2$, that is, there are $m_1 \times m_2$ code words.

In this case, the specific codebook $C_{PUCCH}$ of the PUCCH formed by extracting the code words in the codebook $C_{PUSCH}$ of the PUSCH can be:

The method for extracting code words from $C_{PUSCH}^1$ to form the $C_{PUCCH}^1$ can be arbitrary.

Extracting the code words from the $C_{PUSCH}^2$ to form the $C_{PUCCH}^2$ can be:

$$C_{PUCCH}^2 = \left\{ \frac{1}{\sqrt{2}} \begin{bmatrix} Y \\ Y \end{bmatrix} \right\} \text{ and } Y \in \{\tilde{e}_1, \tilde{e}_2, \tilde{e}_3, \ldots \tilde{e}_{m_2/4}\};$$

or $$C_{PUCCH}^2 = \left\{ \frac{1}{\sqrt{2}} \begin{bmatrix} Y \\ -Y \end{bmatrix} \right\} \text{ and } Y \in \{\tilde{e}_1, \tilde{e}_2, \tilde{e}_3, \ldots \tilde{e}_{m_2/4}\}$$

or, $$C_{PUCCH}^2 = \left\{ \frac{1}{\sqrt{2}} \begin{bmatrix} Y \\ jY \end{bmatrix} \right\} \text{ and } Y \in \{\tilde{e}_1, \tilde{e}_2, \tilde{e}_3, \ldots \tilde{e}_{m_2/4}\}$$

or, $$C_{PUCCH}^2 = \left\{ \frac{1}{\sqrt{2}} \begin{bmatrix} Y \\ -jY \end{bmatrix} \right\} \text{ and } Y \in \{\tilde{e}_1, \tilde{e}_2, \tilde{e}_3, \ldots \tilde{e}_{m_2/4}\}$$

or, $$C_{PUCCH}^2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix} \right\} \text{ and } Y \in \{\tilde{e}_1, \tilde{e}_2, \tilde{e}_3, \ldots \tilde{e}_{m_2/4}\}$$

or, $$C_{PUCCH}^2 = \left\{ \frac{1}{\sqrt{2}} \begin{bmatrix} Y \\ Y \end{bmatrix}, \frac{1}{\sqrt{2}} \begin{bmatrix} Y \\ -Y \end{bmatrix} \right\} \text{ and } Y \in \{\tilde{e}_1, \tilde{e}_2, \tilde{e}_3, \ldots \tilde{e}_{m_2/4}\}$$

or, $$C_{PUCCH}^2 = \left\{ \frac{1}{\sqrt{2}} \begin{bmatrix} Y \\ jY \end{bmatrix}, \frac{1}{\sqrt{2}} \begin{bmatrix} Y \\ -jY \end{bmatrix} \right\} \text{ and } Y \in \{\tilde{e}_1, \tilde{e}_2, \tilde{e}_3, \ldots \tilde{e}_{m_2/4}\}$$

or, $$C_{PUCCH}^2 = \left\{ \frac{1}{\sqrt{2}} \begin{bmatrix} Y \\ -Y \end{bmatrix}, \frac{1}{\sqrt{2}} \begin{bmatrix} Y \\ -jY \end{bmatrix}, \right\} \text{ and } Y \in \{\tilde{e}_1, \tilde{e}_2, \tilde{e}_3, \ldots \tilde{e}_{m_2/4}\}$$

Embodiment 4 the $C_{PUCCH}$ is formed by extracting code words from the Rank1 codebook of the $C_{PUSCH}$.

For example, one kind of dual codebooks used by the PUSCH is that:

$C_{PUSCH}^1$ (the codebook corresponding to W1) is formed by $m_1$ code words $W_1^{(k)}$;

$$X^{(k)} \in \{[\ b_{\left(\frac{N_b}{2}k\right) \bmod N} \quad b_{\left(\frac{N_b}{2}k+1\right) \bmod N} \quad \cdots \quad b_{\left(\frac{N_b}{2}k+N_b-1\right) \bmod N}\ ] : k = 0, 1, \ldots, m_1 - 1\}$$

$$W_1^{(k)} = \begin{bmatrix} X^{(k)} & 0 \\ 0 & X^{(k)} \end{bmatrix},$$

-continued $$C_1 = \{W_1^{(0)}, W_1^{(1)}, W_1^{(2)}, \ldots, W_1^{(2N/N_b-1)}\}$$

$$m_1 = \frac{2N}{N_b},$$

and $N_b$ is the number of columns of the matrix $X^{(k)}$, $b_i$ is a vector, for example, it typically is the DFT vector (but not limited to this case), there are n basic vectors $b_0 \sim b_{N-1}$ altogether, described as:

$$B = [b_0 \ b_1 \ \ldots \ b_{N-1}],$$

$$[B]_{1+m,1+n} = e^{j\frac{2\pi mn}{N}},$$

$$m = 0, 1, \ldots, \frac{N_{tx}}{2} - 1$$

$$n = 0, 1, \ldots, N - 1$$

Wherein, $N_{tx}$ is a parameter related to the vector dimension, and usually indicates the number of the transmitting antennas. N is 2 to the power of an integer.

Supposing $N_{tx}=8$, $N_b=4$, and $N=32$, then the 16 code words contained in the $C_{PUSCH}^1$ are:

$$W_1^{(k)} = \begin{bmatrix} X^{(k)} & 0 \\ 0 & X^{(k)} \end{bmatrix},$$

$$C_1 = \{W_1^{(0)}, W_1^{(1)}, W_1^{(2)}, \ldots, W_1^{(15)}\}$$

$$X^{(0)} = [b_0 \ b_1 \ \ldots \ b_3]$$

$$X^{(1)} = [b_2 \ b_3 \ \ldots \ b_5] \ X^{(2)} = [b_4 \ b_5 \ \ldots \ b_7] \ \ldots \ \ldots$$

$$X^{(14)} = [b_{28} \ b_{29} \ \ldots \ b_{31}] \ X^{(15)} = [b_{30} \ b_{31} \ b_1 \ b_2];$$

$C_{PUSCH}^2$ (the codebook corresponding to W2) is formed by $m_2$ code words, for example, for Rank1, it contains:

$$C_{PUSCH}^2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}$$

$$Y \in \{\tilde{e}_1, \tilde{e}_2, \tilde{e}_3, \ldots \tilde{e}_{m_2/4}\}$$

$m_2$ equals to $4N_b$ generally, $\tilde{e}_i$ is a vector of $$\frac{N_{tx}}{2} \times 1,$$

the $i^{th}$ element is 1, and other elements are 0, which actually is one column-selected vector, when the code words in $W_1^{(k)}$ and $C_{PUSCH}^2$ multiply, it can be understood that the columns of the $X^{(k)}$ are selected to form the code words in the codebook corresponding to W.

The equivalent $C_{PUSCH}$ (the codebook corresponding to W) contains the code words obtained by any code word in the $C_{PUSCH}^1$ pre-multiplying any code word in the $C_{PUSCH}^2$, that is, there are $m_1 \times m_2$ code words.

And also it can be the case of N=16 or 8, and the following methods are applied to the cases of various N values.

In this case, the specific codebook $C_{PUCCH}$ of the PUCCH formed by extracting the code words in the codebook $C_{PUSCH}$ of the PUSCH can be:

when N=16:

$$C_{PUCCH} = \bigcup_{k=0}^{3} \left\{ \begin{bmatrix} b_{4k+0} \\ b_{4k+0} \end{bmatrix} \begin{bmatrix} b_{4k+1} \\ jb_{4k+1} \end{bmatrix} \begin{bmatrix} b_{4k+2} \\ -b_{4k+2} \end{bmatrix} \begin{bmatrix} b_{4k+3} \\ jb_{4k+3} \end{bmatrix} \right\}$$

when N=32:

$$C_{PUCCH} = \bigcup_{k=0}^{3} \left\{ \begin{bmatrix} b_{8k+0} \\ b_{8k+0} \end{bmatrix} \begin{bmatrix} b_{8k+2} \\ jb_{8k+2} \end{bmatrix} \begin{bmatrix} b_{8k+4} \\ -b_{8k+4} \end{bmatrix} \begin{bmatrix} b_{8k+6} \\ jb_{8k+6} \end{bmatrix} \right\}$$

Compared to embodiment 2 and 3, the description of this method is about how $C_{PUCCH}$ extracts the code word from the $C_{PUSCH}$, while not about how $C_{PUCCH}^1 C_{PUCCH}^2$ extracts the code word from the $C_{PUSCH}^1 C_{PUSCH}^2$, which has more generality. Generally speaking, the latter description can be equivalent to one former description according to their relationship, while the former description may not be performed equivalently by the way for the latter description, such as, the way in the present embodiment.

The transformed codebook obtained after exchanging the columns, or multiplying by constant coefficient, or exchanging the rows of all code words together for $C_{PUSCH}^1$ and/or the $C_{PUSCH}^2$ also can use the extracting method described in the present embodiment; or, the transformed codebook obtained after exchanging the columns or multiplying by constant coefficient or exchanging the rows of all code words together for the $C_{PUSCH}$ also can use the extracting method described in the present embodiment. The code words in the $C_{PUCCH}$, $C_{PUCCH}^1$ and $C_{PUCCH}^2$ also have the corresponding equivalent transformation representing format.

Embodiment 5 the $C_{PUCCH}$ is formed by extracting code words from the Rank2 codebook of the $C_{PUSCH}$.

For example, one kind method for forming the dual codebooks used by the PUSCH is that:

$C_{PUSCH}^1$ (the codebook corresponding to W1) is formed by $m_1$ code words $W_1^{(k)}$, which is the same as the above embodiment of Rank1, and N can be 32, 16 or 8 etc.;

$C_{PUSCH}^2$ (the codebook corresponding to W2) is formed by $m_2$ code words, for example, for Rank2, it contains:

$$C_{PUSCH}^2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}$$

$(Y_1, Y_2) \in$ $\{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$ wherein, $\tilde{e}_i$ is a vector of $$\frac{N_{tx}}{2} \times 1,$$

the $i^{th}$ element is 1, and other elements are 0, which actually is one column-selected vector, when the code words in $W_1^{(k)}$ and $C_{PUSCH}^2$ multiply, it can be understood that the columns of the $X^{(k)}$ are selected to form the code words in the codebook corresponding to W.

The equivalent $C_{PUSCH}$ (the codebook corresponding to W) contains the code word obtained by any code word in the $C_{PUSCH}^1$ pre-multiplying any code word in the $C_{PUSCH}^2$, that is, there are $m_1 \times m_2$ code words.

In this case, the specific codebook $C_{PUCCH}$ of the PUCCH formed by extracting the code word in the codebook $C_{PUSCH}$ of the PUSCH can be:

when N=16:

$$\bigcup_{k=0}^{3}\left\{\begin{bmatrix} b_{4k+0} & b_{4k+0} \\ b_{4k+0} & -b_{4k+0} \end{bmatrix}\begin{bmatrix} b_{4k+1} & b_{4k+1} \\ b_{4k+1} & -b_{4k+1} \end{bmatrix}\right.$$
$$\left.\begin{bmatrix} b_{4k+2} & b_{4k+2} \\ b_{4k+2} & -b_{4k+2} \end{bmatrix}\begin{bmatrix} b_{4k+3} & b_{4k+3} \\ b_{4k+3} & -b_{4k+3} \end{bmatrix}\right\}$$

or, $$\bigcup_{k=0}^{3}\left\{\begin{bmatrix} b_{4k+0} & b_{4k+0} \\ b_{4k+0} & -b_{4k+0} \end{bmatrix}\begin{bmatrix} b_{4k+1} & b_{4k+1} \\ b_{4k+1} & -b_{4k+1} \end{bmatrix}\begin{bmatrix} b_{4k+2} & b_{4k+2} \\ b_{4k+2} & -b_{4k+2} \end{bmatrix}\right.$$
$$\left.\begin{bmatrix} b_{4k+3} & b_{4k+3} \\ b_{4k+3} & -b_{4k+3} \end{bmatrix}\right\}$$

or, $$\bigcup_{k=0}^{3}\left\{\begin{bmatrix} b_{4k+0} & b_{4k+0} \\ b_{4k+0} & -b_{4k+0} \end{bmatrix}\begin{bmatrix} b_{4k+1} & b_{4k+1} \\ jb_{4k+1} & -jb_{4k+1} \end{bmatrix}\begin{bmatrix} b_{4k+2} & b_{4k+2} \\ b_{4k+2} & -b_{4k+2} \end{bmatrix}\right.$$
$$\left.\begin{bmatrix} b_{4k+3} & b_{4k+3} \\ jb_{4k+3} & -jb_{4k+3} \end{bmatrix}\right\}$$

or, $$\bigcup_{k=0}^{3}\left\{\begin{matrix}\begin{bmatrix} b_{4k+0} & b_{4k+0} \\ b_{4k+0} & -b_{4k+0} \end{bmatrix}\begin{bmatrix} b_{4k+1} & b_{4k+1} \\ jb_{4k+1} & -jb_{4k+1} \end{bmatrix}\begin{bmatrix} b_{4k+2} & b_{4k+2} \\ b_{4k+2} & -b_{4k+2} \end{bmatrix} \\ \begin{bmatrix} b_{4k+3} & b_{4k+3} \\ jb_{4k+3} & -jb_{4k+3} \end{bmatrix}\begin{bmatrix} b_{4k+0} & b_{4k+1} \\ b_{4k+0} & -b_{4k+1} \end{bmatrix}\begin{bmatrix} b_{4k+1} & b_{4k+2} \\ jb_{4k+1} & -jb_{4k+2} \end{bmatrix} \\ \begin{bmatrix} b_{4k+0} & b_{4k+3} \\ b_{4k+0} & -b_{4k+3} \end{bmatrix}\begin{bmatrix} b_{4k+1} & b_{4k+3} \\ jb_{4k+1} & -jb_{4k+3} \end{bmatrix}\end{matrix}\right\}$$

or, $$\bigcup_{k=0}^{3}\left\{\begin{matrix}\begin{bmatrix} b_{4k+0} & b_{4k+0} \\ b_{4k+0} & -b_{4k+0} \end{bmatrix}\begin{bmatrix} b_{4k+1} & b_{4k+1} \\ b_{4k+1} & -b_{4k+1} \end{bmatrix}\begin{bmatrix} b_{4k+2} & b_{4k+2} \\ b_{4k+2} & -b_{4k+2} \end{bmatrix} \\ \begin{bmatrix} b_{4k+3} & b_{4k+3} \\ b_{4k+3} & -b_{4k+3} \end{bmatrix}\begin{bmatrix} b_{4k+0} & b_{4k+1} \\ b_{4k+0} & -b_{4k+1} \end{bmatrix}\begin{bmatrix} b_{4k+1} & b_{4k+2} \\ b_{4k+1} & -b_{4k+2} \end{bmatrix} \\ \begin{bmatrix} b_{4k+0} & b_{4k+3} \\ b_{4k+0} & -b_{4k+3} \end{bmatrix}\begin{bmatrix} b_{4k+1} & b_{4k+3} \\ b_{4k+1} & -b_{4k+3} \end{bmatrix}\end{matrix}\right\}$$

when N=32, $C_{PUCCH}$ is $$\bigcup_{k=0}^{3}\left\{\begin{bmatrix} b_{8k+0} & b_{8k+0} \\ b_{8k+0} & -b_{8k+0} \end{bmatrix}\begin{bmatrix} b_{8k+2} & b_{8k+2} \\ b_{8k+2} & -b_{8k+2} \end{bmatrix}\begin{bmatrix} b_{8k+4} & b_{8k+4} \\ b_{8k+4} & -b_{8k+4} \end{bmatrix}\right.$$
$$\left.\begin{bmatrix} b_{8k+6} & b_{8k+6} \\ b_{8k+6} & -b_{8k+6} \end{bmatrix}\right\}$$

or, $$\bigcup_{k=0}^{3}\left\{\begin{bmatrix} b_{8k+0} & b_{8k+0} \\ jb_{8k+0} & -jb_{8k+0} \end{bmatrix}\begin{bmatrix} b_{8k+2} & b_{8k+2} \\ jb_{8k+2} & -jb_{8k+2} \end{bmatrix}\begin{bmatrix} b_{8k+4} & b_{8k+4} \\ jb_{8k+4} & -jb_{8k+4} \end{bmatrix}\right.$$
$$\left.\begin{bmatrix} b_{8k+6} & b_{8k+6} \\ jb_{8k+6} & -jb_{8k+6} \end{bmatrix}\right\}$$

or, $$\bigcup_{k=0}^{3}\left\{\begin{bmatrix} b_{8k+0} & b_{8k+0} \\ b_{8k+0} & -b_{8k+0} \end{bmatrix}\begin{bmatrix} b_{8k+2} & b_{8k+2} \\ jb_{8k+2} & -jb_{8k+2} \end{bmatrix}\right.$$
$$\left.\begin{bmatrix} b_{8k+4} & b_{8k+4} \\ b_{8k+4} & -b_{8k+4} \end{bmatrix}\begin{bmatrix} b_{8k+6} & b_{8k+6} \\ jb_{8k+6} & -jb_{8k+6} \end{bmatrix}\right\}.$$

Embodiment 6 the $C_{PUCCH}$ is formed by extracting code words from the Rank3 codebook of the $C_{PUSCH}$.

1) case 1, one kind of dual codebooks used by the PUSCH is that:

$C_{PUSCH}^1$ (the codebook corresponding to W1) is formed by $m_1$ code words $W_1^{(k)}$;

$$X^{(k)} \in \left\{\begin{bmatrix} b_{\left(\frac{N_b}{2}k\right)\bmod N} & b_{\left(\frac{N_b}{2}k+1\right)\bmod N} & \cdots & b_{\left(\frac{N_b}{2}k+N_b-1\right)\bmod N}\end{bmatrix} : k=0, 1, \ldots, m_1-1\right\}$$

$$W_1^{(k)} = \begin{bmatrix} X^{(k)} & 0 \\ 0 & X^{(k)} \end{bmatrix},$$

$$C_1 = \{W_1^{(0)}, W_1^{(1)}, W_1^{(2)}, \ldots, W_1^{(2N/N_b-1)}\}$$

wherein, $$m_1 = \frac{2N}{N_b},$$

and $N_b$ is the number of columns of the matrix $X^{(k)}$, $b_i$ is a vector, for example, it typically is the DFT vector (but not limited to this case), there are n basic vectors $b_0 \sim b_{N-1}$ altogether; if $b_i$ is a DFT vector varying with each other, described as:

$$B = [b_0 \quad b_1 \quad \ldots \quad b_{N-1}],$$

$$[B]_{1+m, 1+n} = e^{j\frac{2\pi mn}{N}},$$

-continued $$m = 0, 1, \ldots, \frac{N_{tx}}{2} - 1$$

$$n = 0, 1, \ldots, N - 1,$$

wherein, $N_{tx}$ is a parameter related to the vector dimension, and usually indicates the number of the transmitting antennas. N is 2 to the power of an integer.

If $N_{tx}=8$, $N_b=8$ and $N=32$, then the $$8\left(m_1 = \frac{2N}{N_b} = 8\right)$$

code words contained in the $C_{PUSCH}^1$ are:

$$W_1^{(k)} = \begin{bmatrix} X^{(k)} & 0 \\ 0 & X^{(k)} \end{bmatrix},$$

$$C_1 = \{W_1^{(0)}, W_1^{(1)}, W_1^{(2)}, \ldots, W_1^{(7)}\}$$

$$X^{(0)} = [b_0 \quad b_1 \quad \ldots \quad b_7]$$

$$X^{(1)} = [b_4 \quad b_6 \quad \ldots \quad b_{11}]$$

$$X^{(2)} = [b_8 \quad b_9 \quad \ldots \quad b_{15}] \ldots \ldots$$

$$X^{(6)} = [b_{24} \quad b_{25} \quad \ldots \quad b_{31}]$$

$$X^{(7)} = [b_{28} \quad b_{29} \quad \ldots \quad b_3]$$

If $N_{tx}=8$, $N_b=8$ and $N=16$, then the $$4\left(m_1 = \frac{2N}{N_b} = 4\right)$$

code words contained in the $C_{PUSCH}^1$ are:

$$W_1^{(k)} = \begin{bmatrix} X^{(k)} & 0 \\ 0 & X^{(k)} \end{bmatrix},$$

$$C_1 = \{W_1^{(0)}, W_1^{(1)}, W_1^{(2)}, W_1^{(3)}\}$$

$$X^{(0)} = [b_0 \quad b_1 \quad \ldots \quad b_7]$$

$$X^{(1)} = [b_4 \quad b_6 \quad \ldots \quad b_{11}]$$

$$X^{(2)} = [b_8 \quad b_9 \quad \ldots \quad b_{15}]$$

$$X^{(3)} = [b_{12} \quad b_{13} \quad \ldots \quad b_3]$$

$C_{PUSCH}^2$ (the codebook corresponding to W2) is formed by $m_2$ code words, for example, for Rank3, the 16 code words contained therein are:

$$W_2 \in C_2 = \left\{ \frac{1}{\sqrt{2}} \begin{bmatrix} Y_1 & Y_2 \\ Y_1 & -Y_2 \end{bmatrix} \right\}$$

$$(Y_1, Y_2) \in \begin{cases} (e_1, [e_1 \ e_5]), (e_2, [e_2 \ e_6]), (e_3, [e_3 \ e_7]), (e_4, [e_4 \ e_8]), \\ (e_5, [e_1 \ e_5]), (e_6, [e_2 \ e_6]), (e_7, [e_3 \ e_7]), (e_8, [e_4 \ e_8]), \\ ([e_1 \ e_5], e_5), ([e_2 \ e_6], e_6), ([e_3 \ e_7], e_7), ([e_4 \ e_8], e_8), \\ ([e_5 \ e_1], e_1), ([e_6 \ e_2], e_2), ([e_7 \ e_3], e_3), ([e_8 \ e_4], e_4) \end{cases}$$

and also can be noted as:

$$W_2 \in C_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ -Y_1 & Y_2 \end{bmatrix} \right\}$$

$$(Y_1, Y_2) \in \begin{cases} (e_1, [e_1 \ e_5]), (e_2, [e_2 \ e_6]), (e_3, [e_3 \ e_7]), (e_4, [e_4 \ e_8]), \\ (e_5, [e_1 \ e_5]), (e_6, [e_2 \ e_6]), (e_7, [e_3 \ e_7]), (e_8, [e_4 \ e_8]), \end{cases}$$

wherein, $\tilde{e}_i$ is a vector of $$\frac{N_{tx}}{2} \times 1,$$

the $i^{th}$ element is 1, and other elements are 0, which actually is one column-selected vector.

In this case, the specific codebook $C_{PUCCH}$ of the PUCCH formed by extracting the code word in the codebook $C_{PUSCH}$ of the PUSCH can be:

extracting mode 1: extracting the code words from the $C_{PUSCH}^2$ to form the $C_{PUCCH}^2$ can be in any method; and extracting the code words from the $C_{PUSCH}^1$ to form the $C_{PUCCH}^1$ can be extracting part or all code words of the code words $W_1^{(0)} W_1^{(2)} W_1^{(4)} W_1^{(6)} \ldots W_1^{(2N/N_b-2)}$ with the Index being even or the code words $W_1^{(1)} W_1^{(3)} W_1^{(5)} W_1^{(7)} \ldots W_1^{(2N/N_b-1)}$ with the Index being odd. That is to say, the methods described in above Rank1 and Rank2 embodiments are also applied to Rank3.

Extracting Mode 2: extracting the code words from the $C_{PUSCH}^1$ to form the $C_{PUCCH}^1$ can be in any method; and extracting the code words from the $C_{PUSCH}^2$ to form the $C_{PUCCH}^2$ can be extracting the following code words:

$$C_{PUCCH}^2 = \left\{ \frac{1}{\sqrt{2}} \begin{bmatrix} Y_1 & Y_2 \\ Y_1 & -Y_2 \end{bmatrix} \right\}$$

$(Y_1, Y_2) \in$ $$\begin{cases} (e_1, [e_1 \ e_5]), (e_2, [e_2 \ e_6]), (e_3, [e_3 \ e_7]), (e_4, [e_4 \ e_8]) \\ (e_5, [e_1 \ e_5]), (e_6, [e_2 \ e_6]), (e_7, [e_3 \ e_7]), (e_8, [e_4 \ e_8]) \end{cases}$$

or, $$C_{PUCCH}^2 = \left\{ \frac{1}{\sqrt{2}} \begin{bmatrix} Y_1 & Y_2 \\ -Y_1 & Y_2 \end{bmatrix} \right\}$$

$(Y_1, Y_2) \in$ $$\begin{cases} (e_1, [e_1 \ e_5]), (e_2, [e_2 \ e_6]), (e_3, [e_3 \ e_7]), (e_4, [e_4 \ e_8]) \\ (e_5, [e_1 \ e_5]), (e_6, [e_2 \ e_6]), (e_7, [e_3 \ e_7]), (e_8, [e_4 \ e_8]) \end{cases}$$

or, $$C_{PUCCH}^2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ -Y_1 & Y_2 \end{bmatrix} \right\}$$

$(Y_1, Y_2) \in$ $$\{(e_1, [e_1 \ e_5]), (e_2, [e_2 \ e_6]), (e_3, [e_3 \ e_7]), (e_4, [e_4 \ e_8])\}$$

or, $$C_{PUCCH}^2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ -Y_1 & Y_2 \end{bmatrix} \right\}$$

$(Y_1, Y_2) \in$ $\{(e_5, [e_1 \ e_5]), (e_6, [e_2 \ e_6]), (e_7, [e_3 \ e_7]), (e_8, [e_4 \ e_8])\}$ or, $$C_{PUCCH}^2 = \left\{ \frac{1}{\sqrt{2}} \begin{bmatrix} Y_1 & Y_2 \\ Y_1 & -Y_2 \end{bmatrix} \right\}$$

$(Y_1, Y_2) \in$ $\{(e_5, [e_1 \ e_5]), (e_6, [e_2 \ e_6]), (e_7, [e_3 \ e_7]), (e_8, [e_4 \ e_8])\}$ or, $$C_{PUCCH}^2 = \left\{ \frac{1}{\sqrt{2}} \begin{bmatrix} Y_1 & Y_2 \\ -Y_1 & Y_2 \end{bmatrix} \right\}$$

$(Y_1, Y_2) \in$ $\{(e_5, [e_1 \ e_5]), (e_6, [e_2 \ e_6]), (e_7, [e_3 \ e_7]), (e_8, [e_4 \ e_8])\}$ or, $$C_{PUCCH}^2 = \left\{ \frac{1}{\sqrt{2}} \begin{bmatrix} Y_1 & Y_2 \\ Y_1 & -Y_2 \end{bmatrix} \right\}$$

$(Y_1, Y_2) \in$ $\{(e_1, [e_1 \ e_5]), (e_2, [e_2 \ e_6]), (e_3, [e_3 \ e_7]), (e_4, [e_4 \ e_8])\}$ or, $$C_{PUCCH}^2 = \left\{ \frac{1}{\sqrt{2}} \begin{bmatrix} Y_1 & Y_2 \\ -Y_1 & Y_2 \end{bmatrix} \right\}$$

$(Y_1, Y_2) \in$ $\{(e_1, [e_1 \ e_5]), (e_2, [e_2 \ e_6]), (e_3, [e_3 \ e_7]), (e_4, [e_4 \ e_8])\}$ 2) case 2, $C_{PUSCH}^1$ is the same as in the ease 1 of the present embodiment, and $C_{PUSCH}^2$ also can be the following format:

$$C_{PUCCH}^2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ -Y_1 & Y_2 \end{bmatrix}, \frac{1}{\sqrt{2}} \begin{bmatrix} Y_1 & Y_2 \\ jY_1 & -jY_2 \end{bmatrix}, \frac{1}{\sqrt{2}} \begin{bmatrix} Y_1 & Y_2 \\ -jY_1 & jY_2 \end{bmatrix} \right\}$$

$(Y_1, Y_2) \in$ $\left\{ \begin{array}{l} (e_1, [e_1 \ e_5]), (e_2, [e_2 \ e_6]), (e_3, [e_3 \ e_7]), (e_4, [e_4 \ e_8]), \\ (e_5, [e_1 \ e_5]), (e_6, [e_2 \ e_6]), (e_7, [e_3 \ e_7]), (e_8, [e_4 \ e_8]), \end{array} \right\}$ Extracting the code words from the $C_{PUSCH}^1$ to form the $C_{PUCCH}^1$ can be in any method; and $C_{PUCCH}^2$ can be all formats described in the extracting mode 2 of the above case 1, or:

$$C_{PUCCH}^2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ -Y_1 & Y_2 \end{bmatrix}, \frac{1}{\sqrt{2}} \begin{bmatrix} Y_1 & Y_2 \\ jY_1 & -jY_2 \end{bmatrix}, \frac{1}{\sqrt{2}} \begin{bmatrix} Y_1 & Y_2 \\ -jY_1 & jY_2 \end{bmatrix} \right\}$$

$(Y_1, Y_2) \in \left\{ \begin{array}{l} (e_1, [e_1 \ e_5]), (e_2, [e_2 \ e_6]), (e_3, [e_3 \ e_7]), (e_4, [e_4 \ e_8]) \\ (e_5, [e_1 \ e_5]), (e_6, [e_2 \ e_6]), (e_7, [e_3 \ e_7]), (e_8, [e_4 \ e_8]) \end{array} \right\}$ or, $$C_{PUCCH}^2 = \left\{ \frac{1}{\sqrt{2}} \begin{bmatrix} Y_1 & Y_2 \\ -Y_1 & Y_2 \end{bmatrix}, \frac{1}{\sqrt{2}} \begin{bmatrix} Y_1 & Y_2 \\ -jY_1 & jY_2 \end{bmatrix} \right\}$$

$(Y_1, Y_2) \in \left\{ \begin{array}{l} (e_1, [e_1 \ e_5]), (e_2, [e_2 \ e_6]), \\ (e_3, [e_3 \ e_7]), (e_4, [e_4 \ e_8]) \\ (e_5, [e_1 \ e_5]), (e_6, [e_2 \ e_6]), \\ (e_7, [e_3 \ e_7]), (e_8, [e_4 \ e_8]) \end{array} \right\}$ or, $$C_{PUCCH}^2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ -jY_1 & jY_2 \end{bmatrix} \right\}$$

$(Y_1, Y_2) \in \left\{ \begin{array}{l} (e_1, [e_1 \ e_5]), (e_2, [e_2 \ e_6]), \\ (e_3, [e_3 \ e_7]), (e_4, [e_4 \ e_8]) \\ (e_5, [e_1 \ e_5]), (e_6, [e_2 \ e_6]), \\ (e_7, [e_3 \ e_7]), (e_8, [e_4 \ e_8]) \end{array} \right\}$ or, $$C_{PUCCH}^2 = \left\{ \frac{1}{\sqrt{2}} \begin{bmatrix} Y_1 & Y_2 \\ -Y_1 & Y_2 \end{bmatrix}, \frac{1}{\sqrt{2}} \begin{bmatrix} Y_1 & Y_2 \\ jY_1 & -jY_2 \end{bmatrix} \right\}$$

$(Y_1, Y_2) \in \left\{ \begin{array}{l} (e_1, [e_1 \ e_5]), (e_2, [e_2 \ e_6]), \\ (e_3, [e_3 \ e_7]), (e_4, [e_4 \ e_8]), \\ (e_5, [e_1 \ e_5]), (e_6, [e_2 \ e_6]), \\ (e_7, [e_3 \ e_7]), (e_8, [e_4 \ e_8]) \end{array} \right\}$ or, $$C_{PUCCH}^2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}$$

$(Y_1, Y_2) \in \left\{ \begin{array}{l} (e_1, [e_1 \ e_5]), (e_2, [e_2 \ e_6]), \\ (e_3, [e_3 \ e_7]), (e_4, [e_4 \ e_8]) \end{array} \right\}$ or, $$C_{PUCCH}^2 = \left\{ \frac{1}{\sqrt{2}} \begin{bmatrix} Y_1 & Y_2 \\ -Y_1 & Y_2 \end{bmatrix}, \frac{1}{\sqrt{2}} \begin{bmatrix} Y_1 & Y_2 \\ -jY_1 & jY_2 \end{bmatrix} \right\}$$

-continued $$(Y_1, Y_2) \in \left\{ \begin{array}{l} (e_1, [e_1 \; e_5]), (e_2, [e_2 \; e_6]), \\ (e_3, [e_3 \; e_7]), (e_4, [e_4 \; e_8]) \end{array} \right\}$$

or, $$C_{PUCCH}^2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ -jY_1 & jY_2 \end{bmatrix} \right\}$$

$$(Y_1, Y_2) \in \left\{ \begin{array}{l} (e_1, [e_1 \; e_5]), (e_2, [e_2 \; e_6]), \\ (e_3, [e_3 \; e_7]), (e_4, [e_4 \; e_8]) \end{array} \right\}$$

or, $$C_{PUCCH}^2 = \left\{ \frac{1}{\sqrt{2}} \begin{bmatrix} Y_1 & Y_2 \\ -Y_1 & Y_2 \end{bmatrix}, \frac{1}{\sqrt{2}} \begin{bmatrix} Y_1 & Y_2 \\ jY_1 & -jY_2 \end{bmatrix} \right\}$$

$$(Y_1, Y_2) \in \left\{ \begin{array}{l} (e_1, [e_1 \; e_5]), (e_2, [e_2 \; e_6]), \\ (e_3, [e_3 \; e_7]), (e_4, [e_4 \; e_8]) \end{array} \right\}.$$

3) case 3: the value of $C_{PUSCH}^1$ is the same as in the case 1 of the present embodiment; $C_{PUSCH}^2$ also can be the following format:

$$C_{PUCCH}^2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}$$

$$(Y_1, Y_2) \in$$

$$\left\{ \begin{array}{l} (e_1, [e_1 \; e_5]), (e_2, [e_2 \; e_6]), (e_3, [e_3 \; e_7]), (e_4, [e_4 \; e_8]), \\ (e_5, [e_1 \; e_5]), (e_6, [e_2 \; e_6]), (e_7, [e_3 \; e_7]), (e_8, [e_4 \; e_8]), \end{array} \right\}.$$

Extracting the code words from the $C_{PUSCH}^1$ to form the $C_{PUCCH}^1$ can be in any method; and extracting the code words from the $C_{PUSCH}^2$ to form the $C_{PUCCH}^2$ can be extracting the following code words:

$$C_{PUCCH}^2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}$$

$$(Y_1, Y_2) \in \left\{ \begin{array}{l} (e_1, [e_1 \; e_5]), (e_2, [e_2 \; e_6]), \\ (e_3, [e_3 \; e_7]), (e_4, [e_4 \; e_8]) \end{array} \right\}$$

or, $$C_{PUCCH}^2 = \left\{ \frac{1}{\sqrt{2}} \begin{bmatrix} Y_1 & Y_2 \\ Y_1 & -Y_2 \end{bmatrix} \right\}$$

$$(Y_1, Y_2) \in \left\{ \begin{array}{l} (e_1, [e_1 \; e_5]), (e_2, [e_2 \; e_6]), \\ (e_3, [e_3 \; e_7]), (e_4, [e_4 \; e_8]) \end{array} \right\}$$

or, $$C_{PUCCH}^2 = \left\{ \frac{1}{\sqrt{2}} \begin{bmatrix} Y_1 & Y_2 \\ Y_1 & -Y_2 \end{bmatrix} \right\}$$

$$(Y_1, Y_2) \in$$

$$\left\{ \begin{array}{l} (e_1, [e_1 \; e_5]), (e_2, [e_2 \; e_6]), (e_3, [e_3 \; e_7]), (e_4, [e_4 \; e_8]), \\ (e_5, [e_1 \; e_5]), (e_6, [e_2 \; e_6]), (e_7, [e_3 \; e_7]), (e_8, [e_4 \; e_8]), \end{array} \right\}$$

The above-mentioned embodiment is only a preferable embodiment. For other different formats that have the structure characteristics described in the present invention, such as, the $C_{PUSCH}^2$, etc., the idea of the present invention can be used to extract the code words to form the $C_{PUCCH}^2$. The above-mentioned embodiment includes the combination of all kinds of extracting ideas.

The transformed codebook obtained after exchanging the columns, or multiplying by constant coefficient, or exchanging the rows of all code words together for the $C_{PUSCH}^1$ and/or the $C_{PUSCH}^2$ also can use the extracting method described in the present embodiment; or, the transformed codebook obtained after exchanging the columns, or multiplying by constant coefficient, or exchanging the rows of all code words together for the $C_{PUSCH}$ also can use the extracting method described in the present embodiment. The code words in the $C_{PUCCH}$, $C_{PUCCH}^1$ and $C_{PUCCH}^2$ also have the corresponding equivalent transformation representing format.

Embodiment 7, the $C_{PUCCH}$ is formed by extracting code words from the Rank4 codebook of the $C_{PUSCH}$.

For example, one kind of method for forming the dual codebooks used by the PUSCH is that:

$C_{PUSCH}^1$ (the codebook corresponding to W1) is formed by $m_1$ code words;

$$X^{(k)} \in \{[b_{(\frac{N_b}{2}k)modN} \; b_{(\frac{N_b}{2}k+1)modN} \; \cdots \; b_{(\frac{N_b}{2}k+N_b-1)modN}] : k = 0,$$
$$1, \ldots, m_1 - 1\}$$

$$W_1^{(k)} = \begin{bmatrix} X^{(k)} & 0 \\ 0 & X^{(k)} \end{bmatrix},$$

$$C_1 = \{W_1^{(0)}, W_1^{(1)}, W_1^{(2)}, \ldots, W_1^{(2N/N_b-1)}\}$$

wherein, $$m_1 = \frac{2N}{N_b},$$

and $N_b$ is the number of columns of the matrix $X^{(k)}$, $b_i$ is a vector, for example, it typically is the DPT vector (but not limited to this case), there are n basic vectors $b_0 \sim b_{N-1}$ altogether; if $b_i$ is a DFT vector varying with each other, described as:

$$B = [b_0 \; b_1 \; \ldots \; b_{N-1}],$$

$$[B]_{1+m,1+n} = e^{j\frac{2\pi mn}{N}},$$

$$m = 0, 1, \ldots, \frac{N_{tx}}{2} - 1$$

$$n = 0, 1, \ldots, N - 1,$$

wherein, $N_{tx}$ is a parameter related to the vector dimension, and usually indicates the number of the transmitting antennas.

Supposing $N_{tx}=8$, $N^b=8$ and $N=32$, then the $$16\left(m_1 = \frac{2N}{N_b} = 8\right)$$

code words contained by the $C_{PUSCH}^1$ are:

$$W_1^{(k)} = \begin{bmatrix} X^{(k)} & 0 \\ 0 & X^{(k)} \end{bmatrix},$$

$$C_1 = \{W_1^{(0)}, W_1^{(1)}, W_1^{(2)}, \ldots, W_1^{(7)}\}$$

$$X^{(0)} = [b_0 \ b_1 \ \ldots \ b_7]$$
$$X^{(1)} = [b_4 \ b_6 \ \ldots \ b_{11}] \ X^{(2)} = [b_8 \ b_9 \ \ldots \ b_{15}] \ \ldots \ldots$$
$$X^{(6)} = [b_{24} \ b_{25} \ \ldots \ b_{31}] \ X^{(7)} = [b_{28} \ b_{29} \ \ldots \ b_3]$$

If $N_{tx}=8$ and $N_b=8$ and $N=16$, then the $$4\left(m_1 = \frac{2N}{N_b} = 4\right)$$

code words contained by the $C_{PUSCH}^1$ are:

$$W_1^{(k)} = \begin{bmatrix} X^{(k)} & 0 \\ 0 & X^{(k)} \end{bmatrix},$$
$$C_1 = \{W_1^{(0)}, W_1^{(1)}, W_1^{(2)}, \ldots, W_1^{(3)}\}$$
$$X^{(0)} = [b_0 \ b_1 \ \ldots \ b_7]$$
$$X^{(1)} = [b_4 \ b_6 \ \ldots \ b_{11}]$$
$$X^{(2)} = [b_8 \ b_9 \ \ldots \ b_{15}]$$
$$X^{(3)} = [b_{12} \ b_{13} \ \ldots \ b_3]$$

$C_{PUSCH}^2$ (the codebook corresponding to W2) is formed by $m_2$ code words, for example, for Rank4, the 8 code words contained therein are:

$$W_2 \in C_2 = \left\{\frac{1}{\sqrt{2}}\begin{bmatrix} Y & Y \\ Y & -Y \end{bmatrix}, \frac{1}{\sqrt{2}}\begin{bmatrix} Y & Y \\ jY & -jY \end{bmatrix}\right\}$$

$$Y \in \{[e_1 \ e_5], [e_2 \ e_6], [e_3 \ e_7], [e_4 \ e_8]\}$$

wherein, $\tilde{e}_i$ is a vector of $$\frac{N_{tx}}{2} \times 1,$$

the $i^{th}$ element is 1, and other elements are 0, which actually is one column-selected vector.

Extracting Mode 1:

extracting the code words from the $C_{PUSCH}^2$ to form the $C_{PUCCH}^2$ can be in any method; and extracting the code words from the $C_{PUSCH}^1$ to form the $C_{PUCCH}^1$ can be extracting part or all code words of the code words $W_1^{(0)}$ $W_1^{(2)}$ $W_1^{(4)}$ $W_1^{(6)}$ ... $W_1^{(2N/N_b-2)}$ with the Index being even or the code words $W_1^{(1)}$ $W_1^{(3)}$ $W_1^{(5)}$ $W_1^{(7)}$ ... $W_1^{(2N/N_b-1)}$ with the Index being odd. That is to say, the extracting methods under Rank1, Rank2 and Rank3 described in above embodiments are also applied to Rank4.

Extracting Mode 2: extracting the code words from the $C_{PUSCH}^1$ to form the $C_{PUCCH}^1$ can be in any method; and extracting the code words from the $C_{PUSCH}^2$ to form the $C_{PUCCH}^2$ can be extracting the following code words:

$$C_{PUCCH}^2 = \left\{\frac{1}{\sqrt{2}}\begin{bmatrix} Y & Y \\ Y & -Y \end{bmatrix}\right\}$$

$$Y \in \left\{\begin{matrix} [e_1 \ e_5], [e_2 \ e_6], \\ [e_3 \ e_7], [e_4 \ e_8] \end{matrix}\right\}$$

or, $$C_{PUCCH}^2 = \left\{\frac{1}{\sqrt{2}}\begin{bmatrix} Y & Y \\ jY & -jY \end{bmatrix}\right\}$$

$$Y \in \left\{\begin{matrix} [e_1 \ e_5], [e_2 \ e_6], \\ [e_3 \ e_7], [e_4 \ e_8] \end{matrix}\right\}$$

or, $$C_{PUCCH}^2 = \left\{\frac{1}{\sqrt{2}}\begin{bmatrix} Y & Y \\ Y & -Y \end{bmatrix}, \frac{1}{\sqrt{2}}\begin{bmatrix} Y & Y \\ jY & -jY \end{bmatrix}\right\}$$

$$Y \in \{[e_1 \ e_5], [e_3 \ e_7]\}.$$

The transformed codebook obtained after exchanging the columns or multiplying by constant coefficient or exchanging the rows of all code words together for the $C_{PUSCH}^1$ and/or the $C_{PUSCH}^2$ also can use the extracting method described in the present embodiment; or, the transformed codebook obtained after exchanging the columns or multiplying by constant coefficient or exchanging the rows of all code words together for the $C_{PUSCH}$ also can use the extracting method described in the present embodiment. The code words in the $C_{PUCCH}$, $C_{PUCCH}^1$ and $C_{PUCCH}^2$ also have the corresponding equivalent transformation representing format.

Embodiment 8, the $C_{PUCCH}$ is formed by extracting code words from the Rank5-7 codebooks of the $C_{PUSCH}$.

For example, one kind of the dual codebooks used by the PUSCH is that:

| | $\phi_n = e^{j\pi n/2}$ | | |
|---|---|---|---|
| | $v_m = [1 \quad e^{j2\pi m/32} \quad e^{j4\pi m/32} \quad e^{j6\pi m/32}]^T$ | | |
| | $i_2$ | | |
| $i_1$ | 0 | | |
| | Rank5 | | |
| 0-3 | $W_{i_1}^{(5)} = \dfrac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ | | |
| | Rank6 | | |
| 0-3 | $W_{i_1}^{(6)} = \dfrac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ | | |
| | Rank7 | | |
| 0-3 | $W_{i_1}^{(7)} = \dfrac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ | | |

The PUCCH codebook extracted to use is:

| | $\phi_n = e^{j\pi n/2}$ | | |
|---|---|---|---|
| | $v_m = [1 \quad e^{j2\pi m/32} \quad e^{j4\pi m/32} \quad e^{j6\pi m/32}]^T$ | | |
| | $i_2$ | | |
| $i_1$ | 0 | | |
| | Rank5 | | |
| 0, 2 | $W_{i_1}^{(5)} = \dfrac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ | | |
| | Rank6 | | |
| 0, 2 | $W_{i_1}^{(6)} = \dfrac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ | | |
| | Rank7 | | |
| 0, 2 | $W_{i_1}^{(7)} = \dfrac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ | | |

If the code words in the $C_{PUSCH}$ meet the model in each above-mentioned method after finishing the equivalence transformation (exchanging the columns, multiplying by constant coefficient, or exchanging the rows of all code words together), the $C_{PUCCH}$ can be formed according to the similar method provided in method 2 to method 5. The code words in the $C_{PUCCH}$ also have the corresponding equivalence transformation format.

Embodiment 9

One single codebook equivalent to the dual codebooks of the $C_{PUSCH}$ Rank1 is that:

| $i_1$ | | | | $i_2$ | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | | | | $i_2$ | | | | |
|---|---|---|---|---|---|---|---|---|
| | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$ wherein, $\varphi_n = e^{j\pi n/2}$ $v_m = [1 \quad e^{j2\pi m/32} \quad e^{j4\pi m/32} \quad e^{j6\pi m/32}]^T$ $W_{m,n}^{(1)}$ is one matrix which needs to be determined by the values of m and n, m and n are integers, and m and n are related with the first index $i_1$ and second index $i_2$ which need to be fed back. This codebook is equivalent to the Rank1 codebook in the embodiments 2, 3 and 4, and the difference lies in that the $C_{PUSCH}$ Rank1 codebook in the embodiments 2, 3 and 4 define 2 codebooks and one function relation. And what the present embodiment defines is a single codebook equivalent to the dual codebooks. But no matter which kind of format it is, these two modes are equivalent, and the codebook can be defined in any mode, and there are 2 the fed back indexes in either mode. $i_1$ can be regarded as the fed back index corresponding to the codebook C1 in embodiments 2, 3 and 4, and can be regarded as the fed back index corresponding to the codebook C2 in embodiments 2, 3 and 4.

Since the $C_{PUSCH}$s in embodiments 2, 3 and 4 are equivalent to the codebook in the present embodiment, and the difference only lies in that it is implemented by using the dual codebooks in the embodiments 2, 3 and 4, while in the present embodiment, it is the feedback mode of the single codebook equivalent to the dual codebooks, but the ideas of extracting the codebook to form the $C_{PUCCH}$ are totally the same. So the methods described by the above embodiments are all applied to the $C_{PUSCH}$ in the present embodiment.

In addition, it can be obtained easily about how to perform the code work extracting for the $i_1$ and/or perform the code work extracting for the $i_2$, according to the description of how to extract the $C_{PUCCH}^1$ from the $C_{PUSCH}^1$ and/or how to extract the $C_{PUCCH}^2$ from the $C_{PUSCH}^2$ in embodiments 2, 3 and 4.

Since there are many contents about embodiments 2, 3 and 4, here they will not be described in detail, and it is only illustrated by taking part of the extracting methods therein as an example.

Following code words can be selected to form the $C_{PUCCH}$ (corresponding to the idea of embodiment 2, no repetitive code words are contained after extracting):

| $i_1$ | | | | $i_2$ | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ | that is, all or part of the code words in all the code words corresponding to $i_1=0\sim15$ and $i_2=0\sim7$.

Or selecting all or part of the code words in

| $i_1$ | | | | $i_2$ | | | | |
|---|---|---|---|---|---|---|---|---|
| | 0 | 1 | 2 | 3 | 4 | 5 | 6 | 7 |
| 0, 2, 4, 6, 8, 10, 12, 14 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| | 8 | 9 | 10 | 11 | 12 | 13 | 14 | 15 |
| | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |

That is, all the code words corresponding to $i_1=0, 2, 4, 6, 8 \ldots 14$ and $i_2=0\sim15$.

The essences of the methods for extracting the code word described by two above-mentioned methods are the same, which are just two kinds of different implementation methods, and more specifically, it can be represented as extracting all or part of the code words from the following 128 code words:

$W_{0,0}^{(1)} \ldots W_{0,3}^{(1)}, W_{1,0}^{(1)} \ldots W_{1,3}^{(1)}, \ldots, W_{31,0}^{(1)} \ldots W_{31,3}^{(1)}$ and also less code words can be selected to form the codebook:

$$\bigcup_{k=0}^{3} \left\{ \begin{bmatrix} v_{8k+0} \\ v_{8k+0} \end{bmatrix} \begin{bmatrix} v_{8k+2} \\ jv_{8k+2} \end{bmatrix} \begin{bmatrix} v_{8k+4} \\ -v_{8k+4} \end{bmatrix} \begin{bmatrix} v_{8k+6} \\ jv_{8k+6} \end{bmatrix} \right\}$$

that is the following 16 code words:

$W_{0,0}^{(1)} = \frac{1}{\sqrt{8}} \begin{bmatrix} v_0 \\ \phi_0 v_0 \end{bmatrix} \ W_{2,1}^{(1)} = \frac{1}{\sqrt{8}} \begin{bmatrix} v_2 \\ \phi_1 v_2 \end{bmatrix} \ W_{4,2}^{(1)} = \frac{1}{\sqrt{8}} \begin{bmatrix} v_4 \\ \phi_2 v_4 \end{bmatrix}$ $W_{6,3}^{(1)} = \frac{1}{\sqrt{8}} \begin{bmatrix} v_6 \\ \phi_3 v_6 \end{bmatrix} \ W_{8,0}^{(1)} = \frac{1}{\sqrt{8}} \begin{bmatrix} v_8 \\ \phi_0 v_8 \end{bmatrix} \ W_{10,1}^{(1)} = \frac{1}{\sqrt{8}} \begin{bmatrix} v_{10} \\ \phi_1 v_{10} \end{bmatrix}$ $W_{12,2}^{(1)} = \frac{1}{\sqrt{8}} \begin{bmatrix} v_{12} \\ \phi_2 v_{12} \end{bmatrix} \ W_{14,3}^{(1)} = \frac{1}{\sqrt{8}} \begin{bmatrix} v_{14} \\ \phi_3 v_{14} \end{bmatrix} \ W_{16,0}^{(1)} = \frac{1}{\sqrt{8}} \begin{bmatrix} v_{16} \\ \phi_0 v_{16} \end{bmatrix}$ $W_{18,1}^{(1)} = \frac{1}{\sqrt{8}} \begin{bmatrix} v_{18} \\ \phi_1 v_{18} \end{bmatrix} \ W_{20,2}^{(1)} = \frac{1}{\sqrt{8}} \begin{bmatrix} v_{20} \\ \phi_2 v_{20} \end{bmatrix} \ W_{22,3}^{(1)} = \frac{1}{\sqrt{8}} \begin{bmatrix} v_{22} \\ \phi_3 v_{22} \end{bmatrix}$ $W_{24,0}^{(1)} = \frac{1}{\sqrt{8}} \begin{bmatrix} v_{24} \\ \phi_0 v_{24} \end{bmatrix} \ W_{26,1}^{(1)} = \frac{1}{\sqrt{8}} \begin{bmatrix} v_{26} \\ \phi_1 v_{26} \end{bmatrix} \ W_{28,2}^{(1)} = \frac{1}{\sqrt{8}} \begin{bmatrix} v_{28} \\ \phi_2 v_{28} \end{bmatrix}$ -continued $W_{30,3}^{(1)} = \frac{1}{\sqrt{8}} \begin{bmatrix} v_{30} \\ \phi_3 v_{30} \end{bmatrix}$ It can be found that it is responding to the idea when N=32, $$C_{PUCCH} = \bigcup_{k=0}^{3} \left\{ \begin{bmatrix} b_{8k+0} \\ b_{8k+0} \end{bmatrix} \begin{bmatrix} b_{8k+2} \\ jb_{8k+2} \end{bmatrix} \begin{bmatrix} b_{8k+4} \\ -b_{8k+4} \end{bmatrix} \begin{bmatrix} b_{8k+6} \\ jb_{8k+6} \end{bmatrix} \right\},$$

described in embodiment 3.

If the code words in the $C_{PUSCH}$ meet the model in each above-mentioned method after finishing the equivalence transformation (exchanging the columns, multiplying by constant coefficient or exchanging the rows of all code words together), the $C_{PUCCH}$ can be formed according to the similar methods provided in method 2 to method 5. The code words in the $C_{PUCCH}$ also have the corresponding equivalence transformation format.

Embodiment 10

The Rank2 codebook in embodiment 5 can be represented by the following single codebook equivalent to the dual codebooks:

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,2i_1,0}^{(2)}$ | $W_{2i_1,2i_1,1}^{(2)}$ | $W_{2i_1,2i_1+1,0}^{(2)}$ | $W_{2i_1,2i_1+1,1}^{(2)}$ | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ |

$W_{m,m',n}^{(2)} = \frac{1}{4} \begin{bmatrix} v_m & v_{m'} \\ \varphi_n v_m & -\varphi_n v_{m'} \end{bmatrix}$ wherein,
$\phi_n = e^{jn\pi/2}$
$v_m = [1 \ e^{j2\pi m/32} \ e^{j4\pi m/32} \ e^{j6\pi m/32}]^T$ $W_{m,m',n}^{(2)}$ is one matrix which needs to be determined by the values of m, m', n, and these parameters are related to the first index $i_1$ and second index $i_2$ needing to be fed back. This is equivalent to the Rank2 codebook in the embodiment 5, and the difference lies in that the $C_{PUSCH}$ Rank2 codebook in the embodiment 5 defines 2 codebooks and a function relation. And what the present embodiment defines is a single codebook format equivalent to the dual codebooks. But no matter which kind of format it is, these two modes are equivalent, and the codebook can be defined in any mode, and there are 2 fed back indexes in either mode. $i_1$ can be regarded as the fed back index corresponding to the codebook C1 in embodiment 5, and $i_2$ can be regarded as the fed back index corresponding to the codebook C2 in embodiment 5.

Since the $C_{PUSCH}$ in embodiment 5 is equivalent to the codebook in the present embodiment, and the difference only lies in that it is implemented by using the dual codebooks in the embodiment 5, while in the present embodiment, it is the feedback mode of the single codebook equivalent to the dual codebooks, but the ideas of extracting the codebook to form in the $C_{PUCCH}$ are totally the same. So the methods described by the above embodiments are all applied to the $C_{PUSCH}$ in the present embodiment.

In addition, it can be obtained easily about how to perform the code work extracting for the $i_1$ and/or perform the code work extracting for the $i_2$, according to the description of how to extract the $C_{PUCCH}^1$ from the $C_{PUSCH}^1$ and/or how to extract the $C_{PUCCH}^2$ from the $C_{PUSCH}^2$ in embodiment 5.

Since there are many contents about embodiment 5, here they will not be described in detail again, and it is only illustrated by taking part of the extracting methods therein as an example.

All or part of the following code words can be selected to form the $C_{PUCCH}$ (corresponding to the idea of embodiment 5, no repetitive code words are contained after extracting):

-continued $$W_{20,20,2}^{(2)} = \frac{1}{\sqrt{8}}\begin{bmatrix} v_{20} & v_{20} \\ \phi_2 v_{20} & \phi_2 v_{20} \end{bmatrix} \quad W_{22,22,3}^{(2)} = \frac{1}{\sqrt{8}}\begin{bmatrix} v_{22} & v_{22} \\ \phi_3 v_{22} & \phi_1 v_{22} \end{bmatrix}$$

$$W_{24,24,0}^{(2)} = \frac{1}{\sqrt{8}}\begin{bmatrix} v_{24} & v_{24} \\ \phi_0 v_{24} & \phi_2 v_{24} \end{bmatrix} \quad W_{26,26,1}^{(2)} = \frac{1}{\sqrt{8}}\begin{bmatrix} v_{26} & v_{26} \\ \phi_1 v_{26} & \phi_3 v_{26} \end{bmatrix}$$

$$W_{28,28,2}^{(2)} = \frac{1}{\sqrt{8}}\begin{bmatrix} v_{28} & v_{28} \\ \phi_2 v_{28} & \phi_0 v_{28} \end{bmatrix} \quad W_{30,30,3}^{(2)} = \frac{1}{\sqrt{8}}\begin{bmatrix} v_{30} & v_{30} \\ \phi_3 v_{30} & \phi_1 v_{30} \end{bmatrix}$$

| | $i_2$ | | | | | | | |
|---|---|---|---|---|---|---|---|---|
| $i_1$ | 0 | 1 | 2 | 3 | 4 | 5 | 6 | 7 |
| 0, 2, 4, 6, 8, 10, 12, 14 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| | $i_2$ | | | | | | | |
|---|---|---|---|---|---|---|---|---|
| $i_1$ | 8 | 9 | 10 | 11 | 12 | 13 | 14 | 15 |
| 0, 2, 4, 6, 8, 10, 12, 14 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ |

$$W_{m,m',n}^{(2)} = \frac{1}{4}\begin{bmatrix} v_m & v_{m'} \\ \varphi_n v_m & -\varphi_n v_{m'} \end{bmatrix}$$

That is, the code words corresponding to $i_1=0, 2, 4, 6, 8 \ldots 14$ and $i_2=0{\sim}15$.

If the overhead is further reduced, it can be the following 16 code words:

$$W_{0,0,0}^{(2)} = \frac{1}{\sqrt{8}}\begin{bmatrix} v_0 & v_0 \\ \phi_0 v_0 & \phi_2 v_0 \end{bmatrix} \quad W_{2,2,1}^{(2)} = \frac{1}{\sqrt{8}}\begin{bmatrix} v_2 & v_2 \\ \phi_1 v_2 & \phi_3 v_2 \end{bmatrix}$$

$$W_{4,4,2}^{(2)} = \frac{1}{\sqrt{8}}\begin{bmatrix} v_4 & v_4 \\ \phi_2 v_4 & \phi_0 v_4 \end{bmatrix} \quad W_{6,6,3}^{(2)} = \frac{1}{\sqrt{8}}\begin{bmatrix} v_6 & v_6 \\ \phi_3 v_6 & \phi_1 v_6 \end{bmatrix}$$

$$W_{8,8,0}^{(2)} = \frac{1}{\sqrt{8}}\begin{bmatrix} v_8 & v_8 \\ \phi_0 v_8 & \phi_2 v_8 \end{bmatrix} \quad W_{10,10,1}^{(2)} = \frac{1}{\sqrt{8}}\begin{bmatrix} v_{10} & v_{10} \\ \phi_1 v_{10} & \phi_3 v_{10} \end{bmatrix}$$

$$W_{12,12,2}^{(2)} = \frac{1}{\sqrt{8}}\begin{bmatrix} v_{12} & v_{12} \\ \phi_2 v_{12} & \phi_0 v_{12} \end{bmatrix} \quad W_{14,14,3}^{(2)} = \frac{1}{\sqrt{8}}\begin{bmatrix} v_{14} & v_{14} \\ \phi_3 v_{14} & \phi_1 v_{14} \end{bmatrix}$$

$$W_{16,16,0}^{(2)} = \frac{1}{\sqrt{8}}\begin{bmatrix} v_{16} & v_{16} \\ \phi_0 v_{16} & \phi_2 v_{16} \end{bmatrix} \quad W_{18,18,1}^{(2)} = \frac{1}{\sqrt{8}}\begin{bmatrix} v_{18} & v_{18} \\ \phi_1 v_{18} & \phi_3 v_{18} \end{bmatrix}$$

If the code words in the $C_{PUSCH}$ meet the model in each above-mentioned method after finishing the equivalence transformation (exchanging the columns, multiplying by constant coefficient or exchanging the rows of all code words together), the $C_{PUCCH}$ can be formed according to the similar methods provided in method 2 to method 5. The code words in the $C_{PUCCH}$ also have the corresponding equivalence transformation format.

Embodiment 11

The Rank3 codebook in embodiment 6 can be represented by the following single codebook equivalent to the dual codebooks:

| | $i_2$ | | | |
|---|---|---|---|---|
| $i_1$ | 0 | 1 | 2 | 3 |
| 0-7 | $W_{4i_1,4i_1,4i_1+4}^{(3)}$ | $W_{4i_1+4,4i_1,4i_1+4}^{(3)}$ | $\tilde{W}_{4i_1,4i_1+4,4i_1+4}^{(3)}$ | $\tilde{W}_{4i_1+4,4i_1,4i_1}^{(3)}$ |

| | $i_2$ | | | |
|---|---|---|---|---|
| $i_1$ | 4 | 5 | 6 | 7 |
| 0-7 | $W_{4i_1+1,4i_1+1,4i_1+5}^{(3)}$ | $W_{4i_1+5,4i_1+1,4i_1+5}^{(3)}$ | $\tilde{W}_{4i_1+1,4i_1+5,4i_1+5}^{(3)}$ | $\tilde{W}_{4i_1+5,4i_1+1,4i_1+1}^{(3)}$ |

-continued

| $i_1$ | | | $i_2$ | |
|---|---|---|---|---|
| | 8 | 9 | 10 | 11 |
| 0-7 | $W^{(3)}_{4i_1+2,4i_1+2,4i_1+6}$ | $W^{(3)}_{4i_1+6,4i_1+2,4i_1+6}$ | $\tilde{W}^{(3)}_{4i_1+2,4i_1+6,4i_1+6}$ | $\tilde{W}^{(3)}_{4i_1+6,4i_1+2,4i_1+2}$ |

| $i_1$ | | | $i_2$ | |
|---|---|---|---|---|
| | 12 | 13 | 14 | 15 |
| 0-7 | $W^{(3)}_{4i_1+3,4i_1+3,4i_1+7}$ | $W^{(3)}_{4i_1+7,4i_1+3,4i_1+7}$ | $\tilde{W}^{(3)}_{4i_1+3,4i_1+7,4i_1+7}$ | $\tilde{W}^{(3)}_{4i_1+7,4i_1+3,4i_1+3}$ | where $W^{(3)}_{m,m',m''} = \frac{1}{\sqrt{24}}\begin{bmatrix} v_m & v_{m'} & v_{m''} \\ v_m & -v_{m'} & -v_{m''} \end{bmatrix}$, $\tilde{W}^{(3)}_{m,m',m''} = \frac{1}{\sqrt{24}}\begin{bmatrix} v_m & v_{m'} & v_{m''} \\ v_m & v_{m'} & -v_{m''} \end{bmatrix}$ wherein,
$\phi_n = e^{j\pi n/2}$
$v_m = [1 \quad e^{j2\pi m/32} \quad e^{j4\pi m/32} \quad e^{j6\pi m/32}]^T$ $W^{(3)}_{m,m',m''}$ $\tilde{W}^{(3)}_{m,m',m''}$ is one matrix which needs to be determined by the values of m, m', m'', and these parameters are related to the first index $i_1$ and second index $i_2$ needing to be fed back. This is equivalent to the Rank3 codebook in the embodiment 6, and the difference lies in that the $C_{PUSCH}$ Rank3 codebook in the embodiment 6 defines 2 codebooks and a function relation. And what the present embodiment defines is a single codebook format equivalent to the dual codebooks. But no matter which kind of format it is, these two modes are equivalent, and the codebook can be defined in any mode, and there are 2 fed back indexes in either mode. $i_1$ can be regarded as the fed back index corresponding to the codebook C1 in embodiment 6, and $i_2$ can be regarded as the fed back index corresponding to the codebook C2 in embodiment 6.

Since the $C_{PUSCH}$ in embodiment 6 is equivalent to the codebook in the present embodiment, and the difference only lies in that it is implemented by using the dual codebooks in the embodiment 6, while in the present embodiment, it is the feedback mode of the single codebook equivalent to the dual codebooks, but the ideas of extracting the codebook to form the $C_{PUCCH}$ are totally the same. So the methods described by the above embodiments are all applied to the $C_{PUSCH}$ in the present embodiment.

Since there are many contents about embodiment 6, here they will not be described in detail again, and it is only illustrated by taking part of the extracting methods therein as an example.

All or part of the following code words can be selected to form the $C_{PUCCH}$:

| $i_1$ | | | $i_2$ | |
|---|---|---|---|---|
| | 0 | 1 | 2 | 3 |
| 0, 2, 4, 6 | $W^{(3)}_{4i_1,4i_1,4i_1+4}$ | $W^{(3)}_{4i_1+4,4i_1,4i_1+4}$ | $\tilde{W}^{(3)}_{4i_1,4i_1+4,4i_1+4}$ | $\tilde{W}^{(3)}_{4i_1+4,4i_1,4i_1}$ |

| $i_1$ | | | $i_2$ | |
|---|---|---|---|---|
| | 4 | 5 | 6 | 7 |
| 0, 2, 4, 6 | $W^{(3)}_{4i_1+1,4i_1+1,4i_1+5}$ | $W^{(3)}_{4i_1+5,4i_1+1,4i_1+5}$ | $\tilde{W}^{(3)}_{4i_1+1,4i_1+5,4i_1+5}$ | $\tilde{W}^{(3)}_{4i_1+5,4i_1+1,4i_1+1}$ |

| $i_1$ | | | $i_2$ | |
|---|---|---|---|---|
| | 8 | 9 | 10 | 11 |
| 0, 2, 4, 6 | $W^{(3)}_{4i_1+2,4i_1+2,4i_1+6}$ | $W^{(3)}_{4i_1+6,4i_1+2,4i_1+6}$ | $\tilde{W}^{(3)}_{4i_1+2,4i_1+6,4i_1+6}$ | $\tilde{W}^{(3)}_{4i_1+6,4i_1+2,4i_1+2}$ |

| $i_1$ | | | $i_2$ | |
|---|---|---|---|---|
| | 12 | 13 | 14 | 15 |
| 0, 2, 4, 6 | $W^{(3)}_{4i_1+3,4i_1+3,4i_1+7}$ | $W^{(3)}_{4i_1+7,4i_1+3,4i_1+7}$ | $\tilde{W}^{(3)}_{4i_1+3,4i_1+7,4i_1+7}$ | $\tilde{W}^{(3)}_{4i_1+7,4i_1+3,4i_1+3}$ | where $W^{(3)}_{m,m',m''} = \frac{1}{\sqrt{24}}\begin{bmatrix} v_m & v_{m'} & v_{m''} \\ v_m & -v_{m'} & -v_{m''} \end{bmatrix}$, $\tilde{W}^{(3)}_{m,m',m''} = \frac{1}{\sqrt{24}}\begin{bmatrix} v_m & v_{m'} & v_{m''} \\ v_m & v_{m'} & -v_{m''} \end{bmatrix}$ That is, the code words corresponding to $i_1=0, 2, 4, 6, 8 \ldots 14$ and $i_2=0\sim15$.

Or, $$W^{(3)}_{0,0,8} = \frac{1}{\sqrt{8}}\begin{bmatrix} v_0 & v_0 & v_8 \\ v_0 & -v_0 & -v_8 \end{bmatrix}$$

$$\tilde{W}^{(1)}_{10,2,2} = \frac{1}{\sqrt{8}}\begin{bmatrix} v_{10} & v_2 & v_2 \\ v_{10} & v_2 & -v_2 \end{bmatrix}$$

$$W^{(3)}_{4,4,12} = \frac{1}{\sqrt{8}}\begin{bmatrix} v_4 & v_4 & v_{12} \\ v_4 & -v_4 & -v_{12} \end{bmatrix}$$

$$\tilde{W}^{(3)}_{14,6,6} = \frac{1}{\sqrt{8}}\begin{bmatrix} v_{14} & v_6 & v_6 \\ v_{14} & v_6 & -v_6 \end{bmatrix}$$

$$W_{8,8,0}^{(3)} = \frac{1}{\sqrt{8}}\begin{bmatrix} v_8 & v_8 & v_0 \\ v_8 & -v_8 & -v_0 \end{bmatrix}$$

$$\tilde{W}_{2,10,10}^{(3)} = \frac{1}{\sqrt{8}}\begin{bmatrix} v_2 & v_{10} & v_{10} \\ v_2 & v_{10} & -v_{10} \end{bmatrix}$$

$$W_{12,12,4}^{(3)} = \frac{1}{\sqrt{8}}\begin{bmatrix} v_{12} & v_{12} & v_4 \\ -v_{12} & v_{12} & -v_4 \end{bmatrix}$$

$$\tilde{W}_{6,14,14}^{(3)} = \frac{1}{\sqrt{8}}\begin{bmatrix} v_6 & v_{14} & v_{14} \\ v_6 & v_{14} & -v_{14} \end{bmatrix}$$

$$W_{16,16,24}^{(3)} = \frac{1}{\sqrt{8}}\begin{bmatrix} v_{16} & v_{16} & v_{24} \\ v_{16} & -v_{16} & -v_{24} \end{bmatrix}$$

$$\tilde{W}_{18,26,26}^{(3)} = \frac{1}{\sqrt{8}}\begin{bmatrix} v_{26} & v_{18} & v_{18} \\ v_{26} & v_{18} & -v_{18} \end{bmatrix}$$

$$W_{20,20,28}^{(3)} = \frac{1}{\sqrt{8}}\begin{bmatrix} v_{20} & v_{20} & v_{28} \\ v_{20} & -v_{20} & -v_{28} \end{bmatrix}$$

$$\tilde{W}_{30,22,22}^{(3)} = \frac{1}{\sqrt{8}}\begin{bmatrix} v_{30} & v_{22} & v_{22} \\ v_{30} & v_{22} & -v_{22} \end{bmatrix}$$

$$W_{24,24,16}^{(3)} = \frac{1}{\sqrt{8}}\begin{bmatrix} v_{24} & v_{24} & v_{16} \\ v_{24} & -v_{24} & -v_{16} \end{bmatrix}$$

$$\tilde{W}_{18,26,26}^{(3)} = \frac{1}{\sqrt{8}}\begin{bmatrix} v_{18} & v_{26} & v_{26} \\ v_{18} & v_{26} & -v_{26} \end{bmatrix}$$

$$W_{28,28,20}^{(3)} = \frac{1}{\sqrt{8}}\begin{bmatrix} v_{28} & v_{28} & v_{20} \\ -v_{28} & v_{28} & -v_{20} \end{bmatrix}$$

$$\tilde{W}_{22,30,30}^{(3)} = \frac{1}{\sqrt{8}}\begin{bmatrix} v_{22} & v_{30} & v_{30} \\ v_{22} & -v_{30} & -v_{30} \end{bmatrix}$$

Or, $$W_{0,0,8}^{(3)} = \frac{1}{\sqrt{8}}\begin{bmatrix} v_0 & v_0 & v_8 \\ v_0 & -v_0 & -v_8 \end{bmatrix}$$

$$\tilde{W}_{10,2,2}^{(1)} = \frac{1}{\sqrt{8}}\begin{bmatrix} v_{10} & v_2 & v_2 \\ v_{10} & v_2 & -v_2 \end{bmatrix}$$

$$W_{4,4,12}^{(3)} = \frac{1}{\sqrt{8}}\begin{bmatrix} v_4 & v_4 & v_{12} \\ v_4 & -v_4 & -v_{12} \end{bmatrix}$$

$$\tilde{W}_{14,6,6}^{(3)} = \frac{1}{\sqrt{8}}\begin{bmatrix} v_{14} & v_6 & v_6 \\ v_{14} & v_6 & -v_6 \end{bmatrix}$$

$$W_{8,8,16}^{(3)} = \frac{1}{\sqrt{8}}\begin{bmatrix} v_8 & v_8 & v_{16} \\ v_8 & -v_8 & -v_{16} \end{bmatrix}$$

$$\tilde{W}_{2,10,10}^{(3)} = \frac{1}{\sqrt{8}}\begin{bmatrix} v_{18} & v_{10} & v_{10} \\ v_{18} & v_{10} & -v_{10} \end{bmatrix}$$

$$W_{12,12,20}^{(3)} = \frac{1}{\sqrt{8}}\begin{bmatrix} v_{12} & v_{12} & v_{20} \\ -v_{12} & v_{12} & -v_{20} \end{bmatrix}$$

$$\tilde{W}_{22,14,14}^{(3)} = \frac{1}{\sqrt{8}}\begin{bmatrix} v_{22} & v_{14} & v_{14} \\ v_{22} & v_{14} & -v_{14} \end{bmatrix}$$

$$W_{16,16,24}^{(3)} = \frac{1}{\sqrt{8}}\begin{bmatrix} v_{16} & v_{16} & v_{24} \\ v_{16} & -v_{16} & -v_{24} \end{bmatrix}$$

$$\tilde{W}_{18,26,26}^{(1)} = \frac{1}{\sqrt{8}}\begin{bmatrix} v_{26} & v_{18} & v_{18} \\ v_{26} & v_{18} & -v_{18} \end{bmatrix}$$

$$W_{20,20,28}^{(3)} = \frac{1}{\sqrt{8}}\begin{bmatrix} v_{20} & v_{20} & v_{28} \\ v_{20} & -v_{20} & -v_{28} \end{bmatrix}$$

$$\tilde{W}_{30,22,22}^{(3)} = \frac{1}{\sqrt{8}}\begin{bmatrix} v_{30} & v_{22} & v_{22} \\ v_{30} & v_{22} & -v_{22} \end{bmatrix}$$

$$W_{24,24,0}^{(3)} = \frac{1}{\sqrt{8}}\begin{bmatrix} v_{24} & v_{24} & v_0 \\ v_{24} & -v_{24} & -v_0 \end{bmatrix}$$

$$\tilde{W}_{2,26,26}^{(3)} = \frac{1}{\sqrt{8}}\begin{bmatrix} v_2 & v_{26} & v_{26} \\ v_2 & v_{26} & -v_{26} \end{bmatrix}$$

$$W_{28,28,4}^{(3)} = \frac{1}{\sqrt{8}}\begin{bmatrix} v_{28} & v_{28} & v_4 \\ -v_{28} & v_{28} & -v_4 \end{bmatrix}$$

$$\tilde{W}_{6,30,30}^{(3)} = \frac{1}{\sqrt{8}}\begin{bmatrix} v_6 & v_{30} & v_{30} \\ v_6 & -v_{30} & -v_{30} \end{bmatrix}$$

If the code words in the $C_{PUSCH}$ meet the model in each above-mentioned method after finishing the equivalence transformation (exchanging the columns, multiplying by constant coefficient or exchanging the rows of all code words together), the $C_{PUCCH}$ can be formed according to the similar methods provided in method 2 to method 5. The code words in the $C_{PUCCH}$ also have the corresponding equivalence transformation format.

Embodiment 12

The Rank4 codebook in embodiment 7 can be represented by the following single codebook equivalent to the dual codebooks:

| | $i_2$ | | | | | | | |
|---|---|---|---|---|---|---|---|---|
| $i_1$ | 0 | 1 | 2 | 3 | 4 | 5 | 6 | 7 |
| 0-7 | $W_{4i_1,4i_1+4,0}^{(4)}$ | $W_{4i_1,4i_1+4,1}^{(4)}$ | $W_{4i_1+1,4i_1+5,0}^{(4)}$ | $W_{4i_1+1,4i_1+5,1}^{(4)}$ | $W_{4i_1+2,4i_1+6,0}^{(4)}$ | $W_{4i_1+2,4i_1+6,1}^{(4)}$ | $W_{4i_1+3,4i_1+7,0}^{(4)}$ | $W_{4i_1+3,4i_1+7,1}^{(4)}$ | where $W_{m,m',n}^{(4)} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$ wherein,
$\phi_n = e^{j\pi n/2}$
$v_m = [1 \quad e^{j2\pi m/32} \quad e^{j4\pi m/32} \quad e^{j6\pi m/32}]^T$ $W_{m,m',n}^{(4)}$ is one matrix which needs to be determined by the values of m, m', n, and these parameters are related to the first index $i_1$ and second index $i_2$ needing to be fed back. This is equivalent to the Rank4 codebook in the embodiment 7, and the difference lies in that the $C_{PUSCH}$ Rank4 codebook in the embodiment 7 defines 2 codebooks and a function relation. And what the present embodiment defines is a single codebook format equivalent to the dual codebooks. But no matter which kind of format it is, these two modes are equivalent, and the codebook can be defined in any mode, and there are 2 fed back indexes in either mode. $i_1$ can be regarded as the fed back index corresponding to the codebook C1 in embodiment 7, and $i_2$ can be regarded as the fed back index corresponding to the codebook C2 in embodiment 7.

Since the $C_{PUSCH}$ in embodiment 7 is equivalent to the codebook in the present embodiment, and the difference only lies in that it is implemented by using the dual codebooks in the embodiment 7, while in the present embodiment, it is the feedback mode of the single codebook equivalent to the dual codebooks, but the ideas of extracting the codebook to form the $C_{PUCCH}$ are totally the same. So the methods described by the above embodiments are all applied to the $C_{PUSCH}$ in the present embodiment.

Since there are many contents about embodiment 7, they will not be described in detail again, and it is only illustrated by taking part of the extracting methods therein as an example.

All or part of the following code words can be selected to form the $C_{PUCCH}$:

$$W_{14,22,1}^{(4)} = \frac{1}{\sqrt{32}}\begin{bmatrix} v_{14} & v_{22} & v_{14} & v_{22} \\ jv_{14} & jv_{22} & -jv_{14} & -jv_{22} \end{bmatrix}$$

$$W_{20,28,1}^{(4)} = \frac{1}{\sqrt{32}}\begin{bmatrix} v_{20} & v_{28} & v_{20} & v_{28} \\ jv_{20} & jv_{28} & -jv_{20} & -jv_{28} \end{bmatrix}$$

$$W_{22,30,1}^{(4)} = \frac{1}{\sqrt{32}}\begin{bmatrix} v_{22} & v_{30} & v_{22} & v_{30} \\ jv_{22} & jv_{30} & -jv_{22} & -jv_{30} \end{bmatrix}$$

$$W_{26,2,1}^{(4)} = \frac{1}{\sqrt{32}}\begin{bmatrix} v_{26} & v_2 & v_{26} & v_2 \\ jv_{26} & jv_2 & -jv_{26} & -jv_2 \end{bmatrix}$$

$$W_{30,6,1}^{(4)} = \frac{1}{\sqrt{32}}\begin{bmatrix} v_{30} & v_6 & v_{30} & v_6 \\ jv_{30} & jv_6 & -jv_{30} & -jv_6 \end{bmatrix}$$

or, $$W_{2,10,1}^{(4)} = \frac{1}{\sqrt{32}}\begin{bmatrix} v_2 & v_{10} & v_2 & v_{10} \\ v_2 & v_{10} & -v_2 & -v_{10} \end{bmatrix}$$

$$W_{6,14,1}^{(4)} = \frac{1}{\sqrt{32}}\begin{bmatrix} v_6 & v_{14} & v_6 & v_{14} \\ v_6 & v_{14} & -v_6 & -v_{14} \end{bmatrix}$$

| $i_1$ | | | | $i_2$ | | | | |
|---|---|---|---|---|---|---|---|---|
| | 0 | 1 | 2 | 3 | 4 | 5 | 6 | 7 |
| 0, 2, 4, 6 | $W_{4i_1,4i_1+4,0}^{(4)}$ | $W_{4i_1,4i_1+4,1}^{(4)}$ | $W_{4i_1+1,4i_1+5,0}^{(4)}$ | $W_{4i_1+1,4i_1+5,1}^{(4)}$ | $W_{4i_1+2,4i_1+6,0}^{(4)}$ | $W_{4i_1+2,4i_1+6,1}^{(4)}$ | $W_{4i_1+3,4i_1+7,0}^{(4)}$ | $W_{4i_1+3,4i_1+7,1}^{(4)}$ | where $W_{m,m',n}^{(4)} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$ Or, $$W_{0,8,0}^{(4)} = \frac{1}{\sqrt{32}}\begin{bmatrix} v_0 & v_8 & v_0 & v_8 \\ v_0 & v_8 & -v_0 & -v_8 \end{bmatrix}$$

$$W_{4,12,0}^{(4)} = \frac{1}{\sqrt{32}}\begin{bmatrix} v_4 & v_{12} & v_4 & v_{12} \\ v_4 & v_{12} & -v_4 & -v_{12} \end{bmatrix}$$

$$W_{8,16,0}^{(4)} = \frac{1}{\sqrt{32}}\begin{bmatrix} v_8 & v_{16} & v_8 & v_{16} \\ v_8 & v_{16} & -v_8 & -v_{16} \end{bmatrix}$$

$$W_{12,20,0}^{(4)} = \frac{1}{\sqrt{32}}\begin{bmatrix} v_{12} & v_{20} & v_{12} & v_{20} \\ v_{12} & v_{20} & -v_{12} & -v_{20} \end{bmatrix}$$

$$W_{16,24,0}^{(4)} = \frac{1}{\sqrt{32}}\begin{bmatrix} v_{16} & v_{24} & v_{16} & v_{24} \\ v_{16} & v_{24} & -v_{16} & -v_{24} \end{bmatrix}$$

$$W_{20,28,0}^{(4)} = \frac{1}{\sqrt{32}}\begin{bmatrix} v_{20} & v_{28} & v_{20} & v_{28} \\ v_{20} & v_{28} & -v_{20} & -v_{28} \end{bmatrix}$$

$$W_{24,0,0}^{(4)} = \frac{1}{\sqrt{32}}\begin{bmatrix} v_{24} & v_0 & v_{24} & v_0 \\ v_{24} & v_0 & -v_{24} & -v_0 \end{bmatrix}$$

$$W_{28,4,0}^{(4)} = \frac{1}{\sqrt{32}}\begin{bmatrix} v_{28} & v_4 & v_{28} & v_4 \\ v_{28} & v_4 & -v_{28} & -v_4 \end{bmatrix}$$

$$W_{2,10,1}^{(4)} = \frac{1}{\sqrt{32}}\begin{bmatrix} v_2 & v_{10} & v_2 & v_{10} \\ jv_2 & jv_{10} & -jv_2 & -jv_{10} \end{bmatrix}$$

$$W_{6,14,1}^{(4)} = \frac{1}{\sqrt{32}}\begin{bmatrix} v_6 & v_{14} & v_6 & v_{14} \\ jv_6 & jv_{14} & -jv_6 & -jv_{14} \end{bmatrix}$$

$$W_{10,18,1}^{(4)} = \frac{1}{\sqrt{32}}\begin{bmatrix} v_{10} & v_{18} & v_{10} & v_{18} \\ jv_{10} & jv_{18} & -jv_{10} & -jv_{18} \end{bmatrix}$$

-continued $$W_{10,18,1}^{(4)} = \frac{1}{\sqrt{32}}\begin{bmatrix} v_{10} & v_{18} & v_{10} & v_{18} \\ v_{10} & v_{18} & -v_{10} & -v_{18} \end{bmatrix}$$

$$W_{14,22,1}^{(4)} = \frac{1}{\sqrt{32}}\begin{bmatrix} v_{14} & v_{22} & v_{14} & v_{22} \\ v_{14} & v_{22} & -v_{14} & -v_{22} \end{bmatrix}$$

$$W_{20,28,1}^{(4)} = \frac{1}{\sqrt{32}}\begin{bmatrix} v_{20} & v_{28} & v_{20} & v_{28} \\ v_{20} & v_{28} & -v_{20} & -v_{28} \end{bmatrix}$$

$$W_{22,30,1}^{(4)} = \frac{1}{\sqrt{32}}\begin{bmatrix} v_{22} & v_{30} & v_{22} & v_{30} \\ v_{22} & v_{30} & -v_{22} & -v_{30} \end{bmatrix}$$

$$W_{26,2,1}^{(4)} = \frac{1}{\sqrt{32}}\begin{bmatrix} v_{26} & v_2 & v_{26} & v_2 \\ v_{26} & v_2 & -v_{26} & -v_2 \end{bmatrix}$$

$$W_{30,6,1}^{(4)} = \frac{1}{\sqrt{32}}\begin{bmatrix} v_{30} & v_6 & v_{30} & v_6 \\ v_{30} & v_6 & -v_{30} & -v_6 \end{bmatrix}$$

In each above-mentioned embodiment, the transformed codebook obtained after exchanging the columns or multiplying by constant coefficient or exchanging the rows of all code words together for the $C_{PUSCH}^1$ and/or the $C_{PUSCH}^2$ also can use the extracting method described in the present embodiment; or, the transformed codebook obtained after exchanging the columns or multiplying by constant coefficient or exchanging the rows of all code words together for the $C_{PUSCH}$ also can use the extracting method described in the present embodiment. The codebook extracting method described in the present invention is applied to the codebook obtained after the code words of each codebook in the embodiments described of the present invention finish the equivalence transformation (exchanging the columns, multiplying by constant coefficient or exchanging the rows of all code words together). The code words in the $C_{PUCCH}$, $C_{PUCCH}^1$ and $C_{PUCCH}^2$ also have the corresponding equivalent transformation representing format.

The present invention also provides a terminal for feeding back channel status information based on the channel status information feedback method provided by the present invention, its application principle is the same with that in the above-mentioned method, and here will not go into details again.

Obviously, the present invention can have a variety of other embodiments. Those skilled in the art can make the corresponding modifications and variations according to technical scheme and the conception of the present invention without departing from the spirit and essence of the present invention. And all of these modifications or the variations should be embodied in the scope of the appending claims of the present invention.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present invention is not limit to any specific faint of the combination of the hardware and software.

INDUSTRIAL APPLICABILITY

With the above-mentioned method, the precision of the PMI feedback under the limited overhead can be ensured, thus the CSI feedback on the PUCCH can more effectively support the pre-coding technology and have good compatibility with the feedback on the PUSCH.

What we claim is:

1. A method for feeding back channel status information by a terminal in long term evolution-advanced (LTE-A), the method comprising:
    quantizing the channel status information by using a codebook, and
    feeding back the channel status information through a physical uplink control channel; wherein,
    when the channel status information is fed back on the physical uplink control channel, code words contained in the used codebook $C_{PUCCH}(r)$ are a subset of code words contained in the codebook $C_{PUSCH}(r)$ in an overall codebook defined in the LTE-A, wherein the used codebook $C_{PUCCH}(r)$ represents codebook $C_{PUCCH}(r)$ with a layer number or rank being r, and the codebook $C_{PUSCH}(r)$ represents codebook $C_{PUSCH}(r)$ with a layer number or rank being r;
    wherein, the $C_{PUCCH}(r)$ is a single codebook or a single codebook equivalent to dual codebooks; and the $C_{PUSCH}(r)$ is a single codebook or a single codebook equivalent to dual codebooks; and
    the single codebook equivalent to the dual codebooks refers to an actually defined single codebook, in which 2 pre-coding matrix identifiers are required to determine a codebook of the code words therein for an established r;
    wherein r is a positive integer.

2. The method according to claim 1, wherein, when r=1 or 2, the $C_{PUSCH}(r)$ has repetitive code words, and the $C_{PUCCH}(r)$ does not have repetitive code words.

3. The method according to claim 1, wherein,
    when r=1, all code words of the $C_{PUSCH}(r)$ meet the model $$\begin{bmatrix} u_i \\ \alpha_k u_i \end{bmatrix},$$

the $u_i$ is one 4-dimension column vector, i=1, 2, 3 ... m, m is a positive integer, and k=1, 2, 3, 4, and $\alpha_k = e^{j\pi(k-1)/2}$; for every $u_i$, the $C_{PUSCH}(r)$ contains 4 code words $$\begin{bmatrix} u_i \\ u_i \end{bmatrix} \begin{bmatrix} u_i \\ ju_i \end{bmatrix} \begin{bmatrix} u_i \\ -u_i \end{bmatrix} \begin{bmatrix} u_i \\ -ju_i \end{bmatrix}$$

corresponding to the $\alpha_k = e^{j\pi(k-1)/2}$ in which k=1, 2, 3, 4, then:
    the code words that form the $C_{PUCCH}(r)$ are all or part of code words which are extracted from the $C_{PUSCH}(r)$ and meet the model $$\begin{bmatrix} u_i \\ \alpha_k u_i \end{bmatrix},$$

with the corresponding $\alpha_k$ being {1,−1};
    or, the code words that form the $C_{PUCCH}(r)$ are all or part of code words which are extracted from the $C_{PUSCH}(r)$ and meet model $$\begin{bmatrix} u_i \\ \alpha_k u_i \end{bmatrix},$$

with the corresponding $\alpha_k$ being {j,−j};
    or, half of the code words that form the $C_{PUCCH}(r)$ are part of code words which are extracted from the $C_{PUSCH}(r)$ and meet the model $$\begin{bmatrix} u_i \\ \alpha_k u_i \end{bmatrix},$$

with the corresponding $\alpha_k$ being {1,−1}, and another half of the code words are part of code words which are extracted from the $C_{PUSCH}(r)$ and meet the model $$\begin{bmatrix} u_i \\ \alpha_k u_i \end{bmatrix},$$

with the corresponding $\alpha_k$ being {j,−j};
    or, ¼ of the code words that form the $C_{PUCCH}(r)$ are part of code words which are extracted from the $C_{PUSCH}(r)$ and meet the model $$\begin{bmatrix} u_i \\ \alpha_k u_i \end{bmatrix},$$

with the corresponding $\alpha_k$ being 1, ¼ of the code words are part of code words which are extracted from the $C_{PUSCH}(r)$ and meet the model $$\begin{bmatrix} u_i \\ \alpha_k u_i \end{bmatrix},$$

with the corresponding $\alpha_k$ being $-1$, ¼ of the code words are part of code words which are extracted from the $C_{PUSCH}(r)$ and meet the model $$\begin{bmatrix} u_i \\ \alpha_k u_i \end{bmatrix},$$

with the corresponding $\alpha_k$ being j, and ¼ of the code words are part of code words which are extracted from the $C_{PUSCH}(r)$ and meet the model $$\begin{bmatrix} u_i \\ \alpha_k u_i \end{bmatrix},$$

with the corresponding $\alpha_k$ being $-j$.

4. The method according to claim 3, wherein, there are only 2 code words meeting the model $$\begin{bmatrix} u_i \\ \alpha_k u_i \end{bmatrix}$$

correspondingly at most in the $C_{PUCCH}(r)$ when values of the $u_i$ are same.

5. The method according to claim 1, wherein,
when r=1, all code words of the $C_{PUSCH}(r)$ meet the model $$\begin{bmatrix} u_i \\ \alpha_k u_i \end{bmatrix},$$

the $u_i$ is one 4-dimension column vector, i=1, 2, 3 ... m, m is a positive integer and is a multiple of 4; for every $u_i$, the $C_{PUSCH}(r)$ contains 4 code words $$\begin{bmatrix} u_i \\ u_i \end{bmatrix}\begin{bmatrix} u_i \\ ju_i \end{bmatrix}\begin{bmatrix} u_i \\ -u_i \end{bmatrix}\begin{bmatrix} u_i \\ -ju_i \end{bmatrix}$$

corresponding to the $\alpha_k = e^{j\pi(k-1)/2}$ in which k=1, 2, 3, 4; there are 4n different code words in the $C_{PUSCH}(r)$ noted as $$\bigcup_{i=1}^{n} \bigcup_{k=1}^{4} \left\{ \begin{bmatrix} v_i \\ \alpha_k v_i \end{bmatrix} \right\},$$

wherein,
$v_i = [1\ e^{j2\pi(i-1)/N}\ e^{j4\pi(i-1)/N}\ e^{j6\pi(i-1)/N}]^T$, and i=1, 2, 3 ... n, and N=16 or 32;
the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{2i-1} \\ \alpha_k v_{2i-1} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{2i} \\ \alpha_k v_{2i} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i-1} \\ \alpha_k v_{4i-1} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i-2} \\ \alpha_k v_{4i-2} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i-3} \\ \alpha_k v_{4i-3} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i} \\ \alpha_k v_{4i} \end{bmatrix} \right\}.$$

6. The method according to claim 5, wherein,
there are only 1 or 2 code words meeting the model $$\begin{bmatrix} v_i \\ \alpha_k v_i \end{bmatrix}$$

correspondingly in the $C_{PUCCH}(r)$ when values of the $v_i$ are same in the codebook.

7. The method according to claim 1, wherein,
when r=2, the code words of the $C_{PUSCH}(r)$ meet the model $$\begin{bmatrix} u_i & u_{ii} \\ \alpha_k u_i & -\alpha_k u_{ii} \end{bmatrix},$$

the $u_i$ and $u_{ii}$ are same or different 4-dimension vectors, the $C_{PUSCH}(r)$ has A cases that $u_i=u_{ii}$ and B cases that $u_i \neq u_{ii}$, A is a positive integer, B is a nonnegative integer, and $\alpha_k$ has 2 values of $\{1, j\}$ for each combination case of $(u_i, u_{ii})$, then:
  the code words that form the $C_{PUCCH}(r)$ are all or part of the code words selected from the code words in the A cases that $u_i=u_{ii}$ in the $C_{PUSCH}(r)$;
  or, the code words that form the $C_{PUCCH}(r)$ are part of code words which are extracted from the $C_{PUSCH}(r)$ and meet model $$\begin{bmatrix} u_i & u_{ii} \\ \alpha_k u_i & -\alpha_k u_{ii} \end{bmatrix},$$

with a corresponding $\alpha_k=1$;
  or, the code words that form the $C_{PUCCH}(r)$ are part of code words which are extracted from the $C_{PUSCH}(r)$ and meet model $$\begin{bmatrix} u_i & u_{ii} \\ \alpha_k u_i & -\alpha_k u_{ii} \end{bmatrix},$$

with $u_i=u_{ii}$ and $\alpha_k=1$;
  or, half of the code words that form the $C_{PUCCH}(r)$ are code words which are extracted from the $C_{PUSCH}(r)$ and meet the model $$\begin{bmatrix} u_i & u_{ii} \\ \alpha_k u_i & -\alpha_k u_{ii} \end{bmatrix}$$

with the corresponding $\alpha_k=1$; and half of the code words are code words which are extracted from the $C_{PUSCH}(r)$ and meet the model $$\begin{bmatrix} u_i & u_{ii} \\ \alpha_k u_i & -\alpha_k u_{ii} \end{bmatrix}$$

with the corresponding $\alpha_k=j$;
  or, half of the code words that form the $C_{PUCCH}(r)$ are part of code words selected from the code words in the A cases that $u_i=u_{ii}$ in the $C_{PUSCH}(r)$; another half of the code words are part of the code words selected from the $C_{PUCCH}(r)$.

8. The method according to claim 1, wherein,
when r=3, all or part of the code words of the $C_{PUSCH}(r)$ meet the model $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, for each $u_i$ and $u_{ii}$ combination $(u_i, u_{ii})$, $\alpha_k$ corresponds to 2 values of $\{1,-1\}$ respectively, then:
  the code words that form the $C_{PUSCH}(r)$ are all or part of code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being 1;
  or, the code words that form the $C_{PUCCH}(r)$ are all or part of code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being −1.

9. The method according to claim 1, wherein,
when r=3, the $C_{PUSCH}(r)$ comprises even number of code words, and half of said even number of code words meet the model $$\begin{bmatrix} u_i & u_i & u_{ii} \\ \alpha_k u_i & -\alpha_k u_i & \alpha_k u_{ii} \end{bmatrix},$$

and another half meet $$\begin{bmatrix} u_{ii} & u_{ii} & u_i \\ \alpha_k u_{ii} & -\alpha_k u_{ii} & \alpha_k u_i \end{bmatrix}$$

correspondingly, wherein, the $u_i$ and $u_{ii}$ are different 4-dimension vectors, and $\alpha_k$ corresponds to $\{1,-1, j,-j\}$ or a subset of $\{1,-1, j,-j\}$ then:
  the code words that form the $C_{PUCCH}(r)$ are all or part of code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix};$$

or, the code words that form the $C_{PUCCH}(r)$ are all or part of code words which are selected from the $C_{PUSCH}(r)$ and meet the model $$\begin{bmatrix} u_{ii} & u_{ii} & u_i \\ \alpha_k u_{ii} & -\alpha_k u_{ii} & \alpha_k u_i \end{bmatrix};$$

or, half of the code words that form the $C_{PUCCH}(r)$ are part of code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix},$$

and another half of the code words are code words meeting the $$\begin{bmatrix} u_{ii} & u_{ii} & u_i \\ \alpha_k u_{ii} & -\alpha_k u_{ii} & \alpha_k u_i \end{bmatrix}$$

correspondingly;

a codebook formed after a conversion of exchanging columns of code words arbitrarily, multiplying by a constant coefficient or exchanging rows of all code words together has been performed for the $C_{PUCCH}(r)$ and the $C_{PUSCH}(r)$ is equivalent to the codebook before the conversion.

10. The method according to claim 1, wherein, when r=4, all or part of the code words of the $C_{PUSCH}(r)$ meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

wherein, the $u_i$ and $u_{ii}$ are different 4-dimension vectors, and for each $u_i$ and $u_{ii}$ combination $(u_i, u_{ii})$, i=a and ii=b is equivalent to i=b and ii=a; for each combination $(u_i, u_{ii})$, $\alpha_k$ corresponds to 2 values of $\{1,-1\}$ respectively, then:

the code words that form the $C_{PUCCH}(r)$ are all or part of code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

with the corresponding $\alpha_k$ being 1;

or, the code words that form the $C_{PUCCH}(r)$ are all or part of code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

with the corresponding $\alpha_k$ being j;

or, half of the code words that form the $C_{PUCCH}(r)$ are part of code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

with the corresponding $\alpha_k$ being 1; another half of the code words that form the $C_{PUCCH}(r)$ are part of code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

with the corresponding $\alpha_k$ being j.

11. The method according to claim 1, wherein, the codebook formed after a conversion of exchanging the columns of the code words arbitrarily, multiplying by a constant coefficient or exchanging the rows of all code words together has been performed for the $C_{PUCCH}(r)$ and the $C_{PUSCH}(r)$ is equivalent to the codebook before the conversion.

12. A terminal, comprising:

a quantization unit, configured to quantize channel status information by using a codebook in long term evolution-advanced (LTE-A); and a feedback unit, configured to feed back the channel status information through a physical uplink control channel;

wherein, the quantization unit is configured as that:

code words contained in the used codebook $C_{PUCCH}(r)$ are a subset of code words contained in the codebook $C_{PUSCH}(r)$ in an overall codebook defined in the LTE-A, wherein the used codebook $C_{PUCCH}(r)$ represents the codebook $C_{PUCCH}(r)$ with a layer number or rank being r, and the codebook $C_{PUSCH}(r)$ represents the codebook $C_{PUSCH}(r)$ with a layer number or rank being r;

the $C_{PUCCH}(r)$ is a single codebook or a single codebook equivalent to dual codebooks; and the $C_{PUSCH}(r)$ is a single codebook or a single codebook equivalent to dual codebooks; and the single codebook equivalent to the dual codebooks refers to an actually defined single codebook, in which 2 pre-coding matrix identifiers are required to determine a codebook of the code words therein for an established r;

wherein r is a positive integer.

13. The terminal according to claim 12, wherein, when r=1 or 2, the $C_{PUSCH}(r)$ has repetitive code words, and the $C_{PUCCH}(r)$ does not have repetitive code words.

14. The terminal according to claim 12, wherein, when r=1, all code words of the $C_{PUSCH}(r)$ meet the model $$\begin{bmatrix} u_i \\ \alpha_k u_i \end{bmatrix},$$

the $u_i$ is one 4-dimension column vector, i=1, 2, 3 ... m, m is a positive integer, and k=1, 2, 3, 4, and $\alpha_k=e^{j\pi(k-1)/2}$; for every $u_i$, the $C_{PUSCH}(r)$ contains 4 code words $$\begin{bmatrix} u_i \\ u_i \end{bmatrix} \begin{bmatrix} u_i \\ ju_i \end{bmatrix} \begin{bmatrix} u_i \\ -u_i \end{bmatrix} \begin{bmatrix} u_i \\ -ju_i \end{bmatrix}$$

corresponding to the $\alpha_k=e^{j\pi(k-1)/2}$ in which k=1, 2, 3, 4, then:

the code words that form the $C_{PUCCH}(r)$ are all or part of code words which are extracted from the $C_{PUSCH}(r)$ and meet the model $$\begin{bmatrix} u_i \\ \alpha_k u_i \end{bmatrix},$$

with the corresponding $\alpha_k$ being $\{1,-1\}$;

or, the code words that form the $C_{PUCCH}(r)$ are all or part of code words which are extracted from the $C_{PUSCH}(r)$ and meet model $$\begin{bmatrix} u_i \\ \alpha_k u_i \end{bmatrix},$$

with the corresponding $\alpha_k$ being $\{j,-j\}$;

or, half of the code words that form the $C_{PUCCH}(r)$ are part of code words which are extracted from the $C_{PUSCH}(r)$ and meet the model $$\begin{bmatrix} u_i \\ \alpha_k u_i \end{bmatrix},$$

with the corresponding $\alpha_k$ being $\{1,-1\}$, and another half of the code words are part of code words which are extracted from the $C_{PUSCH}(r)$ and meet the model $$\begin{bmatrix} u_i \\ \alpha_k u_i \end{bmatrix},$$

with the corresponding $\alpha_k$ being $\{j,-j\}$;

or, ¼ of the code words that form the $C_{PUCCH}(r)$ are part of code words which are extracted from the $C_{PUSCH}(r)$ and meet the model $$\begin{bmatrix} u_i \\ \alpha_k u_i \end{bmatrix},$$

with the corresponding $\alpha_k$ being 1, ¼ of the code words are part of code words which are extracted from the $C_{PUSCH}(r)$ and meet the model $$\begin{bmatrix} u_i \\ \alpha_k u_i \end{bmatrix},$$

with the corresponding $\alpha_k$ being -1, ¼ of the code words are part of code words which are extracted from the $C_{PUSCH}(r)$ and meet the model $$\begin{bmatrix} u_i \\ \alpha_k u_i \end{bmatrix},$$

with the corresponding $\alpha_k$ being j, and ¼ of the code words are part of code words which are extracted from the $C_{PUSCH}(r)$ and meet the model $$\begin{bmatrix} u_i \\ \alpha_k u_i \end{bmatrix},$$

with the corresponding $\alpha_k$ being -j.

15. The terminal according to claim 14, wherein, there are only 2 code words meeting the model $$\begin{bmatrix} u_i \\ \alpha_k u_i \end{bmatrix}$$

correspondingly at most in the $C_{PUCCH}(r)$ when values of the $u_i$ are same.

16. The terminal according to claim 12, wherein, when r=1, all code words of the $C_{PUSCH}(r)$ meet the model $$\begin{bmatrix} u_i \\ \alpha_k u_i \end{bmatrix},$$

the $u_i$ is one 4-dimension column vector, i=1, 2, 3 ... m, m is a positive integer and is a multiple of 4; for every $u_i$, the $C_{PUSCH}(r)$ contains 4 code words $$\begin{bmatrix} u_i \\ u_i \end{bmatrix} \begin{bmatrix} u_i \\ ju_i \end{bmatrix} \begin{bmatrix} u_i \\ -u_i \end{bmatrix} \begin{bmatrix} u_i \\ -ju_i \end{bmatrix}$$

corresponding to the $\alpha_k = e^{j\pi(k-1)/2}$ in which k=1, 2, 3, 4; there are 4n different code words in the $C_{PUSCH}(r)$ noted as $$\bigcup_{i=1}^{n} \bigcup_{k=1}^{4} \left\{ \begin{bmatrix} v_i \\ \alpha_k v_i \end{bmatrix} \right\},$$

wherein,
$v_i = [1\ e^{j2\pi(i-1)/N}\ e^{j4\pi(i-1)/N}\ e^{j6\pi(i-1)/N}]^T$, and i=1, 2, 3 ... n, and N=16 or 32;

the code words that form the $C_{PUCCH}(r)$ are all or part of the code words selected from $$\bigcup_{i=1}^{\frac{n}{2}} \bigcup_{k=1}^{4} \left\{ \begin{bmatrix} v_{2i-1} \\ \alpha_k v_{2i-1} \end{bmatrix} \right\};$$

or, the code words that form the $C_{PUCCH}(r)$ are all or part of the code words selected from $$\bigcup_{i=1}^{\frac{n}{2}} \bigcup_{k=1}^{4} \left\{ \begin{bmatrix} v_{2i} \\ \alpha_k v_{2i} \end{bmatrix} \right\};$$

or, the code words that form the $C_{PUCCH}(r)$ are all or part of the code words selected from $$\bigcup_{i=1}^{\frac{n}{2}} \bigcup_{k=1}^{4} \left\{ \begin{bmatrix} v_{4i-1} \\ \alpha_k v_{4i-1} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i-2} \\ \alpha_k v_{4i-2} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i-3} \\ \alpha_k v_{4i-3} \end{bmatrix} \right\};$$

or, the code words that form the $C_{PUCCH}(r)$ are all or part of the code words selected from $$\bigcup_{i=1}^{\frac{n}{4}} \bigcup_{k=1}^{4} \left\{ \begin{bmatrix} v_{4i} \\ \alpha_k v_{4i} \end{bmatrix} \right\}.$$

17. The terminal according to claim 16, wherein, there are only 1 or 2 code words meeting the model $$\begin{bmatrix} v_i \\ \alpha_k v_i \end{bmatrix}$$

correspondingly in the $C_{PUCCH}(r)$ when values of the $v_i$ are same in the codebook.

18. The terminal according to claim 12, wherein, when r=2, the code words of the $C_{PUSCH}(r)$ meet the model $$\begin{bmatrix} u_i & u_{ii} \\ \alpha_k u_i & -\alpha_k u_{ii} \end{bmatrix},$$

the $u_i$ and $u_{ii}$ are same or different 4-dimension vectors, the $C_{PUSCH}$ has A cases that $u_i = u_{ii}$ and B cases that $u_i \neq u_{ii}$, is a positive integer, B is a nonnegative integer, and $\alpha_k$ has 2 values of for $\{1, j\}$ for each combination case of $(u_i, u_{ii})$, then:
the code words that form the $C_{PUCCH}(r)$ are all or part of the code words selected from the code words in the A cases that $u_i = u_{ii}$ in the $C_{PUSCH}(r)$;
or, the code words that form the $C_{PUCCH}(r)$ are part of code words which are extracted from the $C_{PUSCH}(r)$ and meet model $$\begin{bmatrix} u_i & u_{ii} \\ \alpha_k u_i & -\alpha_k u_{ii} \end{bmatrix},$$

with a corresponding $\alpha_k = 1$;
or, the code words that form the $C_{PUCCH}(r)$ are part of code words which are extracted from the $C_{PUSCH}(r)$ and meet model $$\begin{bmatrix} u_i & u_{ii} \\ \alpha_k u_i & -\alpha_k u_{ii} \end{bmatrix},$$

with $u_i = u_{ii}$ and $\alpha_k 1$;
or, half of the code words that form the $C_{PUSCH}(r)$ are code words which are extracted from the $C_{PUSCH}(r)$ and meet the model $$\begin{bmatrix} u_i & u_{ii} \\ \alpha_k u_i & -\alpha_k u_{ii} \end{bmatrix}$$

with the corresponding $\alpha_k = 1$; and half of the code words are code words which are extracted from the $C_{PUSCH}(r)$ and meet the model $$\begin{bmatrix} u_i & u_{ii} \\ \alpha_k u_i & -\alpha_k u_{ii} \end{bmatrix}$$

with the corresponding $\alpha_k = j$;
or, half of the code words that form the $C_{PUSCH}(r)$ are part of code words selected from the code words in the A cases that $u_i = u_{ii}$ in the $C_{PUSCH}(r)$; another half of the code words are part of the code words selected from the $C_{PUCCH}(r)$.

19. The terminal according to claim 12, wherein, when r=3, all or part of the code words of the $C_{PUSCH}(r)$ meet the model $$\begin{bmatrix} u_i & u_i & u_{ii} \\ \alpha_k u_i & -\alpha_k u_i & \alpha_k u_{ii} \end{bmatrix},$$

wherein, the $u_i$ and $u_{ii}$ are different 4-dimension vectors, for each $u_i$ and $u_{ii}$ combination $(u_i, u_{ii})$, $\alpha_k$ corresponds to 2 values of $\{1, -1\}$ respectively, then:
the code words that form the $C_{PUSCH}(r)$ are all or part of code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being 1;
or, the code words that form the $C_{PUSCH}(r)$ are all or part of code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix},$$

with the $\alpha_k$ being $-1$.

20. The terminal according to claim 12, wherein, when r=3, the $C_{PUSCH}(r)$ comprises even number of code words, and half of said even number of code words meet the model $$\begin{bmatrix} u_i & u_i & u_{ii} \\ \alpha_k u_i & -\alpha_k u_i & \alpha_k u_{ii} \end{bmatrix},$$

and another half meet $$\begin{bmatrix} u_{ii} & u_{ii} & u_i \\ \alpha_k u_{ii} & -\alpha_k u_{ii} & \alpha_k u_i \end{bmatrix}$$

correspondingly, wherein, the $u_i$ and $u_{ii}$ are different 4-dimension vectors, and $\alpha_k$ corresponds to $\{1,-1,j,-j\}$ or a subset of $\{1,-1,j,-j\}$, then:
the code words that form the $C_{PUSCH}(r)$ are all or part of code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix};$$

or, the code words that form the $C_{PUSCH}(r)$ are all or part of code words which are selected from the $C_{PUSCH}(r)$ and meet the model $$\begin{bmatrix} u_{ii} & u_{ii} & u_i \\ \alpha_k u_{ii} & -\alpha_k u_{ii} & \alpha_k u_i \end{bmatrix};$$

or, half of the code words that form the $C_{PUSCH}(r)$ are part of code words which are selected from the $C_{PUSCH}(r)$ and meet the model $$\begin{bmatrix} u_i & u_i & u_{ii} \\ \alpha_k u_i & -\alpha_k u_i & \alpha_k u_{ii} \end{bmatrix},$$

and another half of the code words are code words meeting the $$\begin{bmatrix} u_{ii} & u_{ii} & u_i \\ \alpha_k u_{ii} & -\alpha_k u_{ii} & \alpha_k u_i \end{bmatrix}$$

correspondingly;
a codebook formed after a conversion of exchanging columns of code words arbitrarily, multiplying by a constant coefficient or exchanging rows of all code words together has been performed for the $C_{PUCCH}(r)$ and the $C_{PUSCH}(r)$ is equivalent to the codebook before the conversion.

21. The terminal according to claim 12, wherein,
when r=4, all or part of the code words of the $C_{PUSCH}(r)$ meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

wherein, the $u_i$ and $u_{ii}$ are different 4-dimension vectors, and for each $u_i$ and $u_{ii}$ combination $(u_i, u_{ii})$, i=a and ii=b is equivalent to i=b and ii=a; for each combination $(u_i, u_{ii})$, $\alpha_k$ corresponds to 2 values of $\{1,-1\}$ respectively, then:
the code words that form the $C_{PUSCH}(r)$ are all or part of code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

with the corresponding $\alpha_k$ being 1;
or, the code words that form the $C_{PUCCH}(r)$ are all or part of code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

with the corresponding $\alpha_k$ being j;
or, half of the code words that form the $C_{PUCCH}(r)$ are part of code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

with the corresponding $\alpha_k$ being 1; another half of the code words that form the $C_{PUCCH}(r)$ are part of code words which are selected from the $C_{PUSCH}(r)$ and meet the model $$\begin{bmatrix} u_i & u_i & u_{ii} & u_{ii} \\ \alpha_k u_i & -\alpha_k u_i & \alpha_k u_{ii} & -\alpha_k u_{ii} \end{bmatrix},$$

with the corresponding $\alpha_k$ being j.

22. The terminal according to claim 12, wherein,
the codebook formed after a conversion of exchanging the columns of the code words arbitrarily, multiplying by a constant coefficient or exchanging the rows of all code words together has been performed for the $C_{PUCCH}(r)$ and the $C_{PUSCH}(r)$ is equivalent to the codebook before the conversion.

* * * * *